(12) United States Patent
Kozuka et al.

(10) Patent No.: US 10,136,181 B2
(45) Date of Patent: Nov. 20, 2018

(54) PLAYBACK METHOD AND PLAYBACK DEVICE

(71) Applicant: Panasonic Intellectual Property Management Co., Ltd., Osaka (JP)

(72) Inventors: Masayuki Kozuka, Osaka (JP); Tadamasa Toma, Osaka (JP); Kengo Terada, Osaka (JP); Takahiro Nishi, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/593,478

(22) Filed: May 12, 2017

(65) Prior Publication Data

US 2017/0251244 A1   Aug. 31, 2017

Related U.S. Application Data

(63) Continuation of application No. 15/373,509, filed on Dec. 9, 2016, which is a continuation of application No. PCT/JP2015/002726, filed on May 29, 2015.
(Continued)

(30) Foreign Application Priority Data

May 15, 2015   (JP) .................................. 2015-100539

(51) Int. Cl.
*H04N 5/775*   (2006.01)
*H04N 5/765*   (2006.01)
(Continued)

(52) U.S. Cl.
CPC ......... *H04N 21/43635* (2013.01); *H04N 5/92* (2013.01); *H04N 7/015* (2013.01);
(Continued)

(58) Field of Classification Search
USPC .................................. 386/230–232, 239–262
See application file for complete search history.

(56) References Cited

U.S. PATENT DOCUMENTS

2007/0049117 A1* 3/2007 Heo ..................... H04N 5/775
                                                              439/607.01
2011/0103472 A1* 5/2011 Lefebvre ............ H04N 21/4122
                                                              375/240.12
(Continued)

FOREIGN PATENT DOCUMENTS

EP   3 013 061     4/2016
JP   2008-167418   7/2008
(Continued)

OTHER PUBLICATIONS

Kalaweeza, HDMI vs DisplayPort vs DVI vs VGA vs USB-C: Every connection explained plus how to get 144Hz, http://kalaweeza.com/2014/04/24/how-to-get-out-of-debt-in-1-year-or-less/, Apr. 24, 2014.*

(Continued)

*Primary Examiner* — Hung Dang
(74) *Attorney, Agent, or Firm* — Wenderoth, Lind & Ponack, L.L.P.

(57) ABSTRACT

A playback method according to one aspect of the present disclosure is performed by a playback device connected to a display device. The playback method includes obtaining a type of the display device; selecting each of a version of High-Definition Multimedia Interface (HDMI) and a version of High-bandwidth Digital Content Protection (HDCP), according to the obtained type of the display device; obtaining a video signal of content recorded on a recording medium; decoding the obtained video signal; encrypting the decoded video signal using the selected version of HDCP;

(Continued)

and outputting the encrypted video signal to the display device using the selected version of HDMI.

8 Claims, 44 Drawing Sheets

Related U.S. Application Data

(60) Provisional application No. 62/012,615, filed on Jun. 16, 2014.

(51) Int. Cl.
    *H04N 9/80*     (2006.01)
    *H04N 21/4363*     (2011.01)
    *H04N 5/92*     (2006.01)
    *H04N 7/167*     (2011.01)
    *H04N 21/835*     (2011.01)
    *H04N 21/432*     (2011.01)
    *H04N 21/4402*     (2011.01)
    *H04N 21/4408*     (2011.01)
    *H04N 7/015*     (2006.01)

(52) U.S. Cl.
    CPC ......... *H04N 7/167* (2013.01); *H04N 21/4325* (2013.01); *H04N 21/4402* (2013.01); *H04N 21/4408* (2013.01); *H04N 21/440263* (2013.01); *H04N 21/835* (2013.01)

(56) References Cited

U.S. PATENT DOCUMENTS

| 2013/0230296 | A1 | 9/2013 | Yun et al. |
| 2014/0211941 | A1* | 7/2014 | Oh .......................... G06F 21/10 380/201 |
| 2016/0119302 | A1* | 4/2016 | Yi ........................ H04N 21/436 713/171 |
| 2016/0345040 | A1* | 11/2016 | Oh ..................... H04N 21/2343 |

FOREIGN PATENT DOCUMENTS

| WO | 2013/046095 | 4/2013 |
| WO | 2014/203869 | 12/2014 |

OTHER PUBLICATIONS

HDMI and HDCP: Setting new standards in video-to-display transference, NEC Display Solutions of America, Inc., 2007.*
Steves, Tom: "HDMI 2.0 HDCP 2.2 and HDR", RAM Electronics, Feb. 15, 2014, 2 pages.*
"Why is HDCP 2.2 imporatnt to playing 4K or 4K HDR content?", Roku report, 2016, 6 pages.*
Extended European Search Report dated May 2, 2017 in European Patent Application No. 15809475.5.
HDR Static Metadata Extensions, CEA-861.3, DVB Organization: CM-UHDTV0074_CEA-8613-Final_DVB.pdf, DVB, Digital Video Broadcasting, C/O EBU—17A Ancienne Route—CH-1218 Grand Saconnex, Geneva—Switzerland, Mar. 10, 2015 (Mar. 10, 2015), XP017846002.
International Search Report of PCT application No. PCT/JP2015/002726 dated Jun. 23, 2015.

* cited by examiner

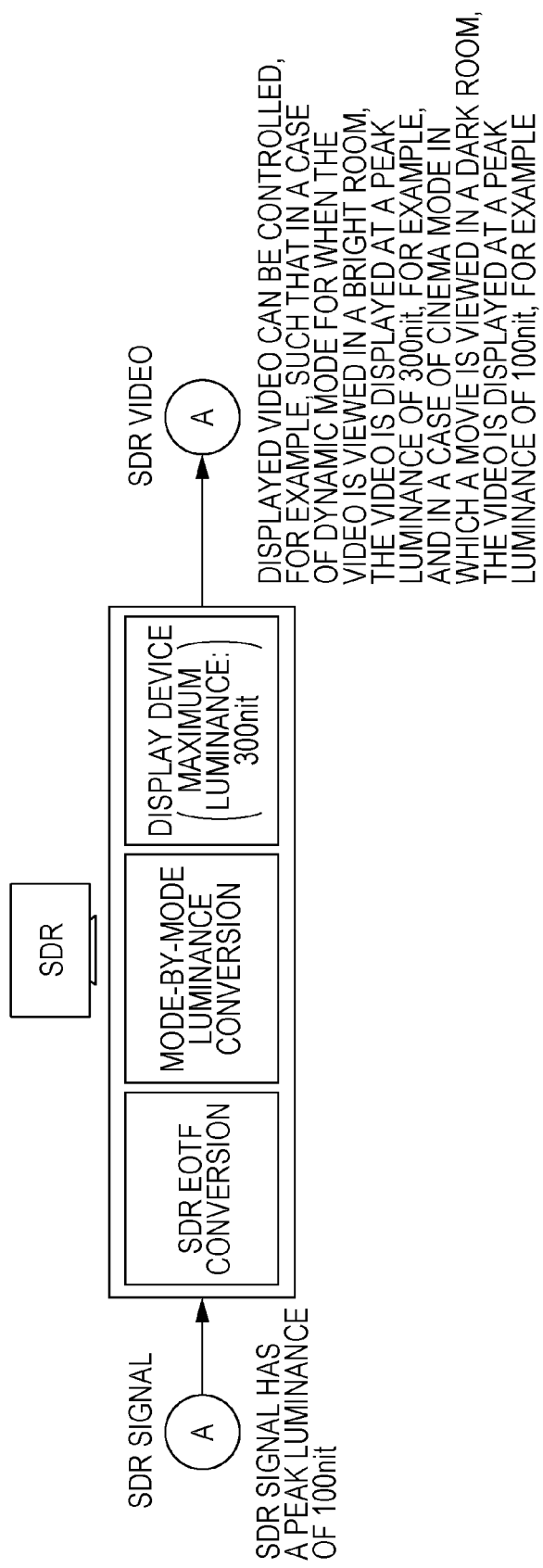

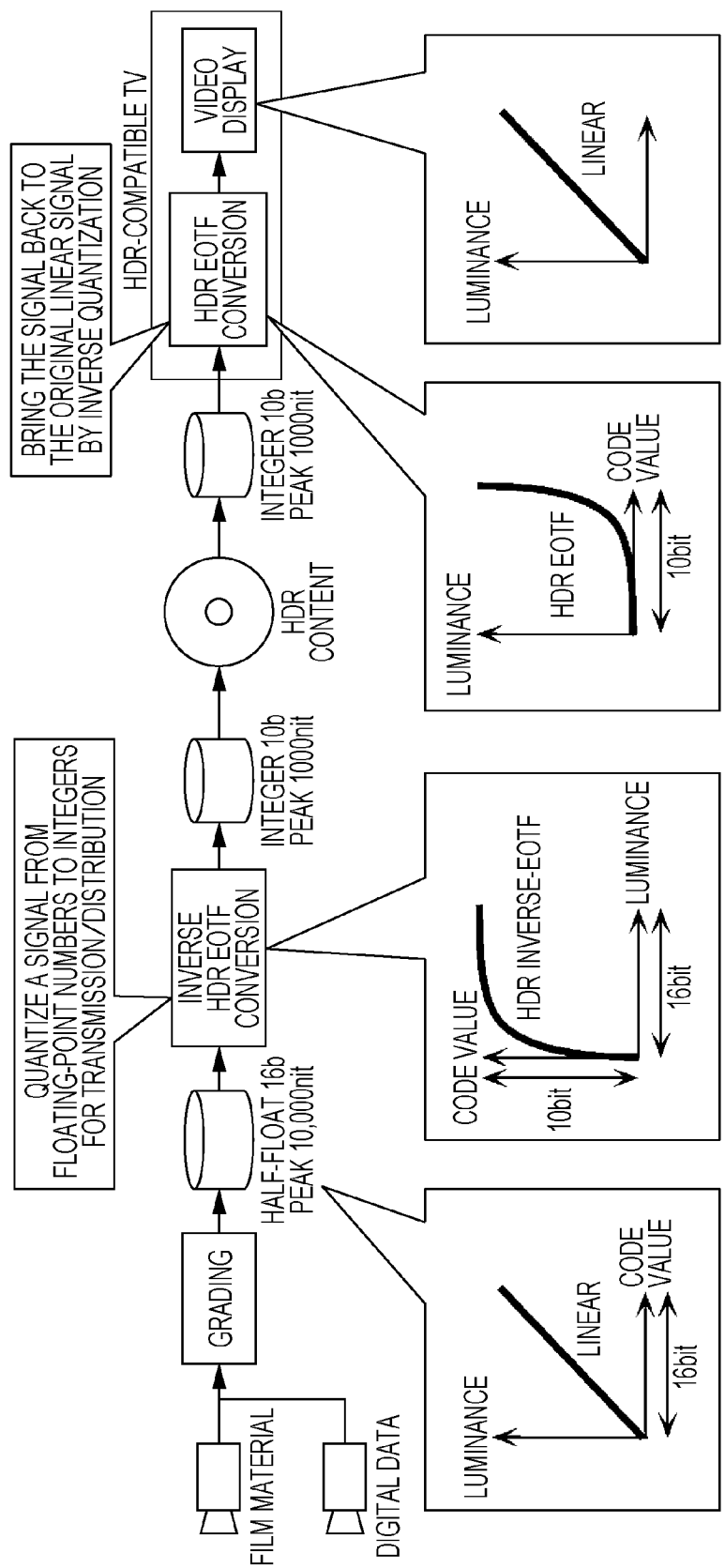

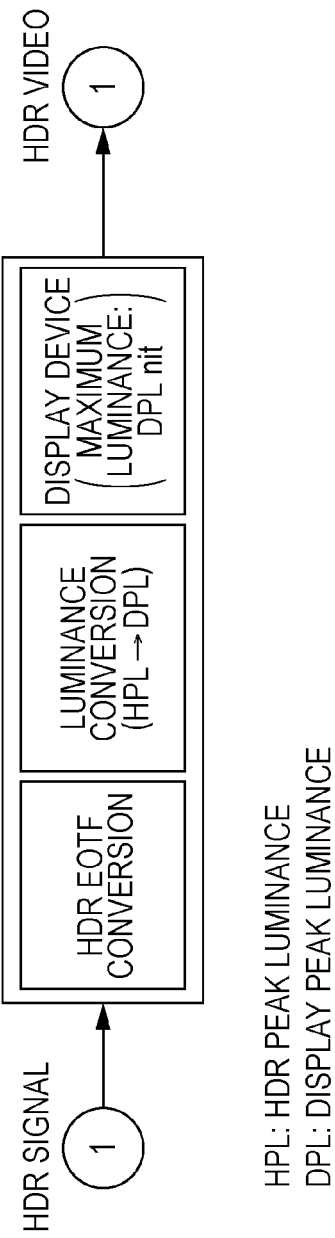

FIG. 20

|  | SDR (FIRST LUMINANCE RANGE) | HDR (SECOND LUMINANCE RANGE) |
|---|---|---|
| 2K (FIRST RESOLUTION) | 2K_SDR-COMPATIBLE BD | 2K_HDR-COMPATIBLE BD |
| 4K (SECOND RESOLUTION) | 4K_SDR-COMPATIBLE BD | 4K_HDR-COMPATIBLE BD |

FIG. 23

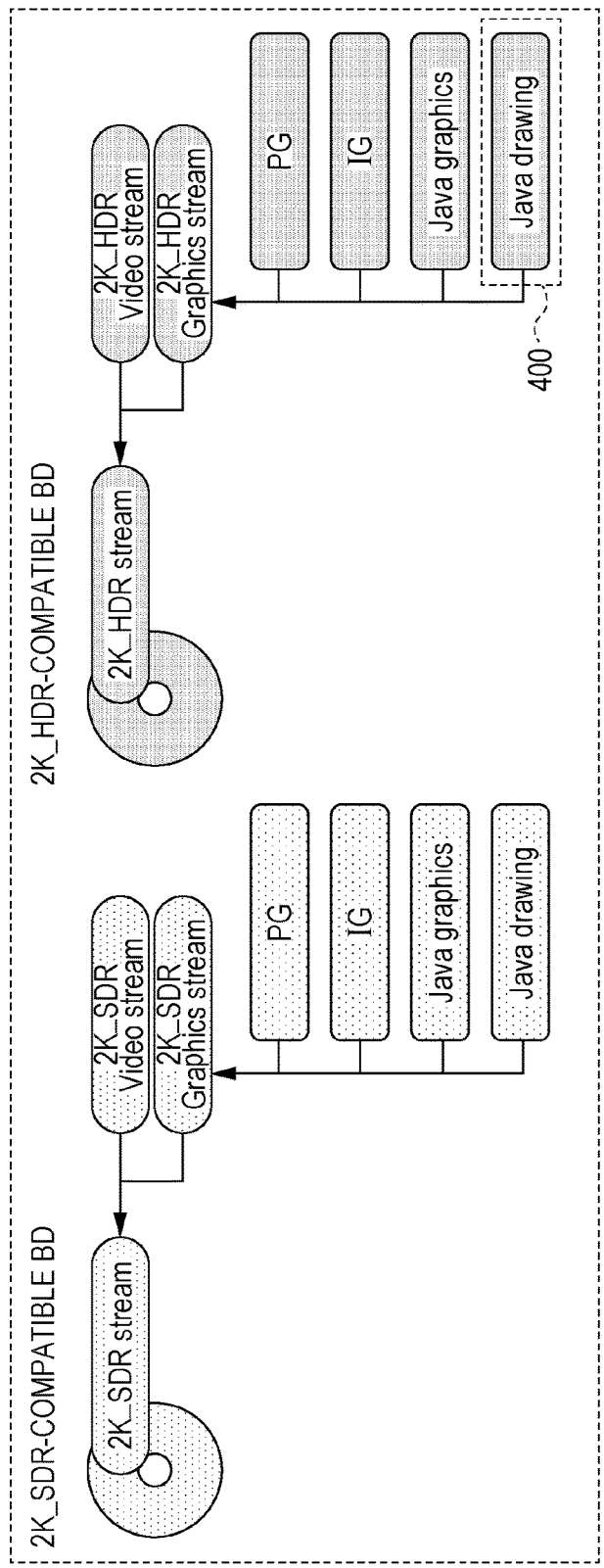

PLAYBACK METHOD AND PLAYBACK DEVICE

BACKGROUND

1. Technical Field

The present disclosure relates to a playback method and a playback device.

2. Description of the Related Art

Conventionally, an image signal processing device for improving displayable luminance levels is disclosed (see, for example, Unexamined Japanese Patent Publication No. 2008-167418).

SUMMARY

The above-described conventional technique requires a further improvement.

In one general aspect, the techniques disclosed here feature a method for a playback device that plays content, the method including: obtaining a type of a display device connected to the playback device; selecting each of a version of High-Definition Multimedia Interface (HDMI) and a version of High-bandwidth Digital Content Protection (HDCP), according to the obtained type of the display device; obtaining a video signal of content recorded on a recording medium; decoding the obtained video signal; encrypting the decoded video signal using the selected version of HDCP; and outputting the encrypted video signal to the display device using the selected version of HDMI.

Note that these general or specific aspects may be implemented by a device, a system, an integrated circuit, a computer program, or a recording medium such as a computer-readable CD-ROM, or may be implemented by any combination of a device, a system, a method, a computer program, and a recording medium.

According to the above-described aspect, a further improvement can be achieved.

Note that further effects and advantages of the present disclosure will become apparent from the disclosed contents of the specification and the drawings. The above-described further effects and advantages may be individually provided by various exemplary embodiments and features disclosed in the specification and the drawings, and all of the effects and advantages do not necessarily need to be provided.

BRIEF DESCRIPTION OF THE DRAWINGS

FIG. 4B is a diagram for describing an SDR display process in an SDRTV with a peak luminance of 300 nit;

FIG. 9 is an illustrative diagram of a method for determining a code value of a luminance signal stored in content, and a process of restoring a luminance value from a code value upon playback;

FIG. 10A is a diagram showing an example of a display process of performing HDR display by converting an HDR signal in an HDRTV;

FIG. 20 is a diagram showing types of BDs;

FIG. 23 is a second diagram showing data capacity to be recorded on BDs;

FIG. 39 is a diagram showing detailed configurations of graphics streams.

Figure 1:
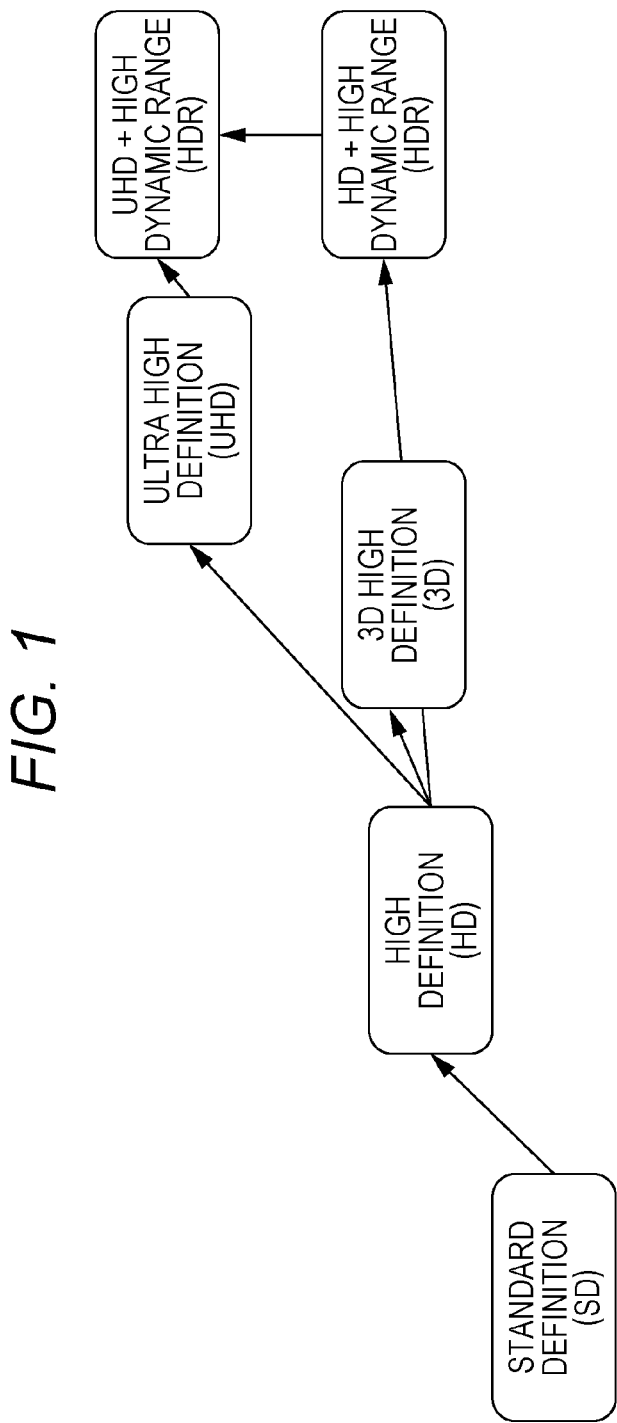
FIG. 1 is a diagram for describing video technology evolution.

DETAILED DESCRIPTION (Findings Forming a Basis of the Present Disclosure)

In one general aspect, the techniques disclosed here feature a method for a playback device that plays content, the method including: obtaining a type of a display device connected to the playback device; selecting each of a version of High-Definition Multimedia Interface (HDMI) and a version of High-bandwidth Digital Content Protection (HDCP), according to the obtained type of the display device; obtaining a video signal of content recorded on a recording medium; decoding the obtained video signal; encrypting the decoded video signal using the selected version of HDCP; and outputting the encrypted video signal to the display device using the selected version of HDMI.

According to this, since selection of an appropriate version of HDMI and an appropriate version of HDCP is performed according to a type of a display device connected to the playback device, video can be appropriately displayed on the display device. Such a playback method is shown in, for example, FIG. 27.

In addition, for example, the type of the display device may be one of: a first type indicating a display device whose resolution is a first resolution and which supports a first luminance range; a second type indicating a display device whose resolution is a second resolution and which supports the first luminance range; a third type indicating a display device whose resolution is the first resolution and which supports a second luminance range; and a fourth type indicating a display device whose resolution is the second resolution and which supports the second luminance range, the second resolution may have a larger number of pixels than the first resolution, and the second luminance range may include the first luminance range and have a higher peak luminance than the first luminance range.

In addition, for example, when the obtained type of the display device is the first type, (i) in the selecting, each of HDMI 1.4 and HDCP 1.4 is selected, (ii) in the encrypting, the decoded video signal is encrypted using HDCP 1.4, and (iii) in the outputting, the encrypted video signal is output to the display device using a communication protocol that supports HDMI 1.4.

In addition, for example, the method may further include converting the decoded video signal, according to the type of the display device, wherein in the converting, when the obtained type of the display device is the first type, (a) when the decoded video signal is a video signal with the second resolution and the first luminance range, the video signal is converted to the first resolution, (b) when the decoded video signal is a video signal with the first resolution and the second luminance range, the video signal is converted to the first luminance range, and (c) when the decoded video signal is a video signal with the second resolution and the second luminance range, the video signal is converted to the first resolution and converted to the first luminance range, and wherein when the obtained type of the display device is the first type, (i) in the encrypting, the converted video signal is encrypted using HDCP 1.4, and (ii) in the outputting, the encrypted video signal is output to the display device using a communication protocol that supports HDMI 1.4.

In addition, for example, the method may further include obtaining a peak luminance of the display device connected to the playback device; and when the obtained type of the display device is the first type and the obtained peak luminance is higher than a peak luminance of the first luminance range, converting the decoded video signal to a luminance range having the obtained peak luminance, and then further converting the decoded video signal to the first luminance range, wherein when the obtained type of the display device is the first type and the obtained peak luminance is higher than a peak luminance of the first luminance range, (i) in the encrypting, the converted video signal is encrypted using HDCP 1.4, and (ii) in the outputting, the encrypted video signal is output to the display device using a communication protocol that supports HDMI 1.4.

In addition, for example, when the obtained type of the display device is the second type, (i) in the selecting, each of HDMI 2.0 and HDCP 2.2 is selected, (ii) in the encrypting, the decoded video signal is encrypted using HDCP 2.2, and (iii) in the outputting, the encrypted video signal is output to the display device using a communication protocol that supports HDMI 2.0.

In addition, for example, the method may further include converting the decoded video signal, according to the type of the display device, wherein in the converting, when the obtained type of the display device is the second type, (a) when the decoded video signal is a video signal with the first resolution and the first luminance range, the video signal is converted to the second resolution, (b) when the decoded video signal is a video signal with the second resolution and the second luminance range, the video signal is converted to the first luminance range, and (c) when the decoded video signal is a video signal with the first resolution and the second luminance range, the video signal is converted to the second resolution and converted to the first luminance range, and wherein when the obtained type of the display device is the second type, (i) in the encrypting, the converted video signal is encrypted using HDCP 2.2, and (ii) in the outputting, the encrypted video signal is output to the display device using a communication protocol that supports HDMI 2.0.

In addition, for example, the method may further include obtaining a peak luminance of the display device connected to the playback device; and when the obtained type of the display device is the second type and the obtained peak luminance is higher than a peak luminance of the first luminance range, converting the decoded video signal to a luminance range having the obtained peak luminance, and then further converting the video signal with the luminance range having the obtained peak luminance to the first luminance range, wherein when the obtained type of the display device is the second type and the obtained peak luminance is higher than a peak luminance of the first luminance range, (i) in the encrypting, the converted video signal is encrypted using HDCP 2.2, and (ii) in the outputting, the encrypted video signal is output to the display device using a communication protocol that supports HDMI 2.0.

In addition, for example, when the obtained type of the display device is the third type, (i) in the selecting, each of HDMI 2.1 and HDCP 2.2 is selected, (ii) in the encrypting, the decoded video signal is encrypted using HDCP 2.2, and (iii) in the outputting, the encrypted video signal is output to the display device using a communication protocol that supports HDMI 2.1.

In addition, for example, the method may further include converting the decoded video signal, according to the type of the display device, wherein in the converting, when the obtained type of the display device is the third type, (a) when the decoded video signal is a video signal with the second resolution and the second luminance range, the video signal is converted to the first resolution, and (b) when the decoded video signal is a video signal with the second resolution and the second luminance range, the video signal is converted to the first resolution, and wherein when the obtained type of the display device is the third type, (i) in the encrypting, the converted video signal is encrypted using HDCP 2.2, and (ii) in the outputting, the encrypted video signal is output to the display device using a communication protocol that supports HDMI 2.1.

In addition, for example, when the obtained type of the display device is the fourth type, (i) in the selecting each of HDMI 2.1 and HDCP 2.2 is selected, (ii) in the encrypting, the decoded video signal is encrypted using HDCP 2.2, and (ii) in the outputting, the encrypted video signal is output to the display device using a communication protocol that supports HDMI 2.1.

In addition, for example, the method may further include converting the video signal, according to the type of the display device, wherein in the converting, when the obtained type of the display device is the fourth type, (a) when the decoded video signal is a video signal with the first resolution and the first luminance range, the video signal is converted to the second resolution, and (b) when the decoded video signal is a video signal with the first resolution and the second luminance range, the video signal is converted to the second resolution, and wherein when the obtained type of the display signal is the fourth type, (i) in the encrypting, the converted video signal is encrypted using HDCP 2.2, and (ii) in the outputting, the encrypted video signal is output to the display device using a communication protocol that supports HDMI 2.1.

In addition, for example, the recording medium may record a plurality of video signals for playing same content, at least one of a resolution and a luminance range differing between the plurality of video signals, and in the obtaining of the video signal, one video signal may be selected from among the plurality of video signals according to the obtained type of the display device, and the selected video signal may be obtained from the recording medium.

In addition, for example, the recording medium may record a first video signal with the first luminance range and a second video signal with the second luminance range, and in the obtaining of the video signal, when a luminance range supported by the display device is the first luminance range, the first video signal having the first luminance range may be selected, and when the luminance range supported by the display device is the second luminance range, the second video signal having the second luminance range may be selected.

That is, appropriate video can be displayed on a display device by playback methods such as those shown in FIGS. 32 to 34, 37, and 38.

In addition, for example, the recording medium may record: a first video signal including: a video stream whose resolution is the first resolution and whose luminance range is the first luminance range; and a graphics stream whose resolution is the first resolution and whose luminance range is the first luminance range; and a second video signal including: a video stream whose resolution is the first resolution and whose luminance range is the second luminance range; and a graphics stream whose resolution is the first resolution and whose luminance range is the second luminance range, (a) when the obtained type of the display device is the first type, in the selecting, each of HDMI 1.4 and HDCP 1.4 may be selected, in the obtaining of the video signal, the first video signal may be selected and the selected first video signal may be obtained from the recording medium, in the decoding, each of the video stream and graphics stream included in the obtained first video signal may be decoded, and a first signal where the decoded video stream and the decoded graphics stream are combined together may be generated, and in the encrypting, the first signal may be encrypted using HDCP 1.4, and in the outputting, the encrypted first signal may be output to the display device using a communication protocol that supports HDMI 1.4, (b) when the obtained type of the display device is the second type, in the selecting, each of HDMI 2.0 and HDCP 2.2 may be selected, in the obtaining of the video signal, the first video signal may be selected and the selected first video signal may be obtained from the recording medium, in the decoding, each of the video stream and graphics stream included in the obtained first video signal may be decoded, a second signal where the decoded video stream and the decoded graphics stream are combined together may be generated, and the second signal where the decoded video stream and the decoded graphics stream are combined together may be converted to the second resolution, in the encrypting, the converted second signal may be encrypted using HDCP 2.2, and in the outputting, the encrypted converted second signal may be output to the display device using a communication protocol that supports HDMI 2.0, (c) when the obtained type of the display device is the third type, in the selecting, each of HDMI 2.1 and HDCP 2.2 may be selected, in the obtaining of the video signal, the second video signal may be selected and the selected second video signal may be obtained from the recording medium, in the decoding, each of the video stream and graphics stream included in the obtained second video signal may be decoded, and a third signal where the decoded video stream and the decoded graphics stream are combined together may be generated, in the encrypting, the third signal may be encrypted using HDCP 2.2, and in the outputting, the encrypted third signal may be output to the display device using a communication protocol that supports HDMI 2.1, and (d) when the obtained type of the display device is the fourth type, in the selecting, each of HDMI 2.1 and HDCP 2.2 may be selected, in the obtaining of the video signal, the second video signal may be selected and the selected second video signal may be obtained from the recording medium, in the decoding, each of the video stream and graphics stream included in the obtained second video signal may be decoded, a fourth signal where the decoded video stream and the decoded graphics stream are combined together may be generated, and the fourth signal where the decoded video stream and the decoded graphics stream are combined together may be converted to the second resolution as a converted second video signal, in the encrypting, the converted fourth signal may be encrypted using HDCP 2.2, and in the outputting, the encrypted converted fourth signal may be output to the display device using a communication protocol that supports HDMI 2.1.

Figure 32:
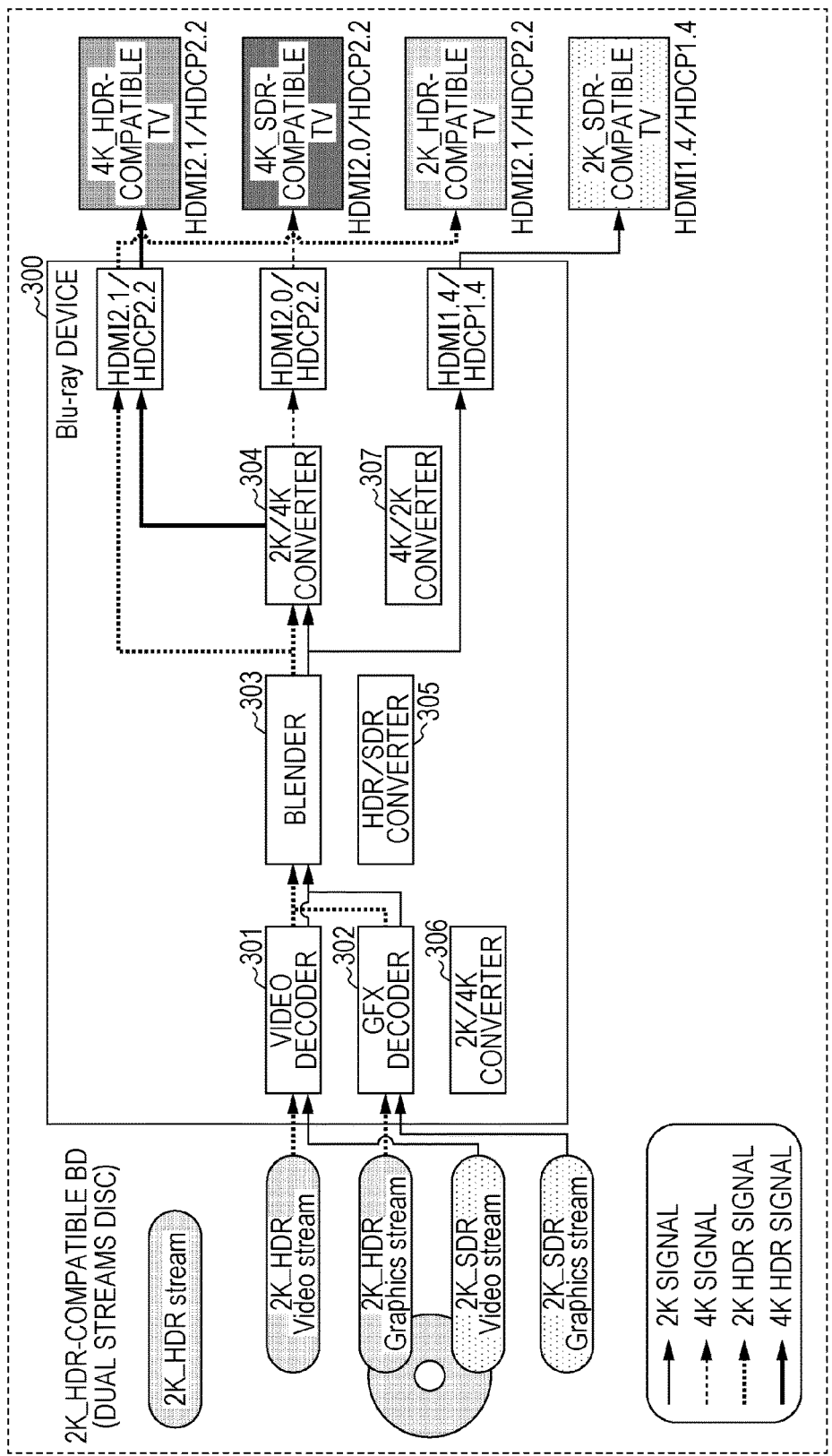
FIG. 32 is a diagram showing specific content of processes for a case in which the Blu-ray device plays a stream disc having a 2K_HDR stream and a 2K_SDR stream recorded on the disc.

That is, appropriate video can be displayed on a display device by a playback method such as that shown in FIG. 32.

In addition, for example, the recording medium may record: a first video signal including: a video stream whose resolution is the second resolution and whose luminance range is the first luminance range; and a graphics stream whose resolution is the first resolution and whose luminance range is the first luminance range; and a second video signal including: a video stream whose resolution is the second resolution and whose luminance range is the second luminance range; and a graphics stream whose resolution is the first resolution and whose luminance range is the second luminance range, (a) when the obtained type of the display device is the first type, in the selecting, each of HDMI 1.4 and HDCP 1.4 may be selected, in the obtaining of the video signal, the first video signal may be selected and the selected first video signal may be obtained from the recording medium, in the decoding, each of the video stream and graphics stream included in the obtained first video signal may be decoded, the decoded graphics stream may be converted to the second resolution, a first signal where the decoded video stream and the converted graphics stream are combined together may be generated, and the first signal where the converted video signal and the decoded graphics stream are combined together may be converted to the first resolution, in the encrypting, the converted first signal may be encrypted using HDCP 1.4, and in the outputting, encrypted first signal may be output to the display device using a communication protocol that supports HDMI 1.4, (b) when the obtained type of the display device is the second type, in the selecting, each of HDMI 2.0 and HDCP 2.2 may be selected, in the obtaining of the video signal, the first video signal may be selected and the selected first video signal may be obtained from the recording medium, in the decoding, each of the video stream and graphics stream included in the obtained first video signal may be decoded, the decoded graphics stream may be converted to the second resolution, and a second signal where the decoded video stream and the converted graphics stream are combined together may be generated, in the encrypting, the second signal may be encrypted using HDCP 2.2, and in the outputting, the encrypted second signal may be output to the display device using a communication protocol that supports HDMI 2.0, (c) when the obtained type of the display device is the third type, in the selecting, each of HDMI 2.1 and HDCP 2.2 may be selected, in the obtaining of the video signal, the second video signal may be selected and the selected second video signal may be obtained from the recording medium, in the decoding, each of the video stream and graphics stream included in the obtained second video signal may be decoded, the decoded graphics stream may be converted to the second resolution, a third signal where the decoded video stream and the converted graphics stream are combined together may be generated, and the third signal where the decoded video stream and the converted graphics stream are combined together may be converted to the first resolution, in the encrypting, the converted third signal may be encrypted using HDCP 2.2, and in the outputting, the encrypted converted third signal may be output to the display device using a communication protocol that supports HDMI 2.1, and (d) when the obtained type of the display device is the fourth type, in the selecting, each of HDMI 2.1 and HDCP 2.2 may be selected, in the obtaining of the video signal, the second video signal may be selected and the selected second video signal may be obtained from the recording medium, in the decoding, each of the video stream and graphics stream included in the obtained second video signal may be decoded, the decoded graphics stream may be converted to the second resolution, and a fourth signal where the decoded video stream and the converted graphics stream are combined together may be generated, in the encrypting, the fourth signal may be encrypted using HDCP 2.2, and in the outputting, the encrypted fourth signal may be output to the display device using a communication protocol that supports HDMI 2.1.

Figure 33:
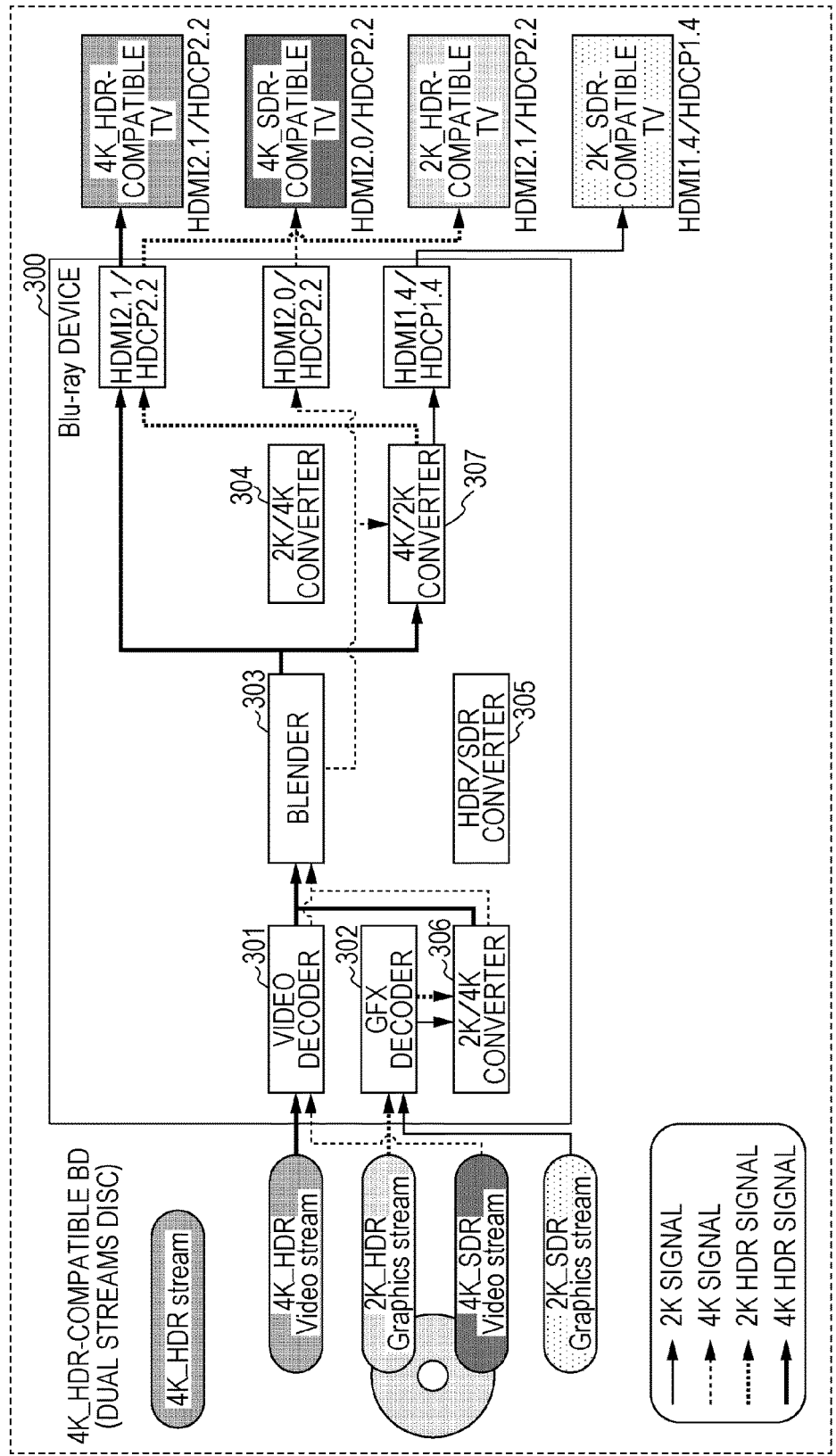
FIG. 33 is a diagram showing specific content of processes for a case in which the Blu-ray device plays a stream disc having a 4K_HDR stream and a 4K_SDR stream recorded on the disc.

That is, video can be appropriately displayed on a display device by a playback method such as that shown in FIG. 33.

In addition, for example, the recording medium may record: a first video signal including: a video stream whose resolution is the first resolution and whose luminance range is the first luminance range; and a graphics stream whose resolution is the first resolution and whose luminance range is the first luminance range; and a second video signal including: a video stream whose resolution is the second resolution and whose luminance range is the second luminance range; and a graphics stream whose resolution is the first resolution and whose luminance range is the second luminance range, (a) when the obtained type of the display device is the first type, in the selecting, each of HDMI 1.4 and HDCP 1.4 may be selected, in the obtaining, the first video signal may be selected and the selected first video signal may be obtained from the recording medium, in the decoding, each of the video stream and graphics stream included in the obtained first video signal may be decoded, and a first signal where the decoded video stream and the decoded graphics stream are combined together may be generated, in the encrypting, the first signal may be encrypted using HDCP 1.4, and in the outputting, the encrypted first signal may be output to the display device using a communication protocol that supports HDMI 1.4, (b) when the obtained type of the display device is the second type, in the selecting, each of HDMI 2.0 and HDCP 2.2 may be selected, in the obtaining of the video signal, the first video signal may be selected and the selected first video signal may be obtained from the recording medium, in the decoding, each of the video stream and graphics stream included in the obtained first video signal may be decoded, a second signal where the decoded video stream and the decoded graphics stream are combined together may be generated, and the second signal where the decoded video stream and the decoded graphics stream are combined together may be converted to the second resolution, in the encrypting, the converted second signal may be encrypted using HDCP 2.2, and in the outputting, the encrypted converted second signal may be output to the display device using a communication protocol that supports HDMI 2.0, (c) when the obtained type of the display device is the third type, in the selecting, each of HDMI 2.1 and HDCP 2.2 may be selected, in the obtaining of the video signal, the second video signal may be selected and the selected second video signal may be obtained from the recording medium, in the decoding, each of the video stream and graphics stream included in the obtained second video signal may be decoded, the decoded graphics stream may be converted to the second resolution, a third signal where the decoded video stream and the converted graphics stream are combined together may be generated, and the third signal where the decoded video stream and the converted graphics stream are combined together may be converted to the first resolution, in the encrypting, the converted third signal may be encrypted using HDCP 2.2, and in the outputting, the encrypted converted third signal may be output to the display device using a communication protocol that supports HDMI 2.1, and (d) when the obtained type of the display device is the fourth type, in the selecting, each of HDMI 2.1 and HDCP 2.2 may be selected, in the obtaining of the video signal, the second video signal may be selected and the selected second video signal may be obtained from the recording medium, in the decoding, each of the video stream and graphics stream included in the obtained second video signal may be decoded, the decoded graphics stream may be converted to the second resolution, and a fourth signal where the decoded video stream and the converted graphics stream are combined together may be generated, in the encrypting, the fourth signal may be encrypted using HDCP 2.2, and in the outputting, the encrypted fourth signal may be output to the display device using a communication protocol that supports HDMI 2.1.

Figure 34:
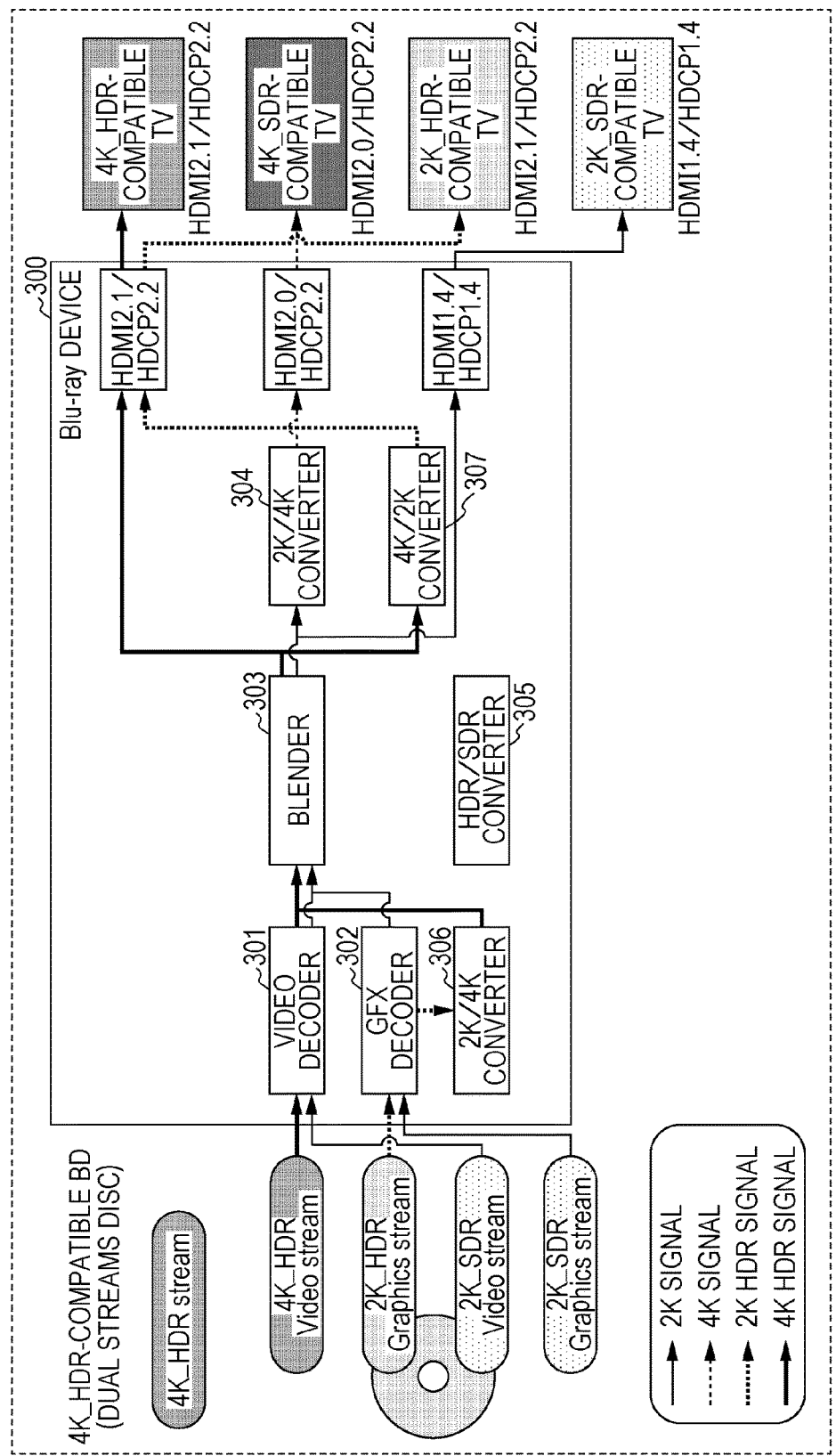
FIG. 34 is a diagram showing specific content of processes for a case in which the Blu-ray device plays a stream disc having a 4K_HDR stream and a 2K_SDR stream recorded on the disc.

That is, video can be appropriately displayed on a display device by a playback method such as that shown in FIG. 34.

In addition, for example, the playback method may further include obtaining a peak luminance of the display device connected to the playback device. (e) when the obtained type of the display device is the first type and the obtained peak luminance is higher than the first peak luminance range, in the selecting, each of HDMI 1.4 and HDCP 1.4 may be selected, in the obtaining of the video signal, the second video signal may be selected and the selected second video signal may be obtained from the recording medium, in the decoding, each of the video stream and graphics stream included in the obtained second video signal may be decoded, a fifth signal where the decoded video stream and the decoded graphics stream are combined together may be generated, and the fifth signal where the decoded video stream and the decoded graphics stream are combined together may be converted to a luminance range having the obtained peak luminance, and then the fifth signal may further converted to the first luminance range and may converted to the first resolution, in the encrypting, the converted fifth signal may be encrypted using HDCP 1.4, and in the outputting, the encrypted converted fifth signal may be output to the display device using a communication protocol that supports HDMI 1.4, and (f) when the obtained type of the display device is the second type and the obtained peak luminance is higher than the first peak luminance range, in the selecting, each of HDMI 2.0 and HDCP 2.2 may be selected, in the obtaining of the video signal, the second video signal may be selected and the selected second video signal may be obtained from the recording medium, in the decoding, each of the video stream and graphics stream included in the obtained second video signal may be decoded, a sixth signal where the decoded video stream and the decoded graphics stream are combined together may be generated, and the sixth signal where the decoded video stream and the decoded graphics stram are combined together may be converted to a luminance range having the obtained peak luminance, and then the sixth signal may further converted to the first luminance range, in the encrypting, the converted sixth signal may be encrypted using HDCP 2.2, and in the outputting, the encrypted converted sixth signal may be output to the display device using a communication protocol that supports HDMI 2.0.

Figure 37:
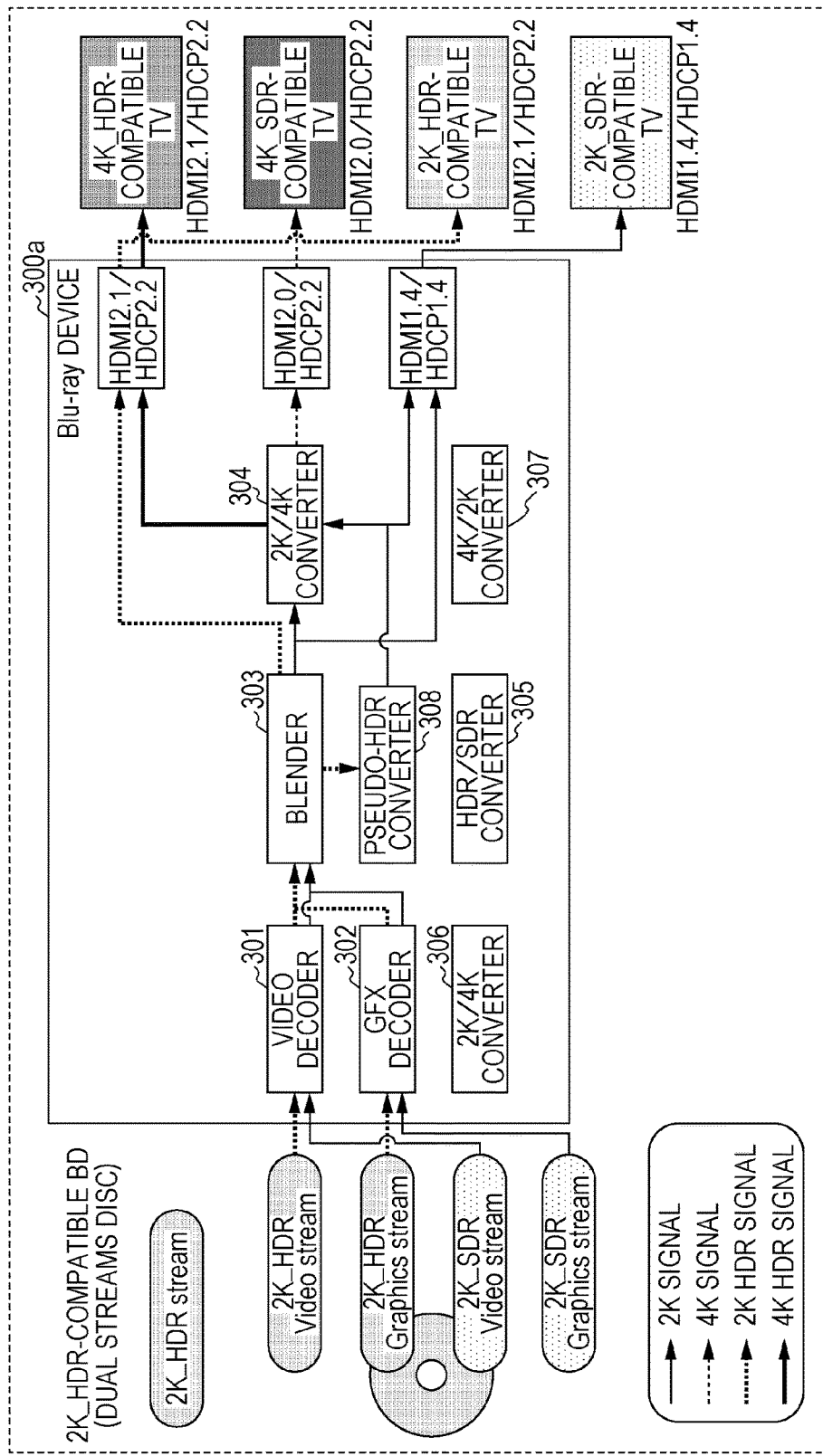
FIG. 37 is a diagram showing specific content of processes for a case in which the Blu-ray device having the pseudo-HDR conversion function plays a stream disc having a 2K_HDR stream and a 2K_SDR stream recorded on the disc.

That is, video can be appropriately displayed on a display device by a playback method including pseudo-HDR conversion, such as that shown in FIG. 37.

In addition, for example, the playback method may further include obtaining a peak luminance of the display device connected to the playback device. (e) when the obtained type of the display device is the first type and the obtained peak luminance is higher than the first peak luminance range, in the selecting, each of HDMI 1.4 and HDCP 1.4 may be selected, in the obtaining of the video signal, the second video signal may be selected and the selected second video signal may be obtained from the recording medium, in the decoding, each of the video stream and graphics stream included in the obtained second video signal may be decoded, the decoded graphics stream may be converted to the second resolution, a fifth signal where the decoded video stream and the converted graphics stream are combined together may be generated, and the fifth signal where the decoded video stream and the converted graphics stream are combined together may be converted to a luminance range having the obtained peak luminance, and then the fifth signal may further converted to the first luminance range and may converted to the first resolution, in the encrypting, the converted fifth signal may be encrypted using HDCP 1.4, and in the outputting, the encrypted converted fifth signal may be output to the display device using a communication protocol that supports HDMI 1.4, and (f) when the obtained type of the display device is the second type and the obtained peak luminance is higher than the first peak luminance range, in the selecting, each of HDMI 2.0 and HDCP 2.2 may be selected, in the obtaining of the video signal, the second video signal may be selected and the selected second video signal may be obtained from the recording medium, in the decoding, each of the video stream and graphics stream included in the obtained second video signal may be decoded, the decoded graphics stream may be converted to the second resolution, a sixth signal where the decoded video stream and the converted graphics stream are combined together may be generated, and the sixth signal where the decoded video stream and the converted graphics stream are combined together may be converted to a luminance range having the obtained peak luminance, and then sixth signal may further converted to the first luminance range, in the encrypting, the converted sixth signal may be encrypted using HDCP 2.2, and in the outputting, the encrypted converted sixth signal may be output to the display device using a communication protocol that supports HDMI 2.0.

Figure 38:
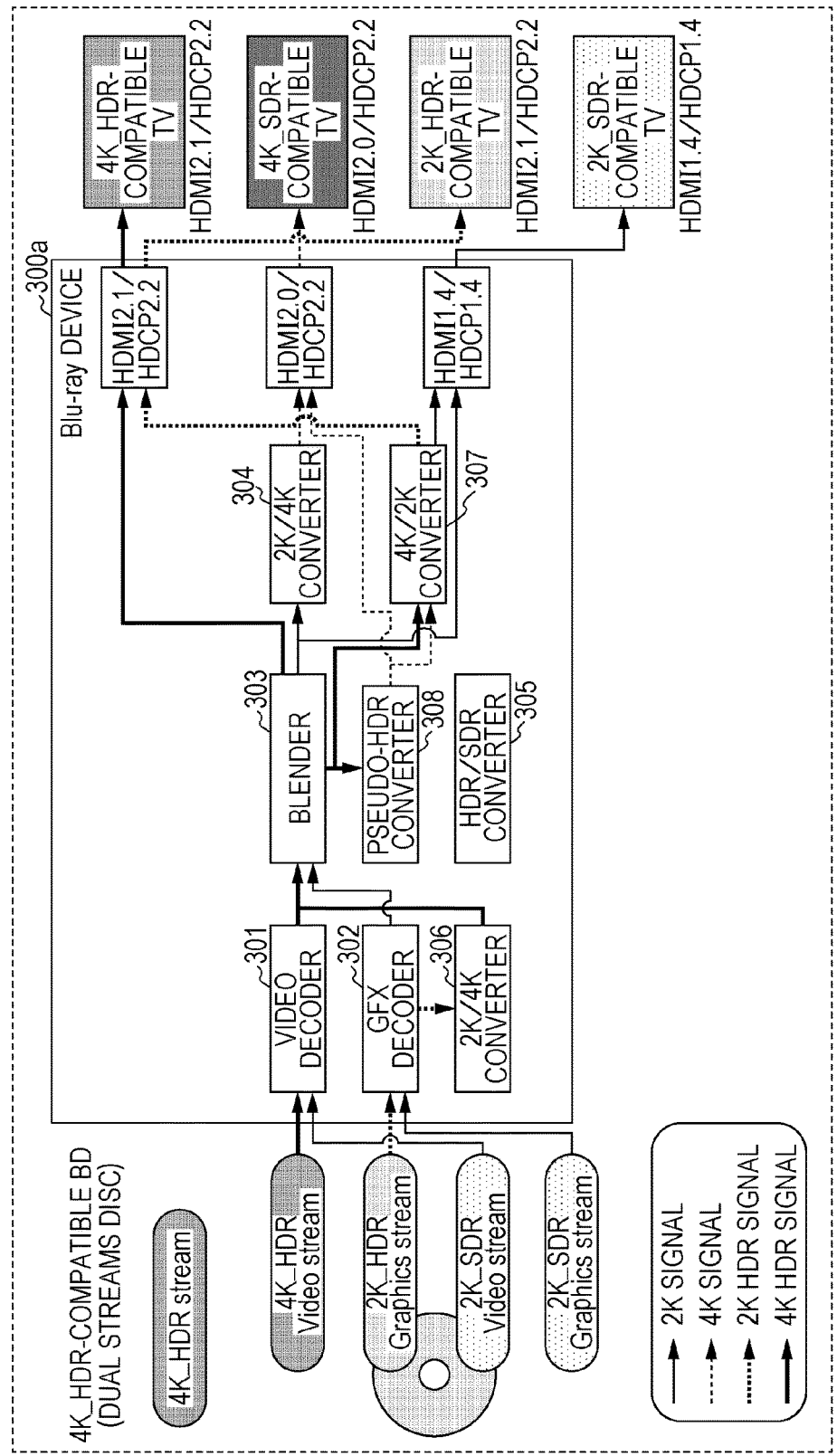
FIG. 38 is a diagram showing specific content of processes for a case in which the Blu-ray device having the pseudo-HDR conversion function plays a stream disc having a 4K_HDR stream and a 2K_SDR stream recorded on the disc.

That is, video can be appropriately displayed on a display device by a playback method including pseudo-HDR conversion, such as that shown in FIG. 38.

In addition, a device according to one aspect of the present disclosure is a device that plays content. The device includes: one or more memories; and circuitry which, in operation, performs operations including: obtaining a type of a display device connected to the playback device; selecting each of a version of HDMI and a version of HDCP, according to the obtained type of the display device; selecting, according to the type of the display device, one video signal from among a plurality of video signals recorded on a recording medium for playing same content, at least one of a resolution and a luminance range differing between the plurality of video signals; obtaining the selected video signal from the recording medium; decoding the obtained video signal; encrypting the decoded video signal using the selected version of HDCP; and outputting the encrypted video signal to the display device using the selected version of HDMI, wherein the type of the display device is one of: a first type indicating a display device whose resolution is a first resolution and which supports a first luminance range; a second type indicating a display device whose resolution is a second resolution and which supports the first luminance range; a third type indicating a display device whose resolution is the first resolution and which supports a second luminance range; and a fourth type indicating a display device whose resolution is the second resolution and which supports the second luminance range, wherein the second resolution has a larger number of pixels than the first resolution, and wherein the second luminance range includes the first luminance range and has a higher peak luminance than the first luminance range.

Note that these comprehensive or specific aspects may be implemented by a system, a method, an integrated circuit, a computer program, or a recording medium such as a computer-readable CD-ROM, or may be implemented by any combination of a system, a method, an integrated circuit, a computer program, and a recording medium.

A playback method and a playback device according to one aspect of the present disclosure will be specifically described below with reference to the accompanying drawings.

Note that each of exemplary embodiments which will be described below shows one specific example of the present disclosure. Numerical values, shapes, materials, components, disposition positions and connection modes of the components, steps, order of the steps, and the like, which are shown in the following exemplary embodiments are examples and thus are not intended to limit the present disclosure. In addition, of the components of the following exemplary embodiments, components that are not described in independent claims representing the broadest concept are described as optional components.

First Exemplary Embodiment

[Findings Forming a Basis of a First Exemplary Embodiment]

The present inventors have found that the image signal processing device described in the "BACKGROUND ART" section has the following problem.

The image signal processing device disclosed in Unexamined Japanese Patent Publication No. 2008-167418 calculates, for each pixel, a linear luminance based on linear RGB values calculated from pixels forming a subject, calculates a corrected linear luminance for each pixel and a corrected linear RGB value of combined pixels where a plurality of pixels including the pixel are combined together, based on the linear RGB values and the linear luminances, and calculates a display luminance and a display RGB value by performing gamma correction on the corrected linear luminance and the corrected linear RGB value. As such, the image signal processing device achieves an increase in a number of displayable gradations by correcting linear luminances based on corrected linear RGB values.

However, luminance correction (conversion) by the image signal processing device disclosed in Unexamined Japanese Patent Publication No. 2008-167418, etc., does not cover a luminance conversion method for correcting (converting) a luminance from a certain luminance range to a reduced luminance range.

The present disclosure relates to an image conversion/playback method and device for displaying an HDR (High Dynamic Range) signal which is a high luminance signal having a high luminance range, on a display device such as a TV, a projector, a tablet, or a smartphone that supports an SDR (Standard Dynamic Range) signal which is a normal luminance signal having a luminance range with a maximum luminance value of 100 nit.

[1-1. Background]

First, video technology transitions will be described with reference to FIG. 1. FIG. 1 is a diagram for describing video technology evolution.

For an achievement of a high image quality of video, primary attention has been focused on an increase in a number of display pixels so far, and video ranging from video with 720×480 pixels of Standard Definition (SD) to so-called 2K video with 1920×1080 pixels of High Definition (HD) has prevailed.

In recent years, with the aim of achieving a higher image quality of video, introduction of so-called 4K video with 3840×1920 pixels of Ultra High Definition (UHD) or with 4096×1920 pixels of 4K has started.

Then, it is considered to achieve a high image quality of video by, for example, expanding dynamic range or color gamut or adding or improving frame rate, together with an increase in video resolution by the introduction of 4K.

Among them, for the dynamic range, attention is focused on HDR (High Dynamic Range) as a method that supports a luminance range whose maximum luminance value is increased to represent bright light at brightness closer to the real one, while dark part gradations of conventional video are maintained. The bright light includes, for example, specular reflected light that cannot be represented by current TV signals. Specifically, a method for a luminance range supported by TV signals having been used so far is called SDR (Standard Dynamic Range), and has a maximum luminance value of 100 nit; on the other hand, it is assumed that a maximum luminance value of HDR is increased to 1000 nit or more. Standardization of HDR is in progress in SMPTE (Society of Motion Picture & Television Engineers), ITU-R (International Telecommunications Union Radiocommunications Sector), etc.

For specific application of HDR, as with HD and UHD, it is assumed to use HDR in broadcasting, packaged media (Blu-ray (registered trademark) Discs, etc.), Internet delivery, etc.

Note that in the following, in video that supports HDR, luminances of the video have luminance values in an HDR luminance range, and a luminance signal obtained by quantizing the luminance values of the video is called an HDR signal. In video that supports SDR, luminances of the video have luminance values in an SDR luminance range, and a luminance signal obtained by quantizing the luminance values of the video is called an SDR signal.

[1-2. Relationship Among Master Creation, Delivery Methods, and Display Devices]

Figure 2:
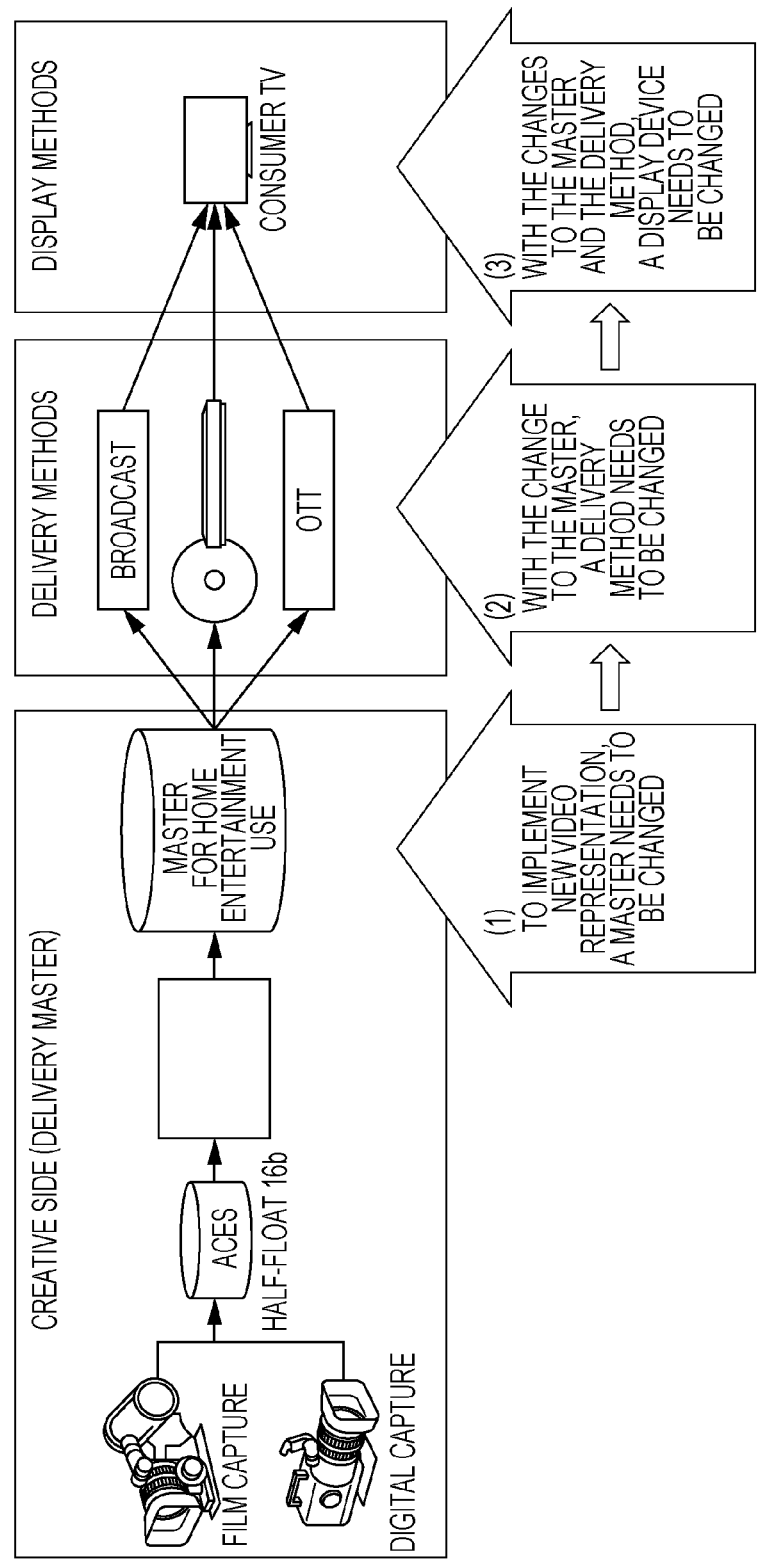
FIG. 2 is a diagram for describing a relationship among video creation, delivery methods, and display devices for when new video representation is introduced into content.

FIG. 2 is a diagram for describing a relationship among video creation, delivery methods, and display devices for when new video representation is introduced into content.

When new video representation (an increase in the number of pixels, etc.) is introduced to achieve a high image quality of video, as shown in FIG. 2, there is a need to (1) change a master for Home Entertainment use on a video creative side. Accordingly, there is also a need to update both (2) delivery methods such as broadcasting, communication, and packaged media, and (3) display devices such as a TV and a projector that display the video.

[1-3. Relationship Among a Master, Delivery Methods, and Display Devices Upon Introduction of HDR]

In order for a user to enjoy content that supports new video representation (e.g., high-luminance video content (HDR content)) at home, the user needs to newly adopt both an HDR-compatible delivery method and an HDR-compatible playback device. That is, to enjoy content that supports new video representation at home, the user needs to prepare a delivery method and a display device that support the new video representation. This fact has been unavoidable also when new video representation is introduced, such as when a transition is made from SD video to HD video, from HD video to 3D video, and from HD video to UHD (4K) video.

Hence, a change to new video representation depends on prevalence of display devices (e.g., TVs) having a new function. Such a change requires new purchases of TVs, and replacement of TVs is not easy in terms of high prices as well as size, weight, etc. Since both a medium side and a content side cannot make large investments at the beginning, in many cases, prevalence of new video representation is delayed.

Figure 3:
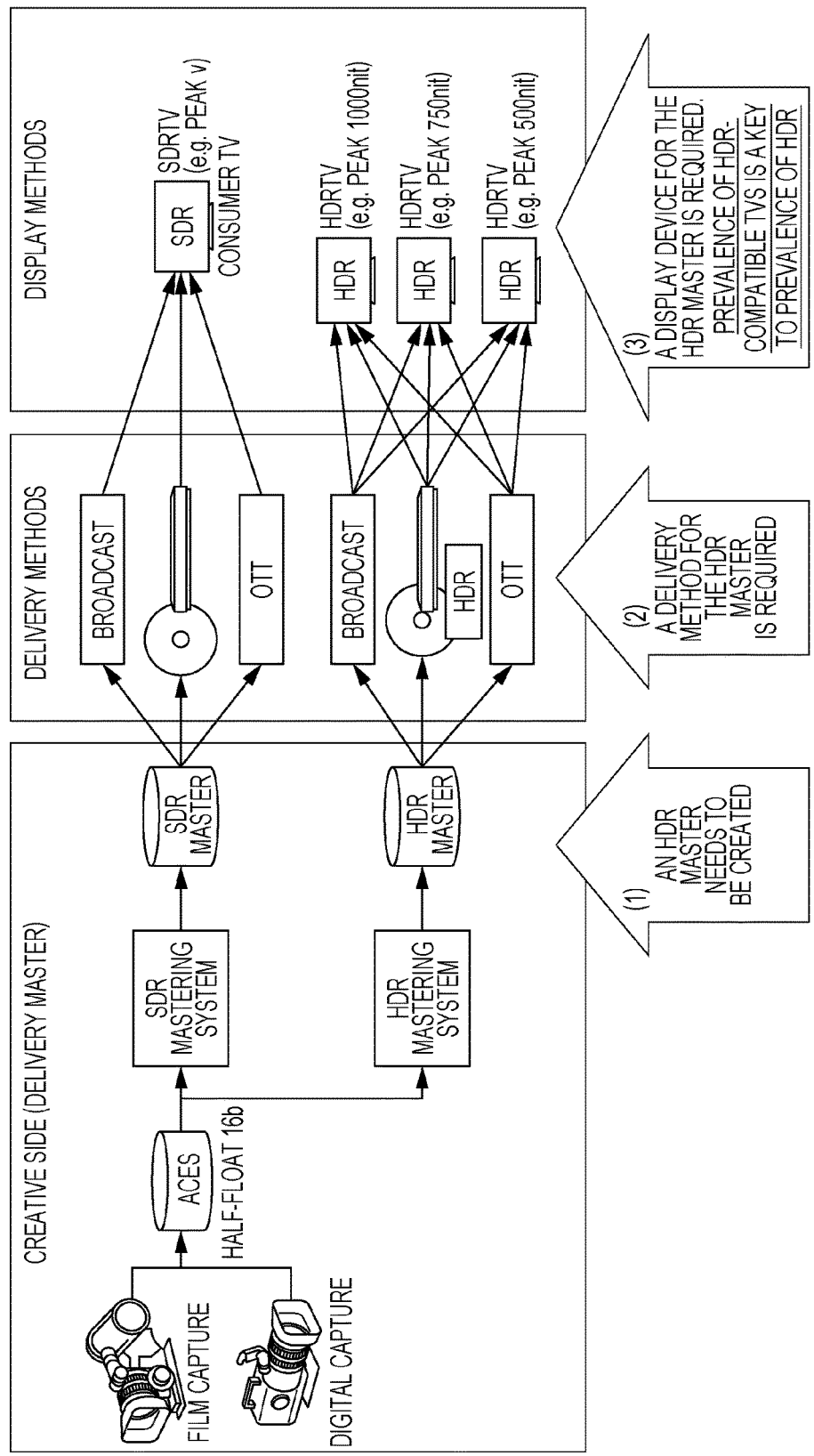
FIG. 3 is a diagram for describing a relationship among a master, delivery methods, and display devices for when HDR is introduced.

Thus, as shown in FIG. 3, for HDR, too, in order to fully make use of original video representation of HDR, it is expected that there is a need to newly purchase TVs (hereinafter, referred to as "HDRTVs") that support display of HDR-compatible video (hereinafter, referred to as "HDR display").

[1-4. SDRTV]

To a TV (hereinafter, referred to as "SDRTV") that supports only display of SDR-compatible video (hereinafter, referred to as "SDR display"), normally, an input signal with luminance values of up to 100 nit is input. Hence, if a display capability of the SDRTV is 100 nit, then it is sufficient for the SDRTV to represent the luminance values of the input signal. However, in practice, many SDRTVs have a function of playing video with optimum luminance values according to a viewing environment (a dark room: cinema mode, and a bright room: dynamic mode, etc.), and thus are capable of representing video with 200 nit or more. That is, such SDRTVs can display video with up to a maximum luminance (e.g., 300 nit) of the display capability by selecting a display mode determined according to the viewing environment.

Figure 4A:
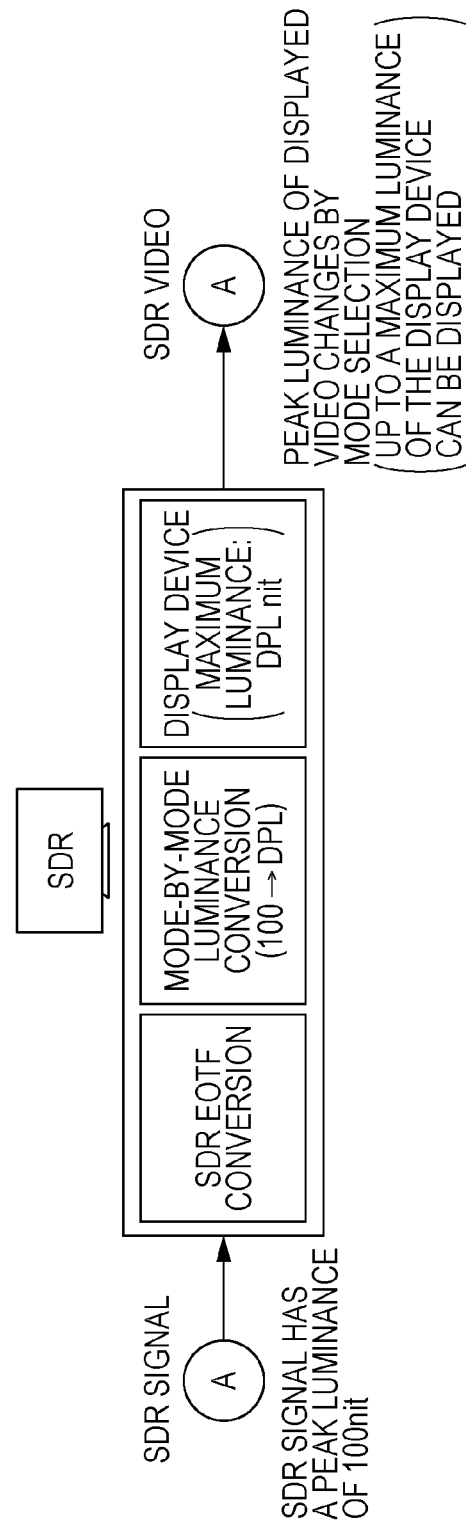
FIG. 4A is a diagram for describing an SDR display process in an SDRTV.

However, for an input signal of an SDR method to be input to the SDRTV, an upper-limit luminance of the input signal is determined to be 100 nit. Thus, it is difficult to use an SDRTV's high-luminance video playback capability which exceeds 100 nit, for playback of an HDR signal, as long as an input interface of the SDR method is used as a conventional manner (see FIGS. 4A and 4B).

[1-5. HDR→SDR Conversion]

Figure 5:
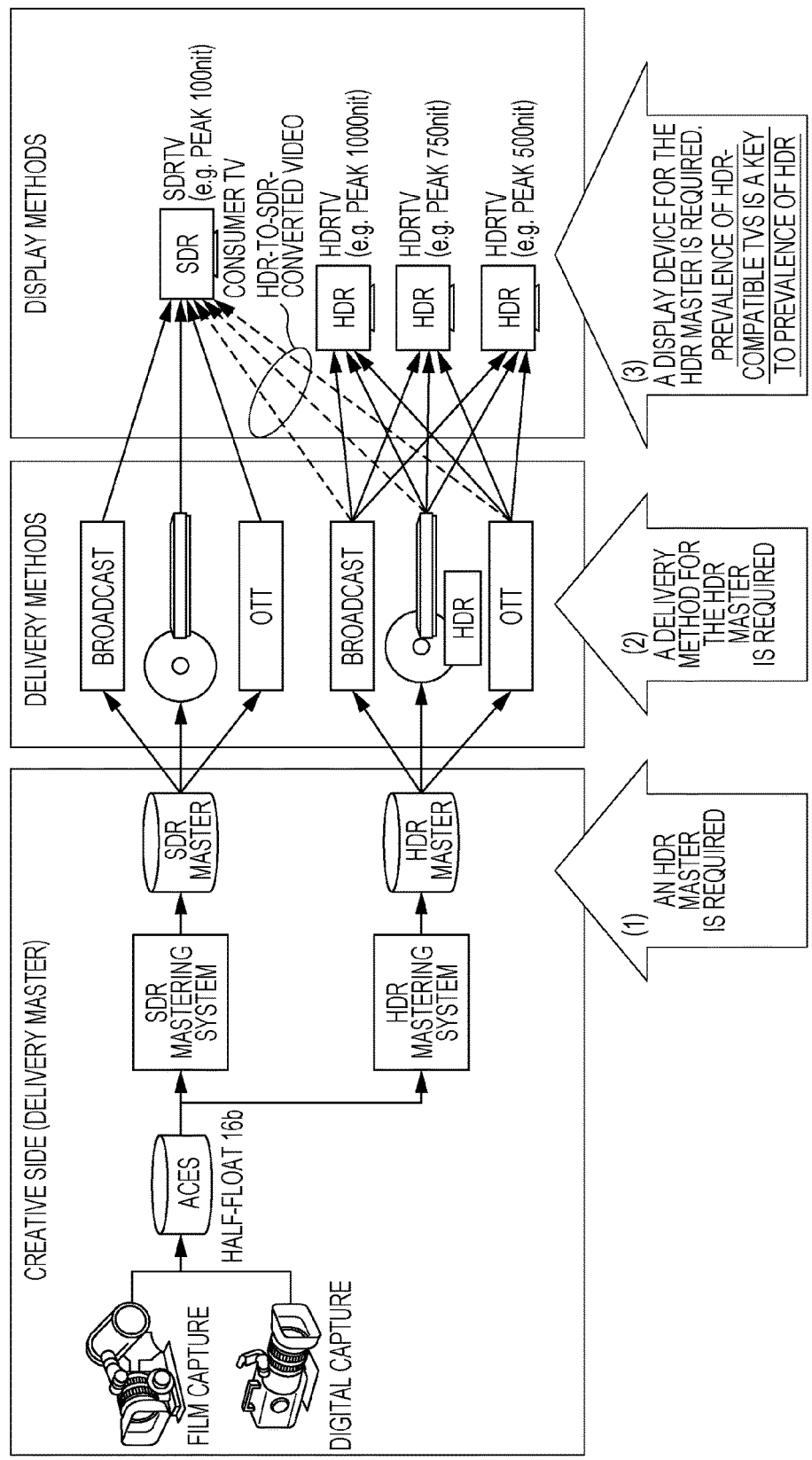
FIG. 5 is a diagram for describing conversion from HDR to SDR.

There is assumed a case in which high-luminance video content (hereinafter, also referred to as "HDR content" or "HDR video") delivered by a delivery method, such as moving image delivery through HDR-compatible broadcasting or communication network, or an HDR-compatible packaged medium (e.g., an HDR-compatible Blu-ray (registered trademark) Disc), is output by an SDRTV through an HDR-compatible playback device (e.g., a communication STB (Set Top Box), a Blu-ray (registered trademark) device, or an IPTV playback device). In a case of playing the HDR content on the SDRTV, in order that the SDRTV can properly display video, "HDR SDR conversion" is implemented where an HDR signal that supports HDR is converted to an SDR signal with the SDR luminance range with a maximum value of 100 nit. By this, the SDRTV can perform, using the converted SDR signal, display of SDR video which is obtained by conversion from HDR video (see FIG. 5).

Note, however, that in this case, too, despite the fact that a user has purchased HDR-compatible content (e.g., a Blu-ray (registered trademark) Disc or HDR IPTV content) and an HDR-compatible playback device (e.g., a Blu-ray (registered trademark) device or an HDR-compatible IPTV playback device), the user can only enjoy video with SDR video representation (SDR representation) on the SDRTV. That is, even if the user prepares HDR content and a playback device that supports HDR, when the user does not have a display device that supports HDR (e.g., an HDRTV) but only has an SDRTV, the user cannot view video with HDR video representation (HDR representation).

Thus, even if the user purchases HDR content and a transmission medium (playback device), unless the user prepares an HDRTV, the user does not understand a value of HDR (i.e., superiority of HDR over SDR by the fact that HDR has high image quality). As such, since the user does not understand the value of HDR unless the user has an HDRTV, it can be said that prevalence of HDR content and HDR-compatible delivery methods is determined according to HDRTV's prevalence speed.

[1-6. Two Methods that Implement HDR→SDR Conversion]

Figure 6A:
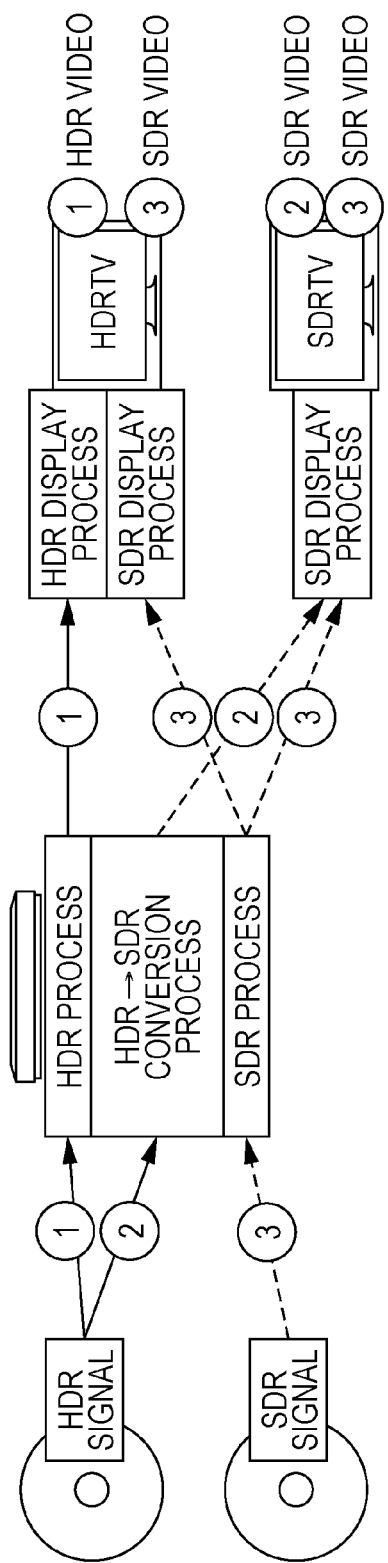
FIG. 6A is a diagram for describing Case 1 in which an HDR disc stores only an HDR signal that supports HDR.
Figure 6B:
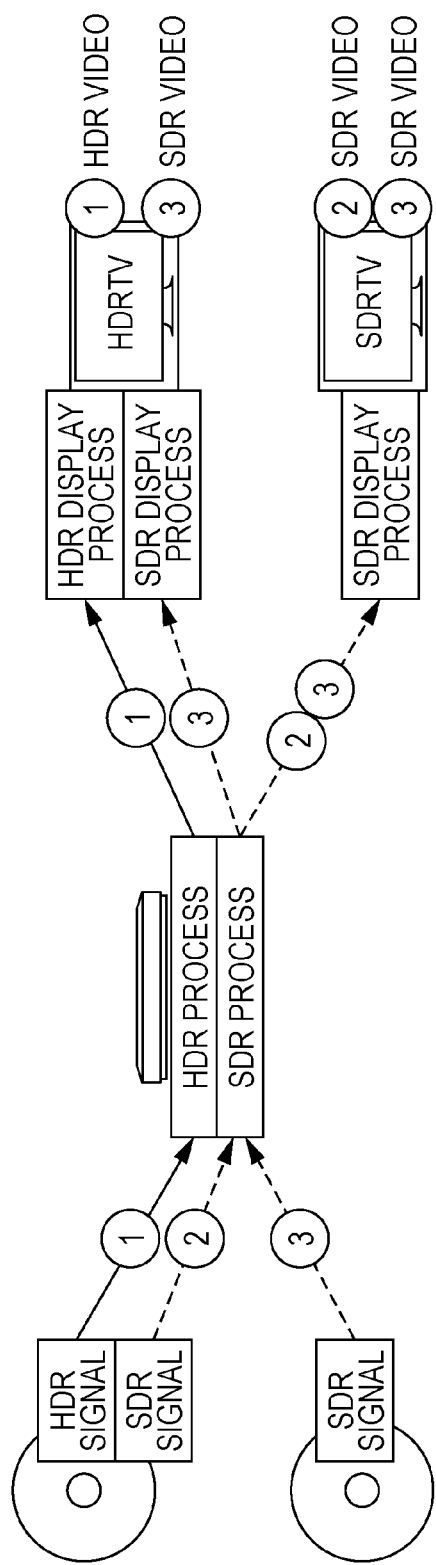
FIG. 6B is a diagram for describing Case 2 in which an HDR disc stores an HDR signal that supports HDR and an SDR signal that supports SDR.

When an HDR signal is sent to a TV using a Blu-ray (registered trademark) Disc (BD), two cases can be assumed as shown in the following FIGS. 6A and 6B. FIG. 6A is a diagram for describing Case 1 in which an HDR-compatible BD stores only an HDR signal that supports HDR. FIG. 6B is a diagram for describing Case 2 in which an HDR-compatible BD stores an HDR signal that supports HDR and an SDR signal that supports SDR.

As shown in FIG. 6A, in Case 1, in a case of allowing an HDRTV to display video obtained by playing a BD on a Blu-ray (registered trademark) device, when an HDR-compatible BD (hereinafter, referred to as "HDRBD") is played or when an SDR-compatible BD (hereinafter, referred to as "SDRBD") is played, the Blu-ray (registered trademark) device outputs to the HDRTV a luminance signal stored on the BD as it is without converting the luminance signal. Then, since the HDRTV can perform a display process on both an HDR signal and an SDR signal, the HDRTV performs a display process according to the input luminance signal, and thereby displays HDR video or SDR video.

On the other hand, in Case 1, in a case of allowing an SDRTV to display video obtained by playing a BD on the Blu-ray (registered trademark) device, when the HDRBD is played, the Blu-ray (registered trademark) device performs a conversion process of converting an HDR signal to an SDR signal, and outputs the SDR signal obtained by the conversion process to the SDRTV. In addition, when the SDRBD is played, the Blu-ray (registered trademark) device outputs to the SDRTV an SDR signal stored on the BD as it is without converting the SDR signal. By this, the SDRTV displays SDR video.

In addition, as shown in FIG. 6B, in Case 2, a case of allowing an HDRTV to display video obtained by playing a BD on the Blu-ray (registered trademark) device is the same as Case 1.

On the other hand, in Case 2, in a case of allowing an SDRTV to display video obtained by playing a BD on a Blu-ray (registered trademark) device, when an HDRBD is played or when an SDRBD is played, the Blu-ray (registered trademark) device outputs to the SDRTV an SDR signal stored on the BD as it is without converting the SDR signal.

In both Case 1 and Case 2, even when a user purchases HDRBD and a Blu-ray (registered trademark) device that supports HDR, if the user does not have an HDRTV, the user can only enjoy SDR video. Therefore, in order for the user to view HDR video, an HDRTV is required and thus prevalence of HDR-compatible Blu-ray (registered trademark) devices or HDRBDs is expected to take time.

[1-7. HDR→Pseudo-HDR Conversion]

Figure 7:
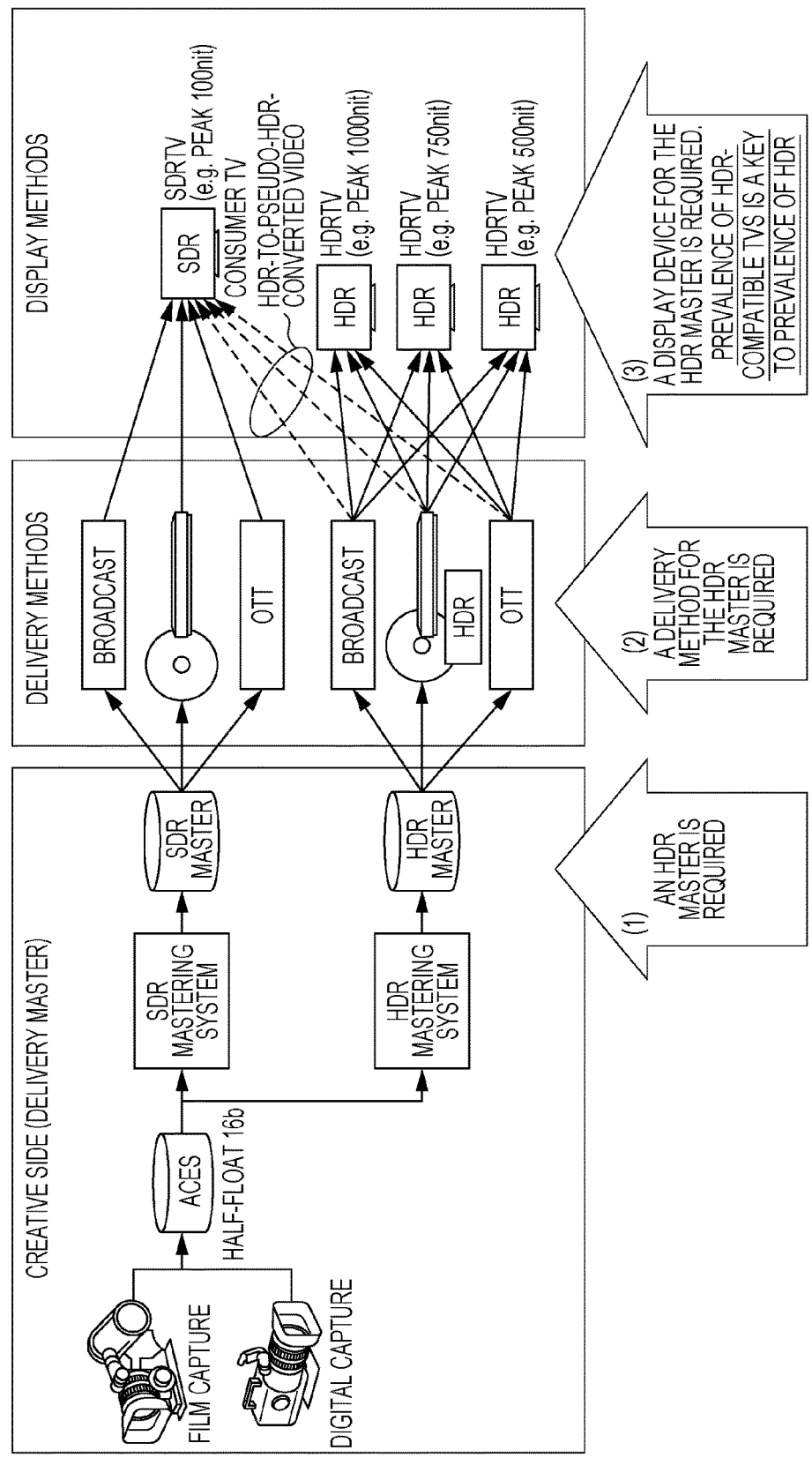
FIG. 7 is a diagram for describing a conversion process from HDR to pseudo-HDR.

From the above fact, it can be said that to promote prevalence of HDR, it is important that commercialization of HDR content and delivery methods can be promoted without waiting for prevalence of HDRTVs. To do so, if a user can be allowed to view an HDR signal on an existing SDRTV, as HDR video or pseudo-HDR video which is closer to HDR video than SDR video, instead of SDR video, then the user can view higher image quality video which is close to HDR video and obviously different from SDR video, without purchasing an HDRTV. That is, if the user can view pseudo-HDR video on the SDRTV, then it becomes possible for the user to view higher image quality video than SDR video, only by preparing HDR content and an HDR delivery device without preparing an HDRTV. In short, allowing the user to view pseudo-HDR video on the SDRTV may motivate a user to purchase HDR content and an HDR delivery device (see FIG. 7).

To implement display of pseudo-HDR video on the SDRTV, instead of converting an HDR signal to an SDR video signal, there is a need to implement an "HDR→pseudo-HDR conversion process" so that the SDRTV can properly display video of HDR content when the HDR content is played in a configuration in which the SDRTV is connected to an HDR delivery method. In the "HDR→pseudo-HDR conversion process", a pseudo-HDR signal for displaying video with a maximum luminance of an SDRTV's display capability, e.g., 200 nit or more, is generated using an input of a video signal with a maximum value of 100 nit of the SDRTV, and the generated pseudo-HDR signal can be sent to the SDRTV.

[1-8. For EOTFs]

Now, EOTFs will be described with reference to FIGS. 8A and 8B.

Figure 8A:
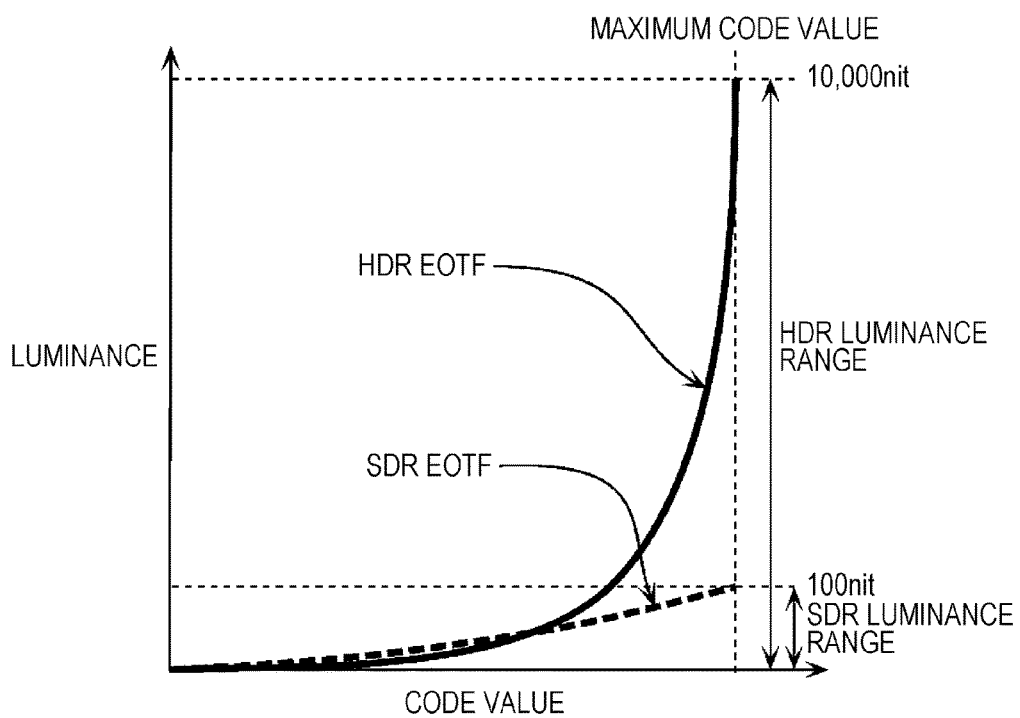
FIG. 8A is a diagram showing examples of EOTFs (Electro-Optical Transfer Functions) for HDR and SDR.

FIG. 8A is a diagram showing examples of EOTFs (Electro-Optical Transfer Functions) for HDR and SDR.

An EOTF is generally called a gamma curve, and represents a correspondence between a code value and a luminance value, and is to convert a code value to a luminance value. That is, the EOTF is relationship information indicating a correspondence relationship between a plurality of code values and luminance values.

Figure 8B:
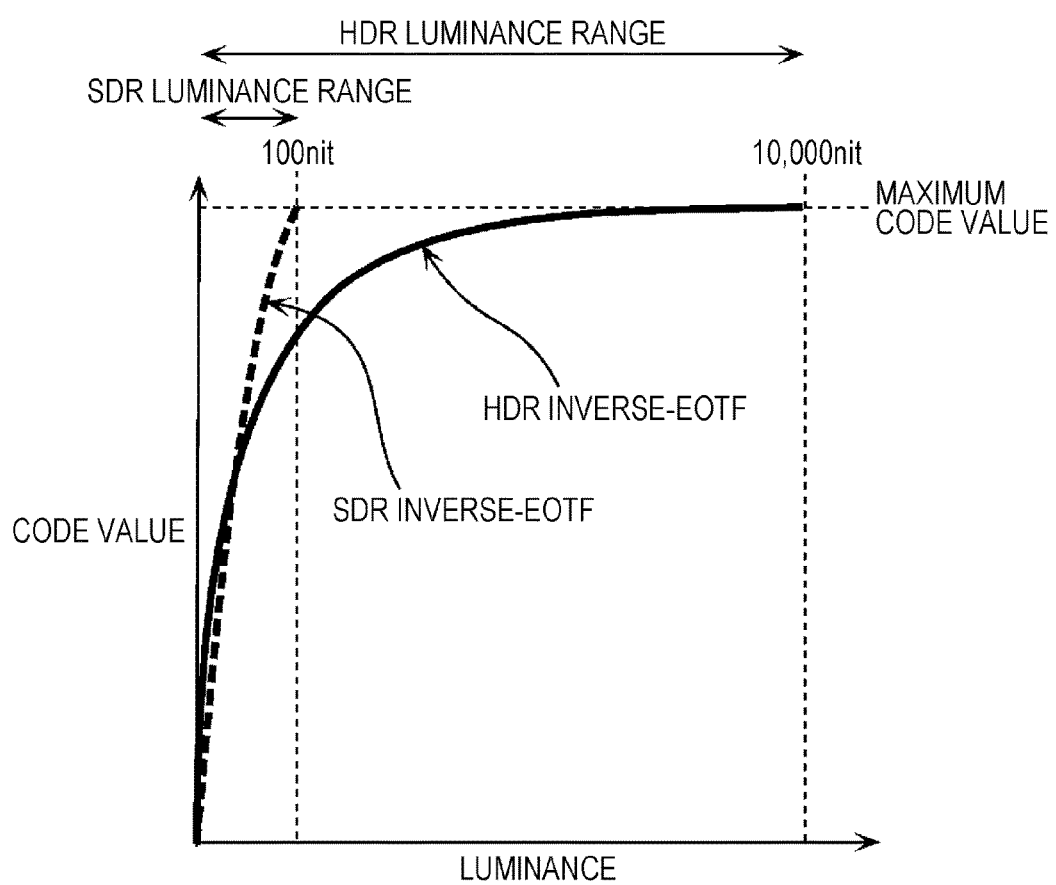
FIG. 8B is a diagram showing examples of inverse EOTFs for HDR and SDR.

In addition, FIG. 8B is a diagram showing examples of inverse EOTFs for HDR and SDR.

An inverse EOTF represents a correspondence between a luminance value and a code value, and is to convert a luminance value to a code value by quantizing the luminance value, which is the other way around from the EOTF. That is, the inverse EOTF is relationship information indicating a correspondence relationship between luminance values and a plurality of code values. For example, in a case of representing luminance values of video that supports HDR by 10-bit gradation code values, luminance values in an HDR luminance range of up to 10,000 nit are quantized and mapped to 1024 integer values ranging from 0 to 1023. That is, by performing quantization based on the inverse EOTF, the luminance values in the luminance range of up to 10,000 nit (the luminance values of video that supports HDR) are converted to an HDR signal having 10-bit code values. An EOTF for HDR (hereinafter, referred to as "HDR EOTF") or an inverse EOTF for HDR (hereinafter, referred to as "HDR inverse-EOTF") can represent higher luminance values than an EOTF for SDR (hereinafter, referred to as "SDR EOTF") or an inverse EOTF for SDR (hereinafter, referred to as "SDR inverse-EOTF"). For example, in FIGS. 8A and 8B, a maximum value of luminance (peak luminance) is 10,000 nit. That is, the HDR luminance range includes the whole SDR luminance range, and an HDR peak luminance is higher than an SDR peak luminance. The HDR luminance range is a luminance range where a maximum value is increased from 100 nit which is a maximum value of the SDR luminance range, to 10,000 nit.

For example, an example of the HDR EOTF and the HDR inverse-EOTF includes SMPTE 2084 standardized by the Society of Motion Picture and Television Engineers (SMPTE).

Note that in the following specification a luminance range from 0 nit to 100 nit (peak luminance) which is described in FIGS. 8A and 8B may be described as a first luminance range. Likewise, a luminance range from 0 nit to 10,000 nit (peak luminance) which is described in FIGS. 8A and 8B may be described as a second luminance range.

[1-9. How to Use the EOTFs]

FIG. 9 is an illustrative diagram of a method for determining a code value of a luminance signal stored in content, and a process of restoring a luminance value from a code value upon playback.

A luminance signal representing luminances in the present example is an HDR signal that supports HDR. An image obtained after grading is quantized by the HDR inverse-EOTF, by which code values corresponding to luminance values of the image are determined. Image coding, etc., are performed based on the code values, by which a video stream is generated. Upon playback, decoding results of the stream are inversely quantized based on the HDR EOTF and are thereby converted to a linear signal, and a luminance value for each pixel is restored. Quantization using the HDR inverse-EOTF is hereinafter referred to as "inverse HDR EOTF conversion". Inverse quantization using the HDR EOTF is referred to as "HDR EOTF conversion". Likewise, quantization using the SDR inverse-EOTF is referred to as "inverse SDR EOTF conversion". Inverse quantization using the SDR EOTF is referred to as "SDR EOTF conversion".

[1-10. Necessity of Pseudo-HDR]

Next, necessity of pseudo-HDR will be described with reference to FIGS. 10A to 10C.

FIG. 10A is a diagram showing an example of a display process of performing HDR display by converting an HDR signal in an HDRTV.

As shown in FIG. 10A, in a case of displaying HDR video, even if a display device is an HDRTV, the display device may not be able to display a maximum value of the HDR luminance range (peak luminance (HPL (HDR Peak Luminance): e.g., 1500 nit)) as it is. In this case, luminance conversion is performed to adjust a linear signal obtained after performing inverse quantization using the HDR EOTF, to a maximum value of a luminance range of the display device (peak luminance (DPL (Display Peak Luminance): e.g., 750 nit)). Then, by inputting a video signal obtained by performing the luminance conversion to the display device, the display device can display HDR video that is adjusted to the luminance range with the maximum value which is the highest possible value of the display device.

Figure 10B:
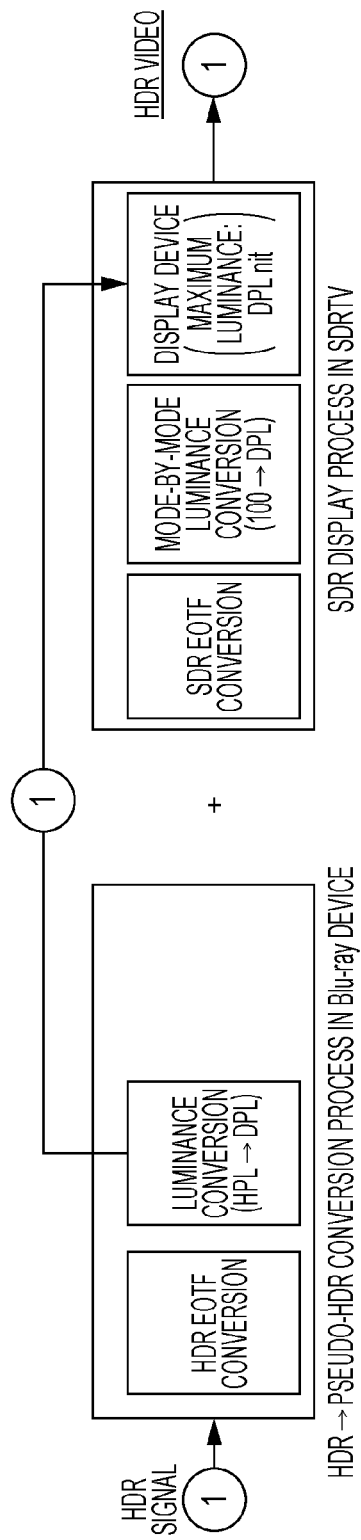
FIG. 10B is a diagram showing an example of a display process of performing HDR display using an HDR-compatible playback device and an SDRTV.

FIG. 10B is a diagram showing an example of a display process of performing HDR display using an HDR-compatible playback device and an SDRTV.

As shown in FIG. 10B, in a case of displaying HDR video with a display device being an SDRTV, by using a fact that a maximum value of a luminance range (peak luminance (DPL: e.g., 300 nit)) of the SDRTV that performs display exceeds 100 nit, "HDR EOTF conversion" and "luminance conversion" which are performed in an HDRTV are performed in an "HDR pseudo-HDR conversion process" in the HDR-compatible playback device (Blu-ray (registered trademark) device) in FIG. 10B. The "luminance conversion" uses the DPL (e.g., 300 nit) which is the maximum value of the luminance range of the SDRTV. If a signal obtained by performing the "luminance conversion" can be directly input to a "display device" of the SDRTV, then even with the use of the SDRTV, the same effect as that obtained by the HDRTV can be achieved.

However, since the SDRTV does not have any means for directly accepting as input such a signal from an external source, the same effect cannot be achieved.

Figure 10C:
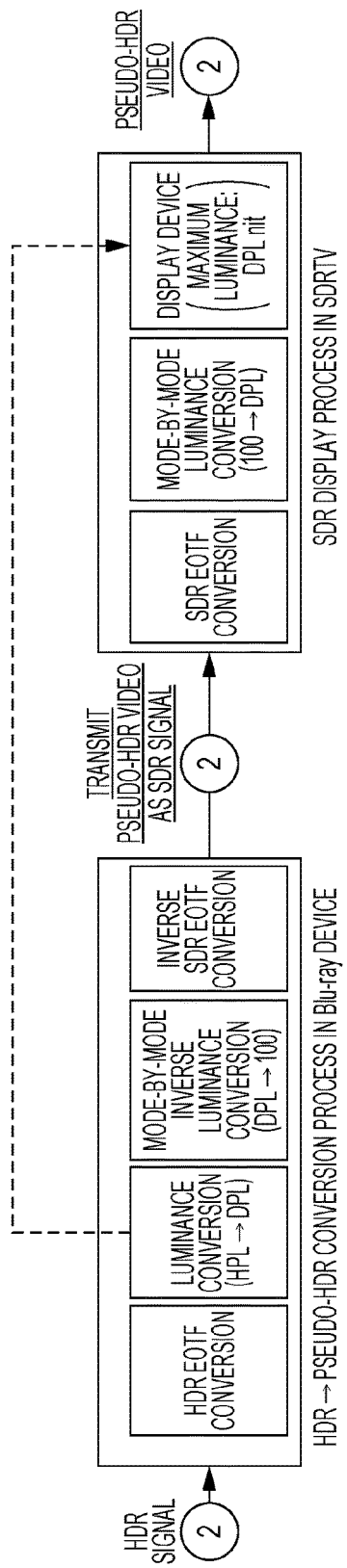
FIG. 10C is a diagram showing an example of a display process of performing HDR display using an HDR-compatible playback device and an SDRTV which are connected to each other through a standard interface.

FIG. 10C is a diagram showing an example of a display process of performing HDR display using an HDR-compatible playback device and an SDRTV which are connected to each other through a standard interface.

As shown in FIG. 10C, normally, there is a need to input such a signal that can obtain the effect of FIG. 10B to the SDRTV, using an input interface (HDMI (registered trademark), etc.) included in the SDRTV. On the SDRTV, the signal having been input through the input interface passes through "SDR EOTF conversion", "mode-by-mode luminance conversion", and a "display device" in this order, and video that is adjusted to a luminance range with a maximum value of the display device is displayed. Hence, an HDR-compatible Blu-ray (registered trademark) device generates such a signal (pseudo-HDR signal) that can cancel out the "SDR EOTF conversion" and the "mode-by-mode luminance conversion" through which the signal passes immediately after the input interface on the SDRTV. That is, in the HDR-compatible Blu-ray (registered trademark) device, "mode-by-mode inverse luminance conversion" and "inverse SDR EOTF conversion" are performed immediately after "HDR EOTF conversion" and "luminance conversion" that uses a peak luminance (DPL) of the SDRTV. By this, the same effect as that achieved when a signal obtained immediately after the "luminance conversion" is input to the "display device" (a dashed line arrow in FIG. 10C) is achieved in a pseudo manner.

[1-11. Conversion Device and Display Device]

Figure 11:
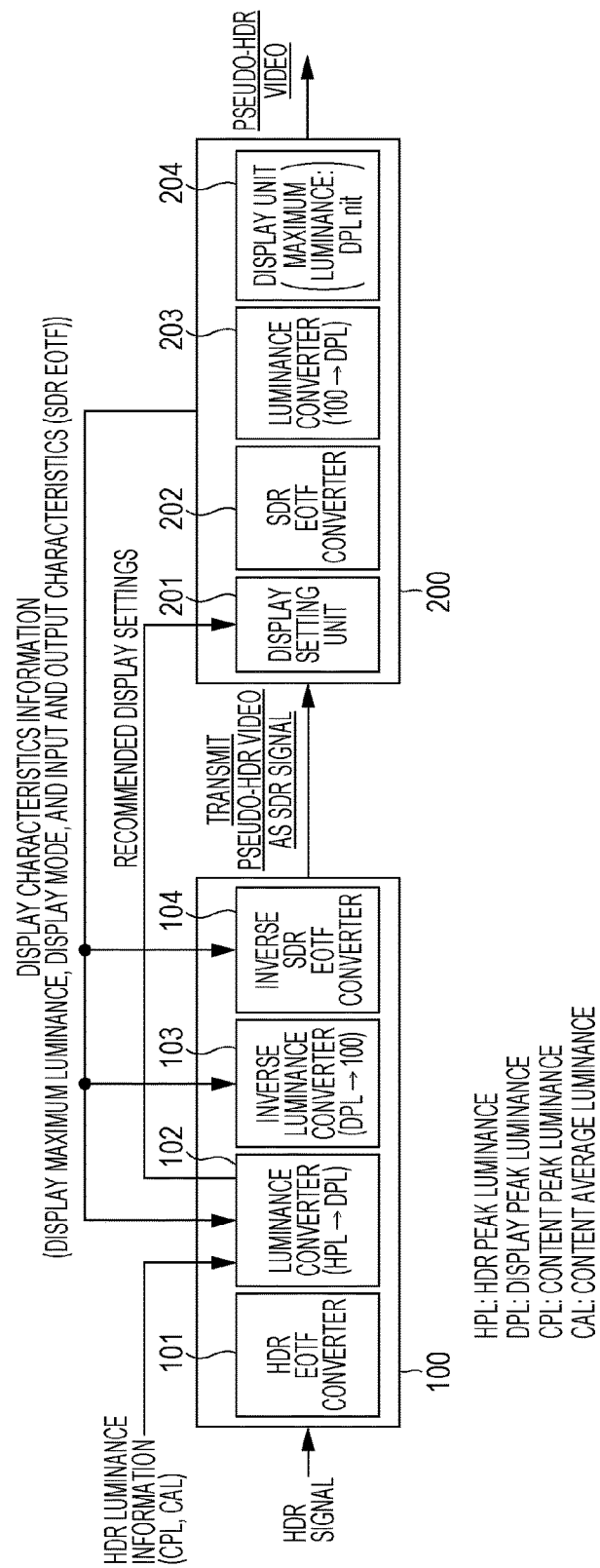
FIG. 11 is a block diagram showing configurations of a conversion device and a display device of an exemplary embodiment.
Figure 12:
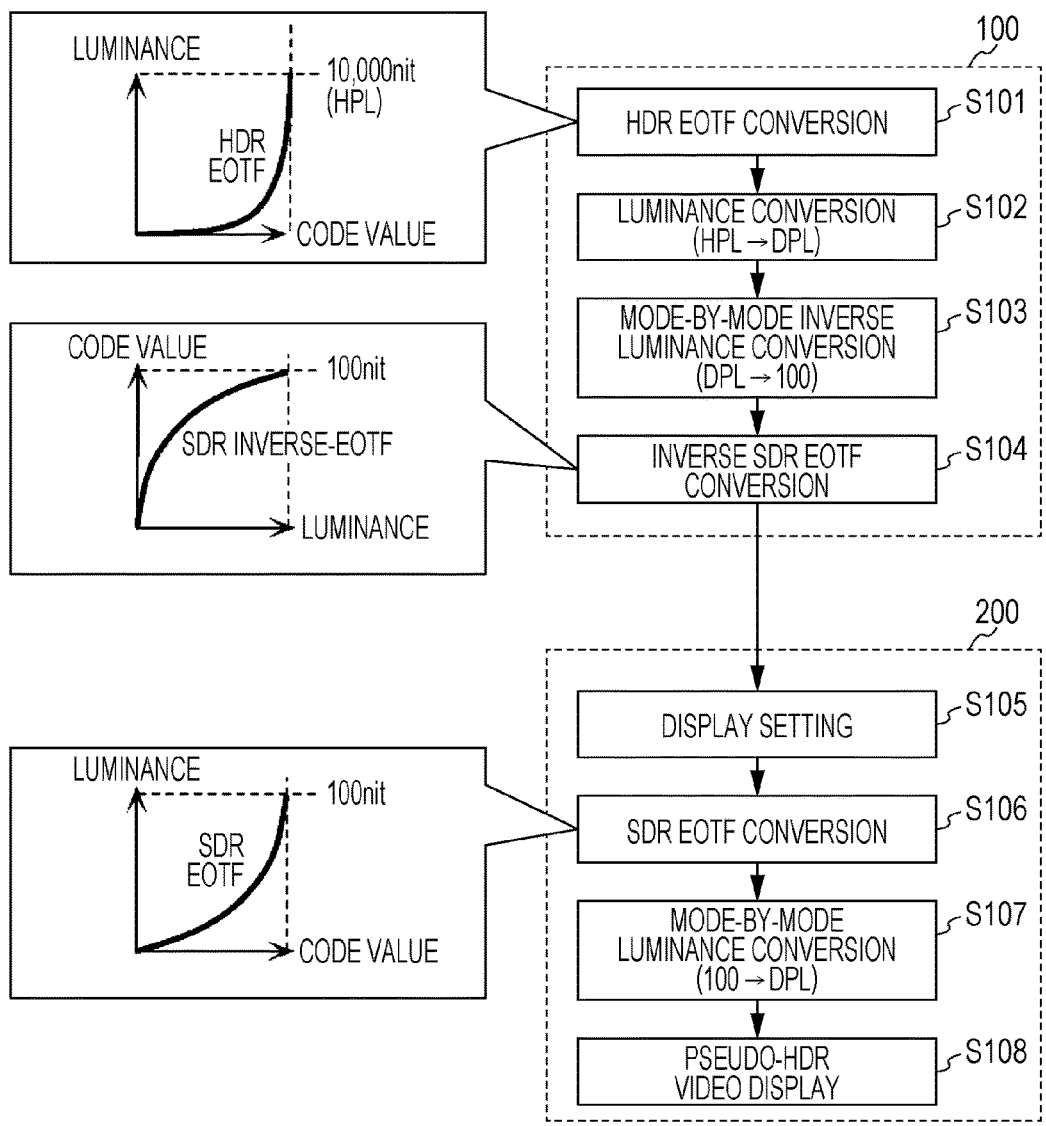
FIG. 12 is flowcharts showing a conversion method and a display method which are performed by the conversion device and the display device of the exemplary embodiment.

FIG. 11 is a block diagram showing configurations of a conversion device and a display device of the exemplary embodiment. FIG. 12 is flowcharts showing a conversion method and a display method which are performed by the conversion device and the display device of the exemplary embodiment.

As shown in FIG. 11, conversion device 100 includes HDR EOTF converter 101, luminance converter 102, inverse luminance converter 103, and inverse SDR EOTF converter 104. In addition, display device 200 includes display setting unit 201, SDR EOTF converter 202, luminance converter 203, and display unit 204.

Detailed description of each component of conversion device 100 and display device 200 will be made in description of a conversion method and a display method.

[1-12. Conversion Method and Display Method]

A conversion method performed by conversion device 100 will be described with reference to FIG. 12. Note that the conversion method includes steps S101 to S104 which will be described below.

First, HDR EOTF converter 101 of conversion device 100 obtains HDR video having been subjected to inverse HDR EOTF conversion. HDR EOTF converter 101 of conversion device 100 performs HDR EOTF conversion on an HDR signal of the obtained HDR video (S101). By this, HDR EOTF converter 101 converts the obtained HDR signal to a linear signal representing luminance values. An example of an HDR EOTF includes SMPTE 2084.

Then, luminance converter 102 of conversion device 100 performs first luminance conversion of converting the linear signal converted by HDR EOTF converter 101, using display characteristics information and content luminance information (S102). In the first luminance conversion, the luminance values set in the HDR luminance range (hereinafter, referred to as "HDR luminance values") are converted to luminance values set in a display luminance range (hereinafter, referred to as "display luminance values"). Details will be described later.

From the above-described fact, HDR EOTF converter 101 functions as an obtainer that obtains an HDR signal serving as a first luminance signal that represents code values obtained by quantizing luminance values of video. In addition, HDR EOTF converter 101 and luminance converter 102 function as a converter that converts the code values represented by the HDR signal which is obtained by the obtainer, to display luminance values set in the display luminance range with a maximum value (DPL) which is smaller than a maximum value of the HDR luminance range (HPL) and larger than 100 nit. The display luminance range is determined based on a luminance range of the display (display device 200).

More specifically, at step S101, for HDR code values serving as first code values represented by the obtained HDR signal, HDR EOTF converter 101 determines HDR luminance values which are associated with the HDR code values in the HDR EOTF, using the obtained HDR signal and the HDR EOTF. Note that the HDR signal represents HDR code values obtained by quantizing luminance values of video (content), using an HDR inverse-EOTF where luminance values in the HDR luminance range are associated with a plurality of HDR code values.

In addition, at step S102, luminance converter 102 performs first luminance conversion of converting the HDR luminance values set in the HDR luminance range to display luminance values set in the display luminance range, by determining, for the HDR luminance values determined at step S101, display luminance values set in the display luminance range which are associated in advance with the HDR luminance values.

In addition, prior to step S102, conversion device 100 obtains, as information about the HDR signal, content luminance information including at least one of a maximum luminance value of the video (content) (CPL: Content Peak Luminance) and an average luminance value of the video (CAL: Content Average Luminance). The CPL (first maximum luminance value) is, for example, a maximum value of luminance values of a plurality of images forming HDR video. In addition, the CAL is, for example, an average luminance value which is an average of the luminance values of the plurality of images forming the HDR video.

In addition, prior to step S102, conversion device 100 obtains display characteristics information of display device 200 from display device 200. Note that the display characteristics information is information indicating display characteristics of display device 200, such as a maximum value of luminance (DPL) that can be displayed by display device 200, a display mode of display device 200 (see description made later), and input and output characteristics (EOTF supported by the display device).

In addition, conversion device 100 may transmit recommended display setting information (see description made later; hereinafter, also referred to as "setting information") to display device 200.

Then, inverse luminance converter 103 of conversion device 100 performs inverse luminance conversion determined according to the display mode of display device 200. By this, inverse luminance converter 103 performs second luminance conversion of converting the luminance values set in the display luminance range to luminance values set in the SDR luminance range (0 to 100 [nit]) (S103). Details will be described later. Specifically, inverse luminance converter 103 performs second luminance conversion of converting the display luminance values set in the display luminance range to SDR luminance values set in the SDR luminance range, by determining, for the display luminance values obtained at step S102, SDR-compatible luminance values (hereinafter, referred to as "SDR luminance values") SDR luminance values serving as third luminance values set in the SDR luminance range with a maximum value of 100 nit, which are associated in advance with the display luminance values.

Then, inverse SDR EOTF converter 104 of conversion device 100 performs inverse SDR EOTF conversion and thereby generates pseudo-HDR video (S104). Specifically, inverse SDR EOTF converter 104 quantizes the determined SDR luminance values, using an SDR (Standard Dynamic Range) inverse-EOTF (Electro-Optical Transfer Function) which is third relationship information where the luminance values in the HDR luminance range are associated with a plurality of third code values, determines third code values obtained by the quantization, and converts the SDR luminance values set in the SDR luminance range to an SDR signal serving as a third luminance signal that represents the third code values, and thereby generates a pseudo-HDR signal. Note that the third code values are SDR-compatible code values and are hereinafter referred to as "SDR code values". That is, the SDR signal is represented by SDR code values obtained by quantizing the luminance values of the video using the SDR inverse-EOTF where the luminance values in the SDR luminance range are associated with a plurality of SDR code values. Then, conversion device 100 outputs the pseudo-HDR signal (SDR signal) generated at step S104 to display device 200.

Conversion device 100 performs first luminance conversion and second luminance conversion on HDR luminance values which are obtained by inversely quantizing an HDR signal, and thereby generates SDR luminance values that support pseudo-HDR. Then, conversion device 100 quantizes the SDR luminance values using the SDR EOTF, and thereby generates an SDR signal that supports pseudo-HDR. Note that the SDR luminance values are numerical values in an SDR-compatible luminance range of 0 nit to 100 nit, but since conversion based on the display luminance range has been performed, the SDR luminance values are numerical values different than luminance values in the SDR-compatible luminance range of 0 nit to 100 nit, which are obtained by performing luminance conversion on the HDR luminance values using the HDR EOTF and the SDR EOTF.

Next, a display method performed by display device 200 will be described with reference to FIG. 12. Note that the display method includes steps S105 to S108 which will be described below.

First, display setting unit 201 of display device 200 sets display settings of display device 200, using setting information obtained from conversion device 100 (S105). Here, display device 200 is an SDRTV. The setting information is information indicating display settings to be recommended to the display device, and is information indicating how pseudo-HDR video should be subjected to an EOTF and what settings the pseudo-HDR video should be displayed with, to display beautiful video (i.e., information for switching the display settings of display device 200 to optimal display settings). The setting information includes, for example, a gamma curve characteristic for output of the display device, a display mode such as living mode (normal mode) or dynamic mode, and a numerical value of a backlight (brightness). In addition, a message urging a user to change the display settings of display device 200 by a manual operation may be displayed on display device 200 (hereinafter, also referred to as "SDR display"). Details will be described later.

Note that prior to step S105 display device 200 obtains an SDR signal (pseudo-HDR signal) and setting information indicating display settings to be recommended to display device 200 for video display.

In addition, display device 200 only needs to obtain an SDR signal (pseudo-HDR signal) before step S106 and thus may obtain an SDR signal (pseudo-HDR signal) after step S105.

Then, SDR EOTF converter 202 of display device 200 performs SDR EOTF conversion on the obtained pseudo-HDR signal (S106). Specifically, SDR EOTF converter 202 inversely quantizes the SDR signal (pseudo-HDR signal) using an SDR EOTF. By this, SDR EOTF converter 202 converts SDR code values represented by the SDR signal to SDR luminance values.

Then, luminance converter 203 of display device 200 performs luminance conversion determined according to the display mode set on display device 200. By this, luminance converter 203 performs third luminance conversion of converting the SDR luminance values set in the SDR luminance range (0 to 100 [nit]) to display luminance values set in the display luminance range (0 to DPL [nit]) (S107). Details will be described later.

By the above-described processes, at steps S106 and S107, display device 200 converts third code values represented by the obtained SDR signal (pseudo-HDR signal) to display luminance values set in the display luminance range (0 to DPL [nit]), using the setting information obtained at step S105.

More specifically, in conversion from the SDR signal (pseudo-HDR signal) to display luminance values, at step S106, for SDR code values represented by the obtained SDR signal, using an EOTF where the luminance values in the SDR luminance range are associated with a plurality of third code values, SDR luminance values associated with the SDR code values in the SDR EOTF are determined.

Then, in conversion to display luminance values, at step S107, third luminance conversion of converting the SDR luminance values set in the SDR luminance range to display luminance values set in the display luminance range is performed by determining display luminance values set in the display luminance range which are associated in advance with the determined SDR luminance values.

Finally, display unit 204 of display device 200 displays pseudo-HDR video on display device 200 based on the converted display luminance values (S108).

[1-13. First Luminance Conversion]

Figure 13A:
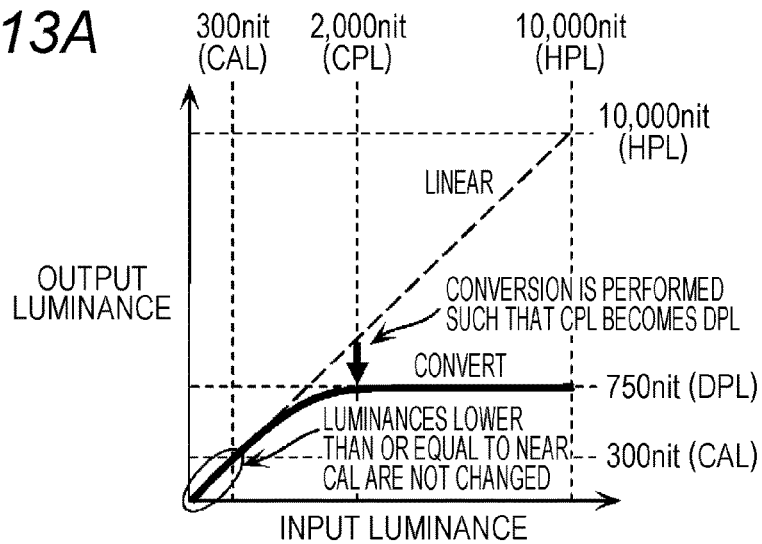
FIG. 13A is a diagram for describing first luminance conversion.

Next, details of the first luminance conversion (HPL DPL) at step S102 will be described with reference to FIG. 13A. FIG. 13A is a diagram for describing an example of the first luminance conversion.

Luminance converter 102 of conversion device 100 performs first luminance conversion of converting a linear signal (HDR luminance values) obtained at step S101, using display characteristics information and content luminance information of HDR video. In the first luminance conversion, the HDR luminance values (input luminance values) are converted to display luminance values (output luminance values) that do not exceed a display peak luminance (DPL). The DPL is determined using a maximum luminance and a display mode of the SDR display which are display characteristics information. The display mode is, for example, mode information such as theater mode in which darker display is performed on the SDR display, and dynamic mode in which brighter display is performed. For the display mode, for example, when the maximum luminance of the SDR display is 1,500 nit and the display mode sets such brightness that is 50% of the maximum luminance, the DPL is 750 nit. Here, the DPL (second maximum luminance value) is a maximum value of luminance that can be displayed by the SDR display in the currently set display mode. That is, in the first luminance conversion, the DPL serving as the second maximum luminance value is determined using the display characteristics information which is information indicating display characteristics of the SDR display.

In addition, in the first luminance conversion, a CAL and a CPL included in the content luminance information are used, and luminance values smaller than or equal to near the CAL are left unchanged before and after the conversion, and only luminance values larger than or equal to near the CPL are changed. Specifically, as shown in FIG. 13A, in the first luminance conversion, when the HDR luminance value is smaller than or equal to the CAL, the HDR luminance value is not converted and is determined to be a display luminance value. When the HDR luminance value is larger than or equal to the CPL, the DPL serving as the second maximum luminance value is determined to be a display luminance value.

In addition, in the first luminance conversion, a peak luminance of the HDR video (CPL) included in the luminance information is used. When an HDR luminance value is the CPL, the DPL is determined to be a display luminance value.

Figure 13B:
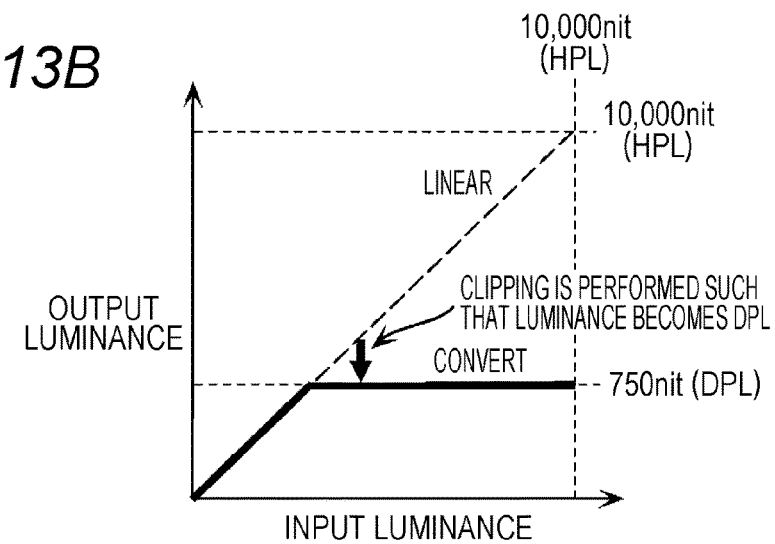
FIG. 13B is a diagram for describing another example of the first luminance conversion.

Note that in the first luminance conversion, as shown in FIG. 13B, the linear signal (HDR luminance values) obtained at step S101 may be converted such that the HDR luminance values are clipped to values not exceeding the DPL. By performing such luminance conversion, processes of conversion device 100 can be simplified, enabling to achieve downsizing, a reduction in power, and an increase in processing speed of the device. Note that FIG. 13B is a diagram for describing another example of the first luminance conversion.

[1-14. Second Luminance Conversion]

Figure 14:
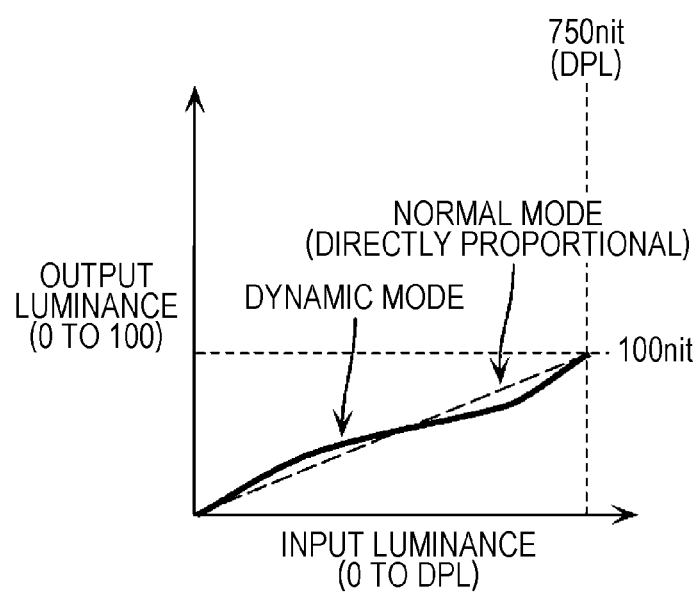
FIG. 14 is a diagram for describing second luminance conversion.

Next, details of the second luminance conversion (DPL→100 [nit]) at step S103 will be described with reference to FIG. 14. FIG. 14 is a diagram for describing the second luminance conversion.

Inverse luminance converter 103 of conversion device 100 performs, according to a display mode, inverse luminance conversion on the display luminance values in the display luminance range (0 to DPL [nit]) which are converted by the first luminance conversion at step S102. The inverse luminance conversion is a process performed so that display luminance values in the display luminance range (0 to DPL [nit]) obtained after the process at step S102 can be obtained, when a luminance conversion process according to the display mode (step S107) by the SDR display is performed. That is, the second luminance conversion is inverse luminance conversion of the third luminance conversion.

By the above-described process, in the second luminance conversion, the display luminance values (input luminance values) in the display luminance range are converted to SDR luminance values (output luminance values) in the SDR luminance range.

In the second luminance conversion, a conversion formula is switched according to the display mode of the SDR display. For example, when the display mode of the SDR display is normal mode, luminances are converted to directly proportional values which are directly proportional to the display luminance values. In addition, in the second luminance conversion, when the display mode of the SDR display is dynamic mode that makes high luminance pixels brighter than in normal mode and makes low luminance pixels darker than in normal mode, by using an inverse function, luminance conversion is performed such that an SDR luminance value of a low luminance pixel is converted to a higher value than a directly proportional value which is directly proportional to a display luminance value, and an SDR luminance value of a high luminance pixel is converted to a lower value than a directly proportional value which is directly proportional to a display luminance value. That is, in the second luminance conversion, for the display luminance values determined at step S102, luminance values associated with the display luminance values are determined to be SDR luminance values, using luminance relationship information generated according to display characteristics information which is information indicating the display characteristics of the SDR display, and the luminance conversion process is switched according to the display characteristics information. Here, the luminance relationship information generated according to display characteristics information is, for example, information where display luminance values (input luminance values) are associated with SDR luminance values (output luminance values). The luminance relationship information is set for each display parameter (display mode) of the SDR display, such as that shown in FIG. 14.

[1-15. Display Setting]

Figure 15:
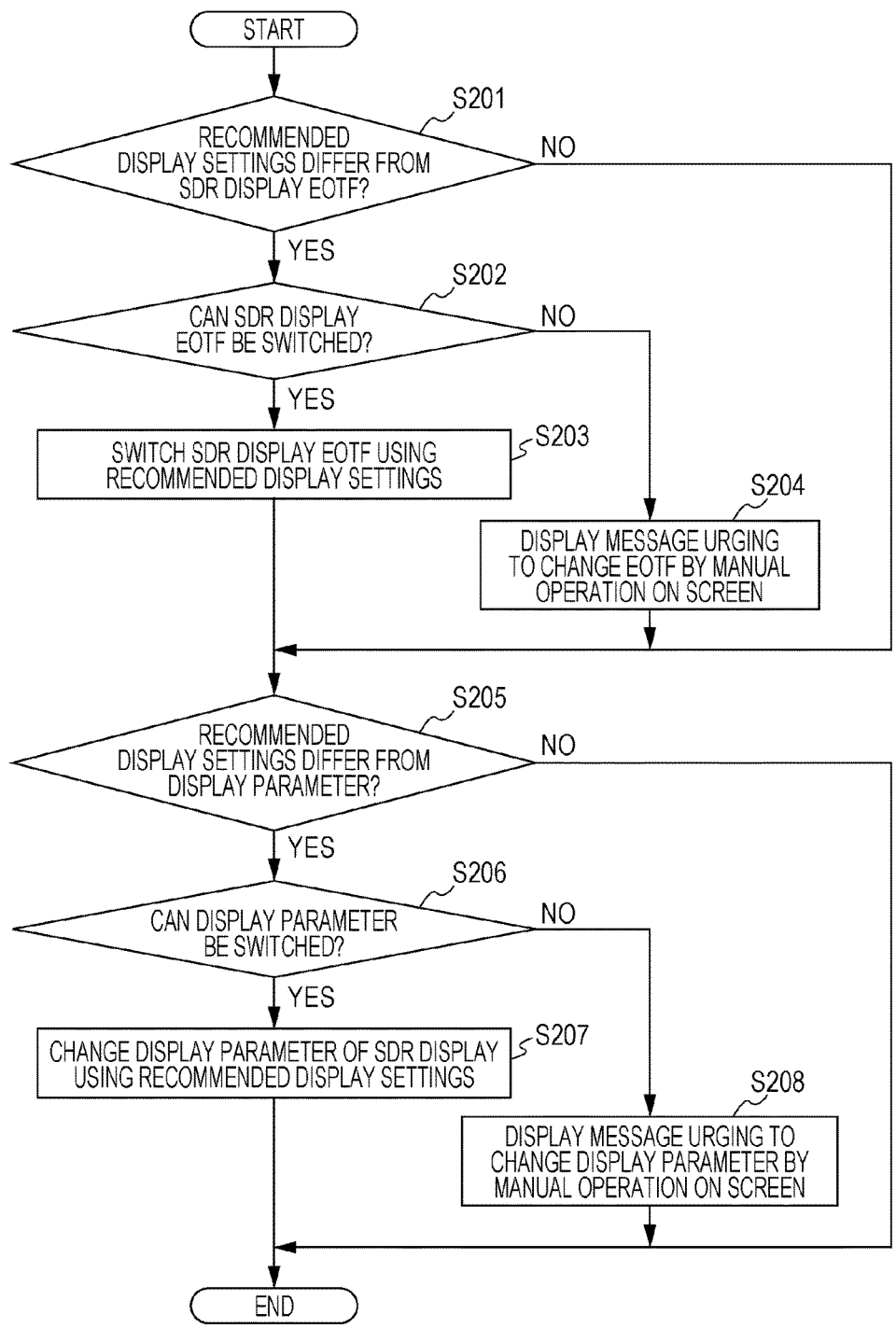
FIG. 15 is a flowchart showing a detailed process for display setting.

Next, details of display setting at step S105 will be described with reference to FIG. 15. FIG. 15 is a flowchart showing a detailed process for display setting.

At step S105, display setting unit 201 of the SDR display performs the following processes at steps S201 to S208.

First, display setting unit 201 determines, using setting information, whether an EOTF set on the SDR display (SDR display EOTF) matches an EOTF that is assumed upon generation of pseudo-HDR video (SDR signal) (S201).

If display setting unit 201 determines that the EOTF set on the SDR display differs from the EOTF indicated by the setting information (EOTF that matches the pseudo-HDR video) (Yes at S201), display setting unit 201 determines whether the SDR display EOTF can be switched on a system side (S202).

If display setting unit 201 determines that the SDR display EOTF can be switched, display setting unit 201 switches the SDR display EOTF to an appropriate EOTF, using the setting information (S203).

From steps S201 to S203, in the setting of display settings (S105), the EOTF set on the SDR display is set to a recommended EOTF determined according to the obtained setting information. In addition, by this, at step S106 performed after step S105, SDR luminance values can be determined using the recommended EOTF.

If it is determined that the SDR display EOTF cannot be switched on the system side (No at S202), a message urging the user to change the EOTF by a manual operation is displayed on a screen (S204). For example, the message "Set display gamma to 2.4" is displayed on a screen. That is, in the setting of display settings (S105), when the EOTF set on the SDR display cannot be switched, display setting unit 201 displays, on the SDR display, a message urging the user to switch the EOTF set on the SDR display (SDR display EOTF) to a recommenced EOTF.

Then, the SDR display displays pseudo-HDR video (SDR signal), but before the display, it is determined, using the setting information, whether a display parameter of the SDR display matches the setting information (S205).

If display setting unit 201 determines that the display parameter set on the SDR display differs from the setting information (Yes at S205), display setting unit 201 determines whether the display parameter of the SDR display can be switched (S206).

If display setting unit 201 determines that the display parameter of the SDR display can be switched (Yes at S206), display setting unit 201 switches the display parameter of the SDR display, according to the setting information (S207).

From steps S204 to S207, in the setting of display settings (S105), the display parameter set on the SDR display is set to a recommended display parameter determined according to the obtained setting information.

If it is determined that the display parameter of the SDR display cannot be switched on the system side (No at S206), a message urging the user to change the display parameter set on the SDR display by a manual operation is displayed on a screen (S208). For example, the message "Set the display mode to dynamic mode and set the backlight to a maximum value" is displayed on a screen. That is, in the setting (S105), when the display parameter set on the SDR display cannot be switched, a message urging the user to switch the display parameter set on the SDR display to a recommended display parameter is displayed on the SDR display.

[1-16. Third Luminance Conversion]

Figure 16:
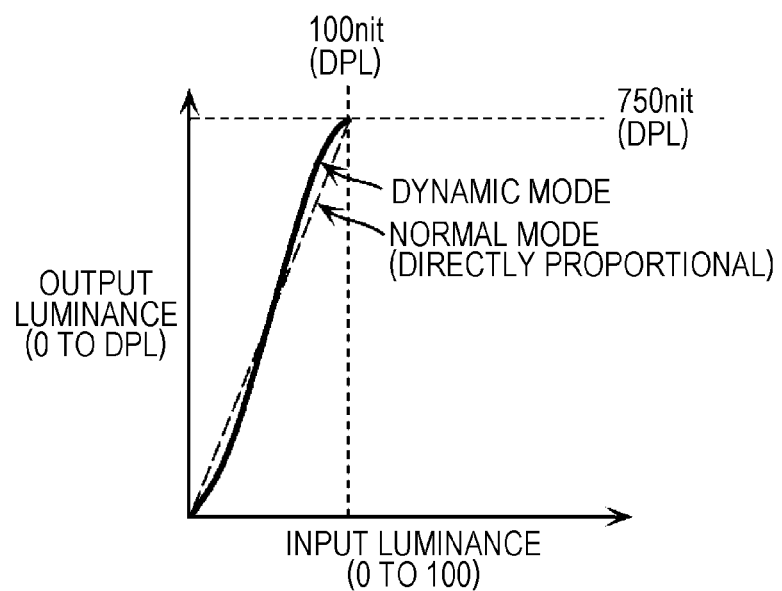
FIG. 16 is a diagram for describing third luminance conversion.

Next, details of the third luminance conversion (100→DPL [nit]) at step S107 will be described with reference to FIG. 16. FIG. 16 is a diagram for describing the third luminance conversion.

Luminance converter 203 of display device 200 converts the SDR luminance values in the SDR luminance range (0 to 100 [nit]) to (0 to DPL [nit]), according to the display mode set at step S105. This process is processed so as to be an inverse function of the mode-by-mode inverse luminance conversion at S103.

In the third luminance conversion, a conversion formula is switched according to the display mode of the SDR display. For example, when the display mode of the SDR display is normal mode (i.e., when the set display parameter is a parameter corresponding to normal mode), luminance conversion is performed such that display luminance values are converted to directly proportional values which are directly proportional to the SDR luminance values. In addition, in the third luminance conversion, when the display mode of the SDR display is dynamic mode that makes high luminance pixels brighter than in normal mode and makes low luminance pixels darker than in normal mode, luminance conversion is performed such that a display luminance value of a low luminance pixel is converted to a lower value than a directly proportional value which is directly proportional to an SDR luminance value, and a display luminance value of a high luminance pixel is converted to a higher value than a directly proportional value which is directly proportional to an SDR luminance value. That is, in the third luminance conversion, for the SDR luminance values determined at step S106, using luminance relationship information generated according to a display parameter indicating a display setting of the SDR display, luminance values associated in advance with the SDR luminance values are determined to be display luminance values, and the luminance conversion process is switched according to the display parameter. Here, the luminance relationship information generated according to a display parameter is, for example, information where SDR luminance values (input luminance values) are associated with display luminance values (output luminance values). The luminance relationship information is set for each display parameter (display mode) of the SDR display, such as that shown in FIG. 16.

[1-17. Effects, Etc.]

A normal SDRTV has an input signal with 100 nit, but is capable of representing video with 200 nit or more, according to a viewing environment (a dark room: cinema mode, and a bright room: dynamic mode, etc.). However, since an upper-limit luminance of the input signal to the SDRTV is determined to be 100 nit, such a capability cannot be directly used.

In a case of displaying HDR video on the SDRTV, by using a fact that a peak luminance of the SDRTV that performs display exceeds 100 nit (normally, 200 nit or more), instead of converting the HDR video to SDR video with 100 nit or less, an "HDR pseudo-HDR conversion process" is performed such that gradations in a luminance range exceeding 100 nit are maintained to a certain degree. Hence, pseudo-HDR video close to original HDR can be displayed on the SDRTV.

Figure 17:
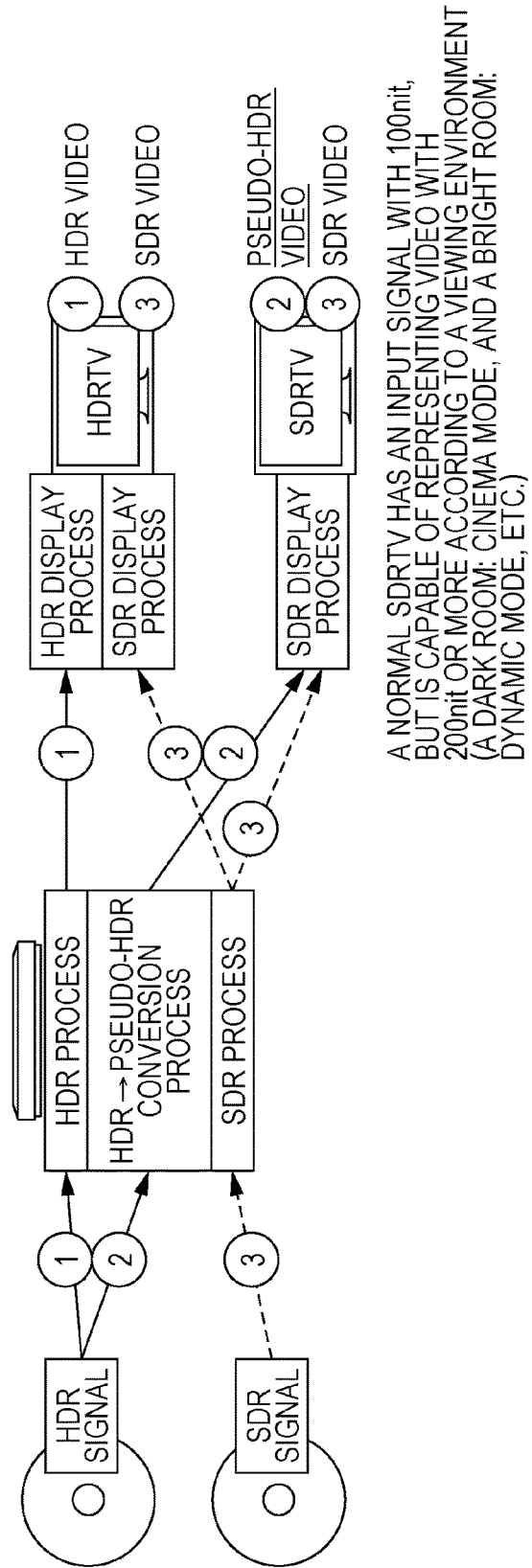
FIG. 17 is a diagram for describing a conversion process from HDR to pseudo-HDR.

In a case in which this "HDR→pseudo-HDR conversion process" technique is applied to Blu-ray (registered trademark), as shown in FIG. 17, when an HDR disc stores only an HDR signal and an SDRTV is connected to a Blu-ray (registered trademark) device, the Blu-ray (registered trademark) device performs an "HDR→pseudo-HDR conversion process" and thereby converts the HDR signal to a pseudo-HDR signal, and sends the pseudo-HDR signal to the SDRTV. By this, the SDRTV converts the received pseudo-HDR signal to luminance values and can thereby display video having a pseudo-HDR effect. As such, even when there is no HDR-compatible TV, only by preparing an HDR-compatible BD and an HDR-compatible Blu-ray (registered trademark) device, even if a TV is an SDRTV, the SDRTV can display pseudo-HDR video having a higher image quality than SDR video.

Therefore, although it has been considered that an HDR-compatible TV is required to view HDR video, a user can view pseudo-HDR video that allows the user to really feel an HDR-like effect, on an existing SDRTV. By this, prevalence of HDR-compatible Blu-ray (registered trademark) can be expected.

An HDR signal sent through broadcasting, a packaged medium such as Blu-ray (registered trademark), or Internet delivery such as OTT is converted to a pseudo-HDR signal by performing an HDR-to-pseudo-HDR conversion process. By this, the HDR signal can be displayed as pseudo-HDR video on an existing SDRTV.

Second Exemplary Embodiment

As described above, the first exemplary embodiment is described as exemplification of techniques disclosed in the present application. However, the techniques of the present disclosure are not limited thereto, and are also applicable to the first exemplary embodiment where changes, replacements, additions, omissions, etc., are appropriately made. In addition, it is also possible to form a new exemplary embodiment by combining together the components described in the above-described first exemplary embodiment.

Hence, in the following, other exemplary embodiments are exemplified as a second exemplary embodiment.

HDR video is, for example, video contained in a Blu-ray (registered trademark) Disc, a DVD, an Internet moving image delivery site, broadcasting, or an HDD.

Conversion device 100 (HDR pseudo-HDR conversion processor) may be present in a disc player, a disc recorder, a set-top box, a television, a personal computer, or a smartphone. Conversion device 100 may be present in a server device on the Internet.

Display device 200 (SDR display unit) is, for example, a television, a personal computer, or a smartphone.

Display characteristics information obtained by conversion device 100 may be obtained from display device 200 through an HDMI (registered trademark) cable or a LAN cable, using HDMI (registered trademark) or other communication protocols. For the display characteristics information obtained by conversion device 100, display characteristics information included in model information of display device 200, etc., may be obtained through the Internet. Alternatively, a user may set display characteristics information in conversion device 100 by performing a manual operation. In addition, obtaining of display characteristics information by conversion device 100 may be performed immediately before generation of pseudo-HDR video (steps S101 to S104) or may be performed at timing when device's initial setting is performed or when a display is connected. For example, obtaining of display characteristics information may be performed immediately before conversion to display luminance values, or may be performed at timing when conversion device 100 is connected to display device 200 for the first time by an HDMI (registered trademark) cable.

In addition, a CPL and a CAL of HDR video may be present for content in a one-to-one manner, or may be present for each scene. That is, in the conversion method, luminance information (CPL and CAL) may be obtained that is provided for each of a plurality of scenes of video and that includes, for each scene, at least one of a first maximum luminance value which is a maximum value of luminance values of a plurality of images forming the scene; and an average luminance value which is an average of the luminance values of the plurality of images forming the scene. In first luminance conversion, for each of the plurality of scenes, display luminance values may be determined according to luminance information provided for the scene.

In addition, a CPL and a CAL may be included in the same medium (a Blu-ray (registered trademark) Disc, a DVD, etc.) as a medium including HDR video, or may be obtained from a different location than that of the HDR video, e.g., a CPL and a CAL may be obtained by conversion device 100 through the Internet. That is, luminance information including at least one of a CPL and a CAL may be obtained as meta-information of video, or may be obtained via a network.

In addition, in the first luminance conversion (HPL→DPL) of conversion device 100, fixed values may be used instead of using a CPL, a CAL, and a display peak luminance (DPL). In addition, the fixed values may be changeable from an external source. In addition, the CPL, the CAL, and the DPL may be switched among several types. For example, the DPL may only have three types: 200 nit, 400 nit, and 800 nit, or the closest value to display characteristics information may be used.

In addition, an HDR EOTF does not need to be SMPTE 2084 and other types of HDR EOTF may be used. In addition, a maximum luminance of HDR video (HPL) does not need to be 10,000 nit and may be, for example, 4,000 nit or 1,000 nit.

In addition, a bit width of a code value may be, for example, 16, 14, 12, 10, or 8 bits.

In addition, inverse SDR EOTF conversion is determined from display characteristics information, but a fixed conversion function (which is also changeable from an external source) may be used. The inverse SDR EOTF conversion may use, for example, a function defined in Rec. ITU-R BT. 1886. Alternatively, types of inverse SDR EOTF conversion may be narrowed down to several types, and the closest type to input and output characteristics of display device 200 may be selected and used.

In addition, for the display mode, a fixed mode may be used and thus the display mode does not need to be included in display characteristics information.

In addition, conversion device 100 does not need to transmit setting information, and display device 200 may have fixed display settings or does not need to change the display settings. In this case, display setting unit 201 is not required. In addition, the setting information may be flag information indicating whether video is pseudo-HDR video. For example, when video is pseudo-HDR video, settings may be changed to perform brightest display. That is, in the setting of display settings (S105), when obtained setting information indicates a signal indicating pseudo-HDR video having been converted using a DPL, a brightness setting of display device 200 may be switched to a setting for performing brightest display.

In addition, the first luminance conversion (HPL→DPL) of conversion device 100 is performed according to, for example, the following formula.

Here, L represents a luminance value normalized to 0 to 1, and S1, S2, a, b, and M are values set based on a CAL, a CPL, and a DPL. In is a natural logarithm. V is a luminance value obtained after conversion and normalized to 0 to 1. As shown in the example of FIG. 13A, when the CAL is 300 nit, the CPL is 2,000 nit, the DPL is 750 nit, and conversion is not performed up to CAL+50 nit but is performed for 350 nit or more, each value is, for example, as follows.

S1=350/10000
S2=2000/10000
M=750/10000
a=0.023
b=S1−a*ln(S1)=0.112105

That is, in the first luminance conversion, when an SDR luminance value is between the average luminance value (CAL) and the first maximum luminance value (CPL), a display luminance value corresponding to the HDR luminance value is determined using the natural logarithm.

By converting HDR video using information such as a content peak luminance and a content average luminance of the HDR video, a conversion formula can be changed according to content, enabling to perform conversion such that HDR gradations are maintained as much as possible. In addition, adverse effects such as too dark and too bright can be suppressed. Specifically, by mapping a content peak luminance of HDR video to a display peak luminance, gradations are maintained as much as possible. In addition, by not changing pixel values smaller than or equal to near an average luminance, overall brightness remains unchanged.

In addition, by converting HDR video using a peak luminance value and a display mode of an SDR display, a conversion formula can be changed according to a display environment of the SDR display, and video with HDR-ness (pseudo-HDR video) can be displayed at gradations and brightness similar to those of the original HDR video, in accordance with performance of the SDR display. Specifically, a display peak luminance is determined by a maximum luminance and a display mode of the SDR display, and HDR video is converted so as not to exceed the peak luminance value. By this, display is performed such that for brightnesses displayable on the SDR display, gradations of the HDR video are not reduced almost at all, and for undisplayable brightnesses, luminance values are reduced to displayable brightnesses.

By the above, undisplayable brightness information is trimmed and displayable brightness gradations are not lowered and thus video can be displayed in a form close to original HDR video. For example, for a display with a peak luminance of 1,000 nit, by converting video to pseudo-HDR video whose peak luminance is suppressed to 1,000 nit, overall brightness is maintained, and luminance values change according to a display mode of the display. Hence, a luminance conversion formula is changed according to the display mode of the display. If a higher luminance than the peak luminance of the display is allowed for pseudo-HDR video, then the higher luminance may be replaced by the peak luminance on the display side and displayed. In that case, the overall video becomes darker than original HDR video. On the other hand, if a lower luminance than the peak luminance of the display is converted as a maximum luminance, then the lower luminance is replaced by the peak luminance on the display side, and thus, the overall video becomes brighter than the original HDR video. Moreover, the luminance is lower than the peak luminance on the display side, which means that performance of the display regarding gradations is not fully used.

In addition, on the display side, by switching display settings using setting information, pseudo-HDR video can be displayed more favorably. For example, when brightness is set to dark, high luminance display cannot be performed, and thus, HDR-ness is impaired. In that case, by changing the display settings or displaying a message urging to change the display settings, performance of the display is fully exerted, enabling to display high gradation video.

In content on Blu-ray (registered trademark), etc., a video signal and a graphics signal such as subtitles or a menu are multiplexed together as pieces of independent data. Upon playback, the pieces of data are decoded individually, and results of the decoding are combined together and displayed. Specifically, a subtitle or menu plane is superimposed onto a video plane.

Here, even if a video signal is HDR, a graphics signal such as subtitles or a menu may be SDR. In HPL→DPL conversion of a video signal, the following two ways of conversion (a) and (b) are possible.

(a) A case of performing HPL DPL conversion after combining graphics
1. A graphics EOTF is converted from an SDR EOTF to an HDR EOTF.
2. Graphics obtained after the EOTF conversion are combined with video.
3. HPL DPL conversion is performed on a result of the combining.

(b) A case of performing HPL→DPL conversion before combining graphics
1. A graphics EOTF is converted from an SDR EOTF to an HDR EOTF.
2. HPL→DPL conversion is performed on video.
3. Graphics obtained after the EOTF conversion and the video obtained after the DPL conversion are combined together.

Note that in the case of (b), steps 1 and 2 may be interchanged.

In both of the methods (a) and (b), a peak luminance of graphics is 100 nit. However, when, for example, a DPL is a high luminance such as 1000 nit, if the luminance of the graphics remains at 100 nit, then the luminance of the graphics may decrease with respect to video obtained after HPL→DPL conversion. Particularly, negative effects are assumed, such as darkening subtitles to be superimposed onto video. Therefore, for the graphics, too, luminance may be converted according to a DPL value. For example, for luminance of subtitles, a value of how much percent of the DPL value is to be set for the luminance of subtitles, or the like, may be defined in advance, and the luminance of subtitles may be converted based on the set value. Graphics other than subtitles such as a menu can also be processed in the same manner.

The above describes playback operation for an HDR disc that stores only an HDR signal.

Figure 18:
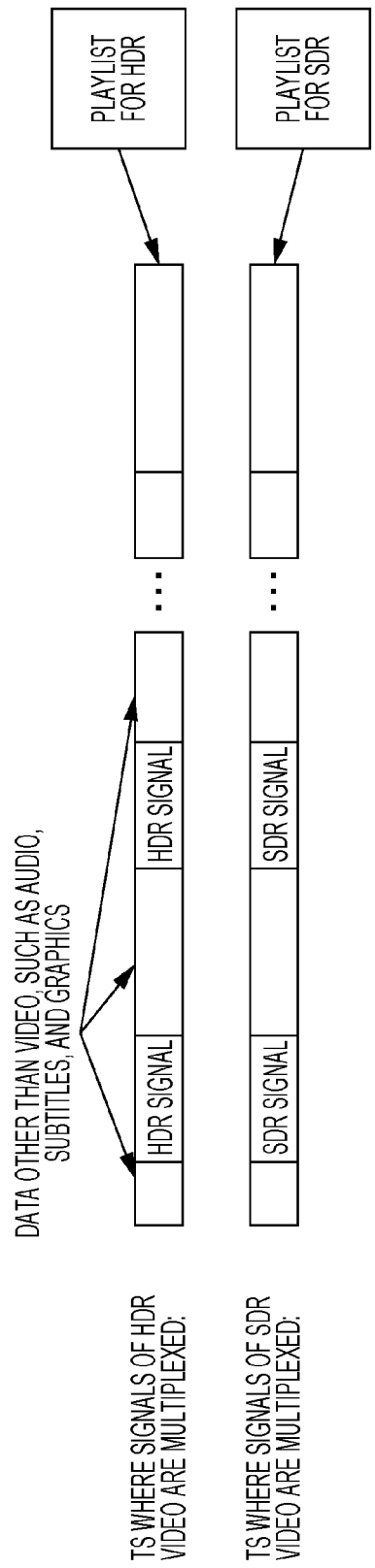
FIG. 18 is a diagram for describing playback operation for a dual disc.

Next, multiplexed data stored on a dual disc on which both an HDR signal and an SDR signal are stored and which is shown in Case 2 in FIG. 6B will be described with reference to FIG. 18. FIG. 18 is a diagram for describing multiplexed data stored on a dual disc.

On the dual disc, as shown in FIG. 18, HDR signals and SDR signals are stored as different multiplexed streams. For example, on an optical disc such as Blu-ray (registered trademark), pieces of data on a plurality of media such as video, audio, subtitles, and graphics are stored as one multiplexed stream by an MPEG-2 TS-based multiplexing method called M2TS. These multiplexed streams are referred to by metadata for playback control, such as playlists. Upon playback, by a player analyzing metadata, a multiplexed stream to be played or individual language data stored in a multiplexed stream is selected. The present example shows a case in which playlists for HDR and for SDR are stored individually, and each playlist refers to HDR signals or SDR signals. In addition, identification information indicating that both HDR signals and SDR signals are stored, etc., may be provided separately.

It is also possible to multiplex both HDR signals and SDR signals into the same multiplexed stream. However, since multiplexing needs to be performed so as to satisfy a buffer model such as T-STD (System Target Decoder) defined in MPEG-2 TS, it is particularly difficult to multiplex two pieces of video with a high bit rate within a range of predetermined data read rates. Hence, it is desirable to demultiplex a multiplexed stream.

Data such as audio, subtitles, or graphics needs to be stored in each multiplexed stream and thus an amount of data increases compared to a case of multiplexing into one stream. Note, however, that for the increase in the amount of data, an amount of video data can be reduced using a video coding method with a high compression ratio. For example, by changing MPEG-4 AVC which is used for conventional Blu-ray (registered trademark) to HEVC (High Efficiency Video Coding), an improvement in compression ratio by a factor of 1.6 to 2 is expected. In addition, for content to be stored on a dual disc, only combinations that can fit to a capacity of an optical disc may be allowed, for example, by allowing a combination of two 2Ks or 2K and 4K, such as a combination of 2K HDR and SDR or a combination of 4K SDR and 2K HDR, and by prohibiting storing of two 4Ks.

Figure 19:
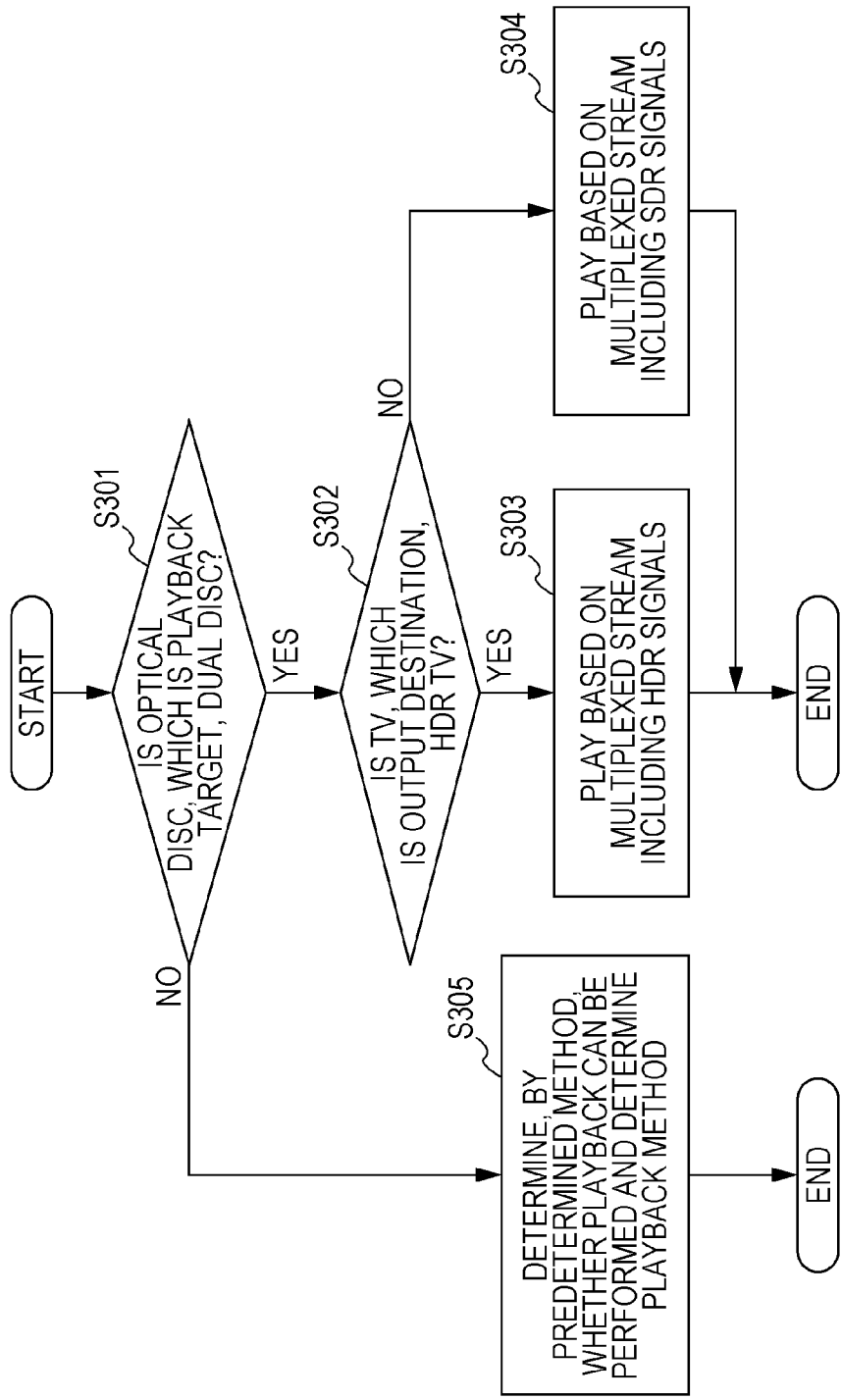
FIG. 19 is a flowchart showing playback operation for a dual disc.

FIG. 19 is a flowchart showing playback operation for a dual disc.

First, a playback device determines whether an optical disc which is a playback target is a dual disc (S301). Then, if it is determined that the disc is a dual disc (Yes at S301), it is determined whether a TV which is an output destination is an HDRTV or an SDRTV (S302). If it is determined that the TV is an HDRTV (Yes at S302), processing proceeds to step S303. If it is determined that the TV is an SDRTV (No at S302), processing proceeds to step S304. At step S303, an HDR video signal is obtained from a multiplexed stream including HDR signals on the dual disc, and decoded, and then output to the HDRTV. At step S304, an SDR video signal is obtained from a multiplexed stream including SDR signals on the dual disc, and decoded, and then output to the SDRTV. Note that if it is determined, at step S301, that the playback target is not a dual disc (No at S301), a determination as to whether playback can be performed is made by a predetermined method, and a playback method is determined based on a result of the determination (S305).

In the conversion method of the present disclosure, in a case of displaying HDR video on an SDRTV, by using a fact that a peak luminance of the SDRTV that performs display exceeds 100 nit (normally, 200 nit or more), instead of converting the HDR video to SDR video with 100 nit or less, an "HDR pseudo-HDR conversion process" is implemented in which conversion is performed such that gradations in regions exceeding 100 nit are maintained to a certain degree, by which the HDR video is converted to pseudo-HDR video close to original HDR, enabling to display the pseudo-HDR video on the SDRTV.

In addition, in the conversion method, a conversion method for the "HDR pseudo-HDR conversion process" may be switched according to display characteristics (a maximum luminance, input and output characteristics, and a display mode) of the SDRTV.

For a method for obtaining display characteristics information, the following methods are considered: (1) display characteristics information is automatically obtained through HDMI (registered trademark) or a network; (2) display characteristics information is generated by allowing a user to input information such as a manufacturer's name and a product number; and (3) display characteristics information is obtained from a cloud, etc., using information such as a manufacturer's name and a product number.

In addition, for timing of obtaining display characteristics information by conversion device 100, the following timing is considered: (1) display characteristics information is obtained immediately before performing pseudo-HDR conversion; and (2) display characteristics information is obtained when conversion device 100 is connected to display device 200 (SDRTV, etc.) for the first time (when a connection is established).

In addition, in the conversion method, the conversion method may be switched according to luminance information (a CAL and a CPL) of HDR video.

For example, for a method for obtaining luminance information of HDR video by conversion device 100, for example, the following methods are considered: (1) luminance information is obtained as meta-information associated with HDR video; (2) luminance information is obtained by allowing a user to input title information of content; and (3) luminance information is obtained from a cloud, etc., using input information having been input by the user.

In addition, for details of the conversion method, (1) conversion is performed so as not to exceed a DPL, (2) conversion is performed such that a CPL becomes the DPL, (3) luminances lower than or equal to a CAL and a neighborhood of the CAL are not changed, (4) conversion is performed using a natural logarithm, and (5) a clipping process is performed at the DPL.

In addition, in the conversion method, in order to enhance the pseudo-HDR effect, it is also possible to transmit display settings of an SDRTV, such as a display mode and a display parameter, to display device 200 to switch the display settings. For example, a message urging a user to perform display setting may be displayed on a screen.

Third Exemplary Embodiment

[3-1. Types of Discs]

Figure 21:
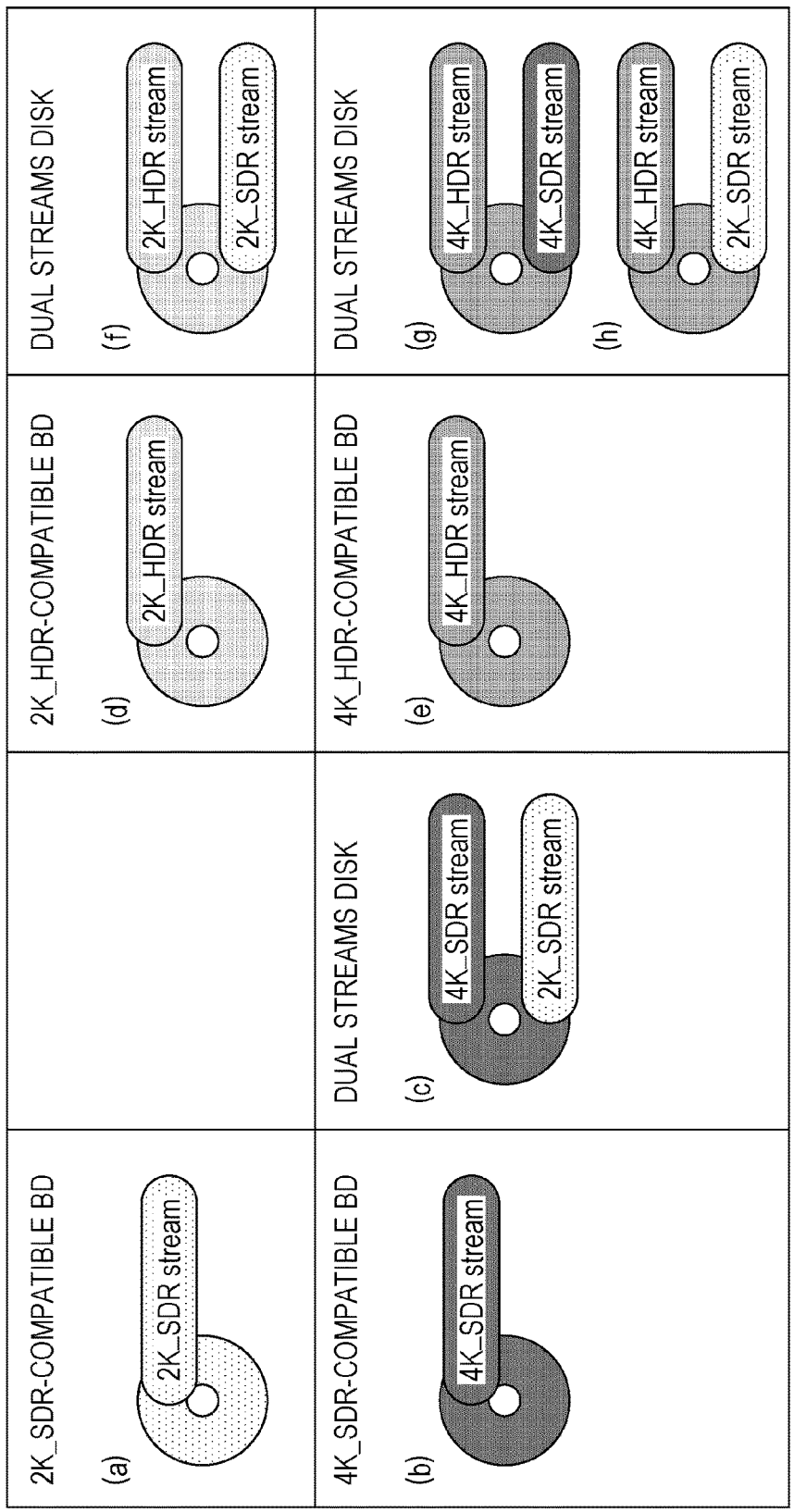
FIG. 21 is a diagram showing more details of the types of BDs.

A third exemplary embodiment will be described below. As described above, with an achievement of a high resolution and a high luminance range of display devices, there are provided a plurality of types of Blu-ray Discs (hereinafter, described as BDs) that match specifications of the display devices. FIG. 20 is a diagram showing types of BDs. FIG. 21 is a diagram showing more details of the types of BDs. A playback device (Blu-ray device) plays content recorded on a BD which is inserted into the playback device, and displays the content on a display device. As shown in FIGS. 20 and 21, in the following third exemplary embodiment, a BD on which is recorded a video signal whose resolution is a first resolution and whose luminance range is a first luminance range is described as a 2K_SDR-compatible BD ((a) of FIG. 21). The video signal whose resolution is the first resolution and whose luminance range is the first luminance range is stored as a stream on the BD. The stream is described as a 2K_SDR stream. The 2K_SDR-compatible BD is a conventional BD.

In addition, a BD on which is recorded a video signal whose resolution is a second resolution and whose luminance range is the first luminance range is described as a 4K_SDR-compatible BD. The video signal whose resolution is the second resolution and whose luminance range is the first luminance range is stored as a stream on the BD. The stream is described as a 4K_SDR stream ((b) of FIG. 21).

Likewise, a BD on which is recorded a video signal whose resolution is the first resolution and whose luminance range is a second luminance range is described as a 2K_HDR-compatible BD. The video signal whose resolution is the first resolution and whose luminance range is the second luminance range is stored as a stream on the BD. The stream is described as a 2K_HDR stream ((d) of FIG. 21).

In addition, a BD on which is recorded a video signal whose resolution is the second resolution and whose luminance range is the second luminance range is described as a 4K_HDR-compatible BD. The video signal whose resolution is the second resolution and whose luminance range is the second luminance range is stored as a stream on the BD. The stream is described as a 4K_HDR stream ((e) of FIG. 21).

Note that the first resolution is, for example, so-called 2K (1920×1080 or 2048×1080) resolution, but may be any resolution including such resolution. In the third exemplary embodiment, the first resolution may be simply described as 2K.

In addition, the second resolution is so-called 4K (3840×2160 or 4096×2160) resolution, but may be any resolution including such resolution. The second resolution is a resolution having a larger number of pixels than that of the first resolution.

Note that the first luminance range is, for example, SDR (a luminance range with a peak luminance of 100 nit) having been described so far. The second luminance range is, for example, HDR (a luminance range with a peak luminance exceeding 100 nit) having been described so far. The second luminance range includes the whole first luminance range, and the peak luminance of the second luminance range is higher than the peak luminance of the first luminance range.

As shown in (c), (f), (g), and (h) of FIG. 21, a dual-stream disc that supports a plurality of video representations with a single BD is considered. The dual-stream disc is a BD on which are recorded a plurality of video signals for playing the same content. At least one of the resolution and the luminance range differs between the plurality of video signals.

Specifically, a dual-stream disc shown in (c) of FIG. 21 is a BD on which are recorded a 4K_SDR stream and a 2K_SDR stream. A dual-stream disc shown in (f) of FIG. 21 is a BD on which are recorded a 2K_HDR stream and a 2K_SDR stream.

A dual-stream disc shown in (g) of FIG. 21 is a BD on which are recorded a 4K_HDR stream and a 4K_SDR stream. A dual-stream disc shown in (h) of FIG. 21 is a BD on which are recorded a 4K_HDR stream and a 2K_SDR stream.

Note that the dual-stream disc shown in (c) of FIG. 21 is not necessary because the Blu-ray device can perform down-conversion (hereinafter, also described as down-convert) of resolution from 4K to 2K.

[3-2. Disc Capacity]

Figure 22:
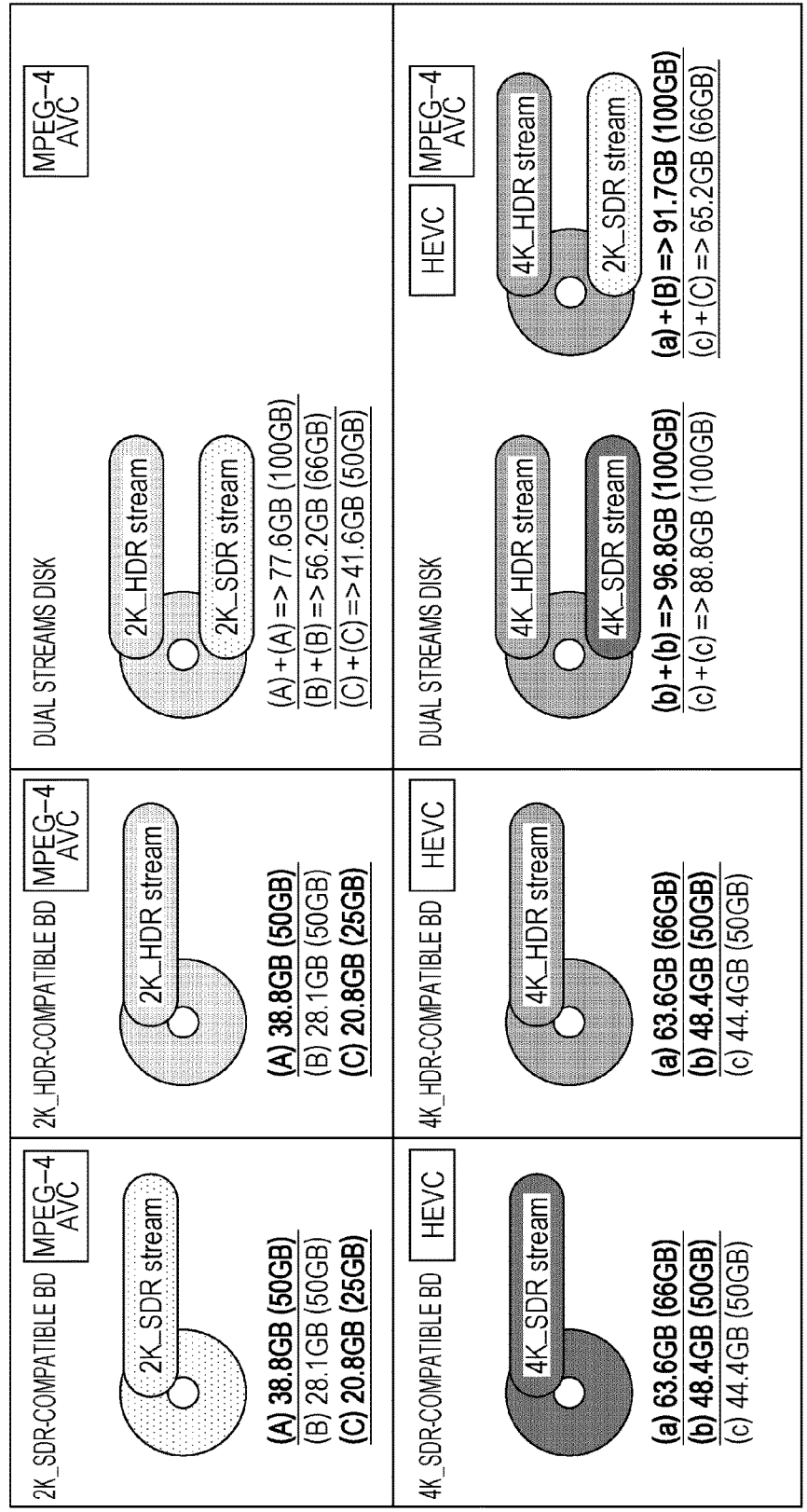
FIG. 22 is a first diagram showing data capacity to be recorded on BDs.
Figure 23:
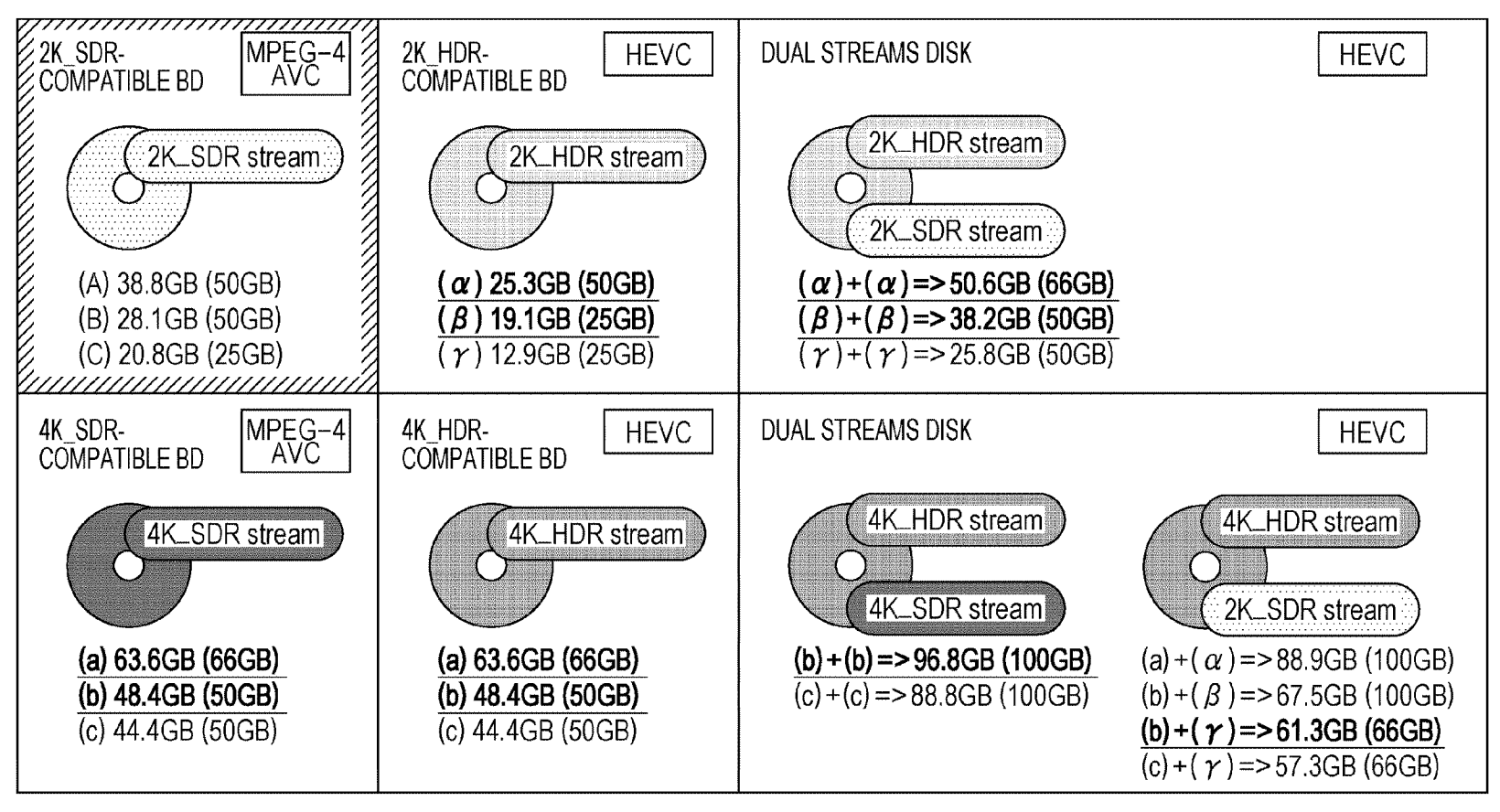

Now, supplemental remarks on each BD such as those described above will be made with reference to FIGS. 22 and 23. FIGS. 22 and 23 are diagrams showing data capacity to be recorded on BDs.

FIGS. 22 and 23 exemplify stream data capacity to be actually used on each BD and dual-stream disc.

FIG. 22 exemplifies cases in which streams with 2K resolution (a 2K_SDR stream and a 2K_HDR stream) are compressed using MPEG-4 AVC. Bit rates of movie length, lossless audio, and compressed audio are as shown below. Note that a BD records a number of audio streams (lossless audio and compressed audio) that corresponds to a number of languages.

Movie length: 150 min (14 mbps to 18 mbps)
Lossless audio: 0 to 2 languages (4.5 mbps)
Compressed audio: 3 to 5 languages (1.5 mbps)

In this case, a maximum value (A), an intermediate value (B), and a minimum value (C) of required disc capacity are as follows.

(A) (18+4.5*2+1.5*5) mbps*(150*60) s/8=38.8 GB
(B) (16+4.5*1+1.5*3) mbps*(150*60) s/8=28.1 GB
(C) (14+4.5*0+1.5*3) mbps*(150*60) s/8=20.8 GB In addition, cases are exemplified in which streams with 4K resolution (a 4K_SDR stream and a 4K_HDR stream) are compressed using HEVC. Bit rates of movie length, lossless audio, and compressed audio are as shown below.

Movie length: 150 min (35 mbps to 40 mbps)
Lossless audio: 0 to 2 languages (4.5 mbps)
Compressed audio: 3 to 6 languages (1.5 mbps)

In this case, a maximum value (a), an intermediate value (b), and a minimum value (c) of required disc capacity are as follows.

(a) (40+4.5*2+1.5*5) mbps*(150*60) s/8=63.6 GB
(b) (37+4.5*0+1.5*4) mbps*(150*60) s/8=48.4 GB
(c) (35+4.5*0+1.5*3) mbps*(150*60) s/8=44.4 GB Here, disc capacity required for a dual-stream disc on which are recorded both a 2K_HDR stream compressed using MPEG-4 AVC and a 2K_SDR stream compressed using MPEG-4 AVC is determined by the above-described (A)+(A), (B)+(B), and (C)+(C). Specifically, the maximum value is 77.6 GB, the intermediate value is 56.2 GB, and the minimum value is 41.6 GB.

In addition to conventional 50 GB, a 66 GB disc and a 100 GB disc are targeted, and thus, a dual-stream disc such as that described above is also implementable in terms of capacity.

Note that disc capacity required for a dual-stream disc on which are recorded both a 4K_HDR stream compressed using HEVC and a 2K_HDR stream compressed using HEVC is 96.8 GB based on the above-described (b)+(b), and 88.8 GB based on the above-described (c)+(c). Hence, such a dual-stream disc is implementable by a disc with 100 GB capacity.

Likewise, disc capacity required for a dual-stream disc on which are recorded both a 4K_HDR stream compressed using HEVC and a 2K_SDR stream compressed using MPEG-4 AVC is 91.7 GB based on the above-described (a)+(B), and 65.2 GB based on the above-described (c)+(C). Hence, such a dual-stream disc is implementable by a disc with 100 GB capacity or a disc with 66 GB capacity.

Other examples will be further described with reference to FIG. 23. FIG. 23 exemplifies cases in which streams with 2K resolution (a 2K_SDR stream and a 2K_HDR stream) are compressed using HEVC. Bit rates of movie length, lossless audio, and compressed audio are as shown below.

Movie length: 150 min (7 mbps to 9 mbps)
Lossless audio: 0 to 2 languages (4.5 mbps)
Compressed audio: 3 to 5 languages (1.5 mbps)

In this case, a maximum value (A), an intermediate value (B), and a minimum value (C) of required disc capacity are as follows.

(α) (9+4.5*2+1.5*5) mbps*(150*60) s/8=25.3 GB
(β) (8+4.5*1+1.5*3) mbps*(150*60) s/8=19.1 GB
(γ) (7+4.5*0+1.5*3) mbps*(150*60) s/8=12.9 GB Here, disc capacity required for a dual-stream disc on which are recorded both a 2K_HDR stream compressed using HEVC and a 2K_SDR stream compressed using HEVC is determined by the above-described (α)+(α), (β)+

(β), and (γ)+(γ). Specifically, the maximum value is 50.6 GB, the typ value is 38.2 GB, and the minimum value is 25.8 GB.

In addition to conventional 50 GB, a 66 GB disc and a 100 GB disc are targeted, and thus, a dual-stream disc such as that described above is also implementable in terms of capacity.

Likewise, disc capacity required for a dual-stream disc on which are recorded both a 4K_HDR stream compressed using HEVC and a 2K_SDR stream compressed using HEVC is 88.9 GB based on the above-described (a)+(α), 67.5 GB based on the above-described (b)+(β), 61.3 GB based on the above-described (b)+(γ), and 57.3 GB based on the above-described (c)+(γ). Hence, such a dual-stream disc is implementable by a disc with 100 GB capacity or a disc with 66 GB capacity.

[3-3. Details of the Types of Discs]

On a BD, more specifically, a video stream and a graphics stream (a stream of graphics of the first exemplary embodiment) are recorded. Here, FIG. 24 is a diagram showing examples of a combination of a video stream and a graphics stream recorded on each disc for BDs including dual-stream discs.

Figure 24:
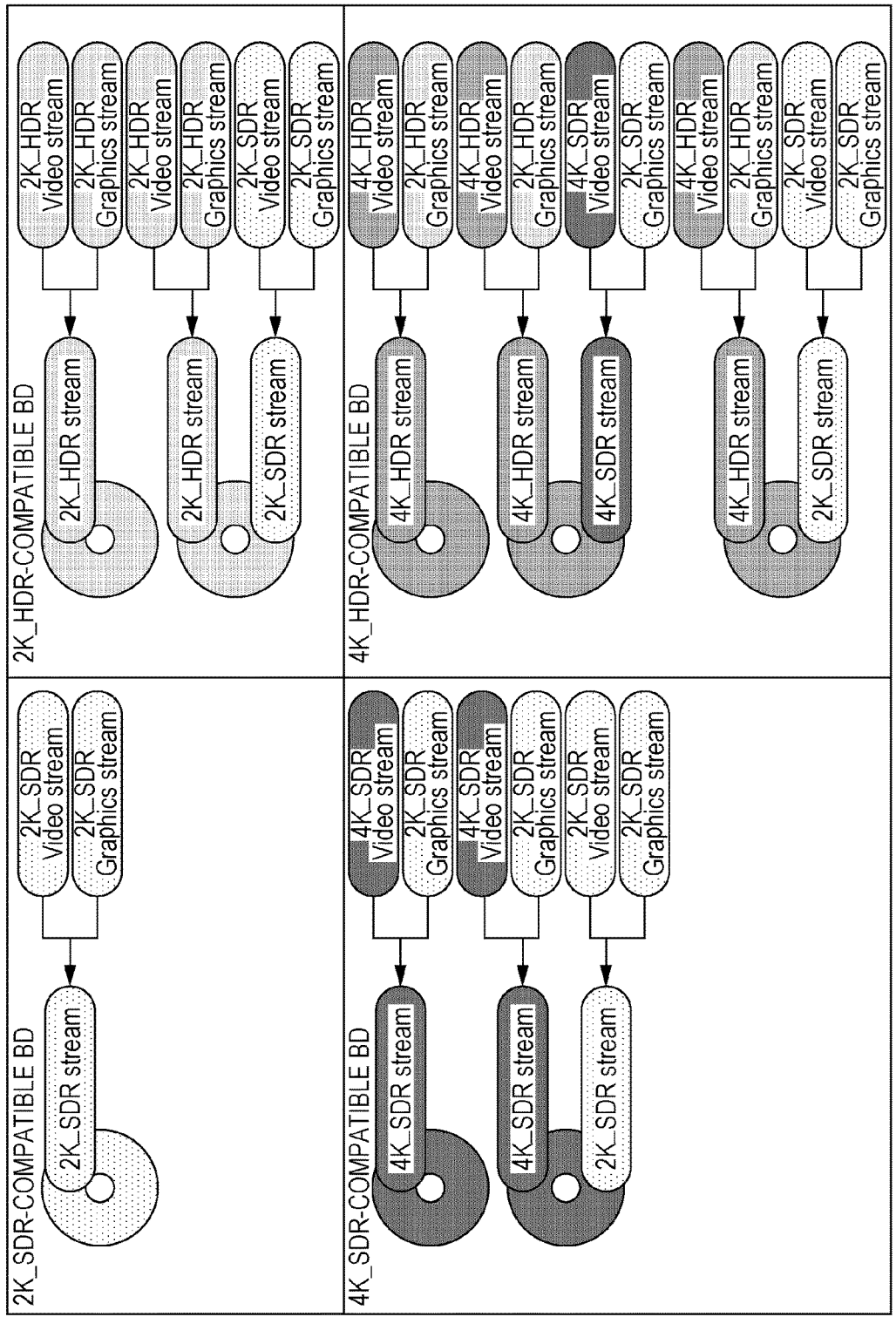
FIG. 24 is a diagram showing examples of a combination of a video stream and a graphics stream recorded on discs including BDs and dual-stream discs.

In FIG. 24, taking into account trouble of creating content (BD), a graphics stream is recorded at 2K resolution, regardless of a resolution of a corresponding video stream. A graphics stream can be shared between a 2K_SDR stream and a 4K_SDR stream. Note, however, that a graphics stream is recorded in a luminance range that matches a luminance range of a corresponding video stream. When a video stream is HDR, an HDR graphics stream is recorded. When a video stream is SDR, an SDR graphics stream is recorded. Conversion of a graphics stream from SDR to HDR is performed upon creation of content.

Figure 25:
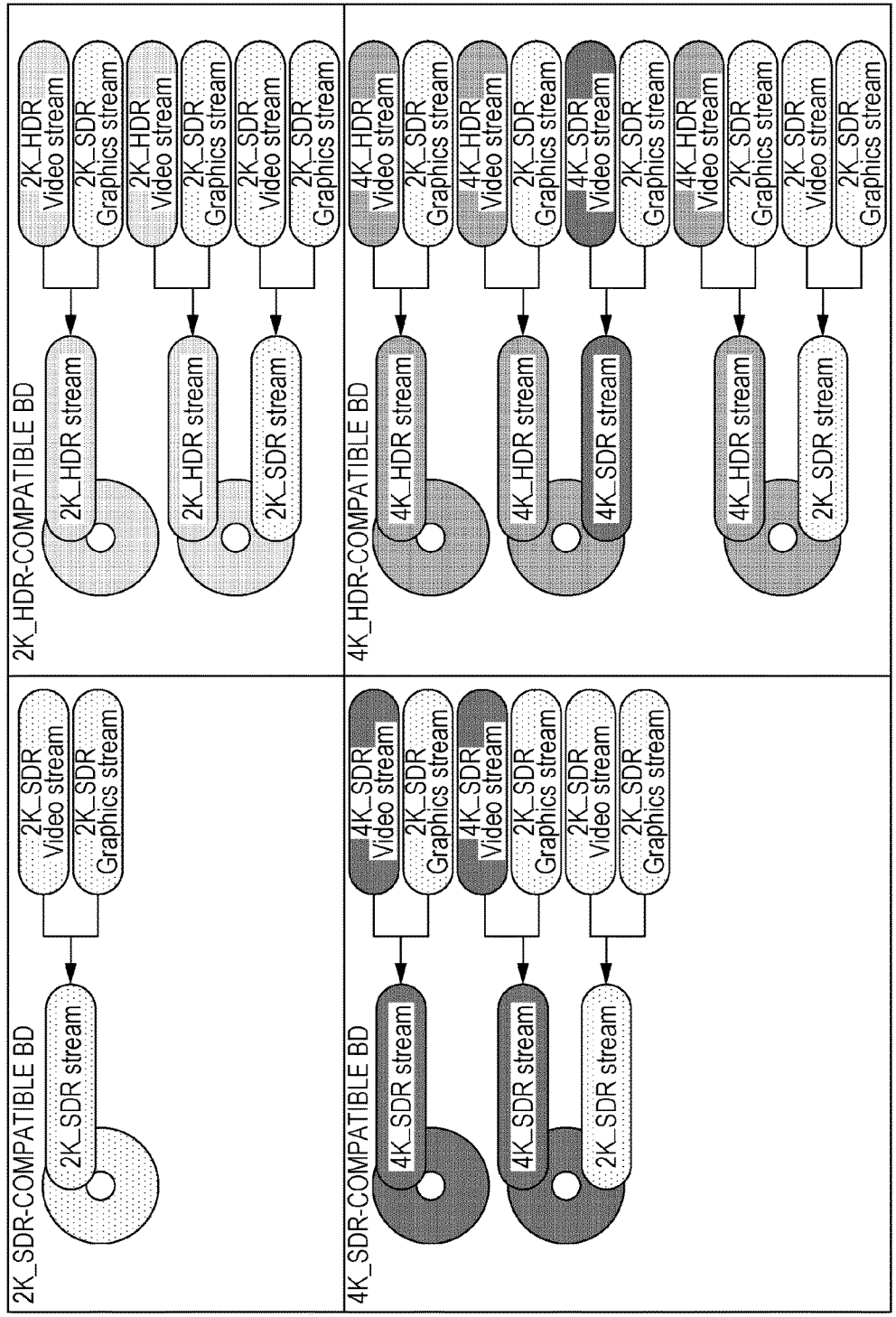
FIG. 25 is a diagram showing other examples of a combination of a video stream and a graphics stream recorded on discs including BDs and dual-stream discs.

FIG. 25 is a diagram showing other examples of a combination of a video stream and a graphics stream recorded on each disc for BDs including dual-stream discs.

In FIG. 25, taking into account trouble of creating content, a graphics stream is recorded at 2K resolution and in an SDR luminance range, regardless of a resolution and a luminance range of a corresponding video stream. A graphics stream can be shared among all of a 2K_SDR stream, a 4K_SDR stream, a 2K_HDR stream, and a 4K_HDR stream. In this case, both conversion of a resolution of the graphics stream from 2K to 4K and conversion of a luminance range of the graphics stream from SDR to HDR are performed by a Blu-ray device.

Figure 26:
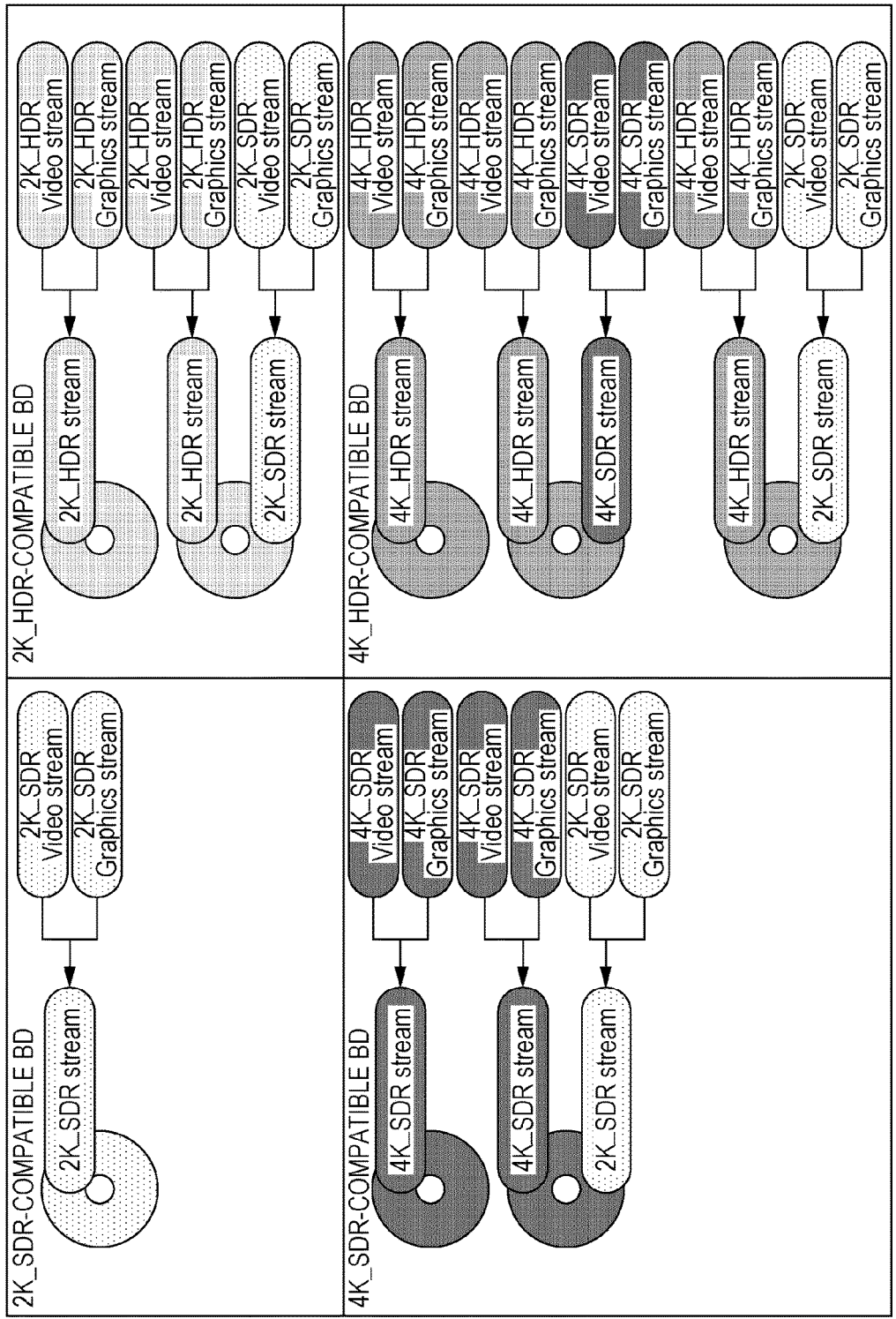
FIG. 26 is a diagram showing still other examples of a combination of a video stream and a graphics stream recorded on discs including BDs and dual-stream discs.

FIG. 26 is a diagram showing still other examples of a combination of a video stream and a graphics stream recorded on each disc for BDs including dual-stream discs.

In FIG. 26, in order that a Blu-ray device does not need to perform conversion of a graphics stream, upon creation of content, a graphics stream is recorded such that a resolution and a luminance range of the graphics stream match a resolution and a luminance range of a corresponding video stream.

[3-4. Processes of a Blu-Ray Device]

As described above, when there are a mix of various types of BDs and display devices that support the BDs, a Blu-ray device needs to perform processes such that a BD inserted into the Blu-ray device is appropriately displayed on a display device connected to the Blu-ray device. The processes performed here include, for example, conversion of a luminance range from HDR to SDR, up-conversion of a resolution from 2K to 4K, and down-conversion of a resolution from 4K to 2K.

Then, when a new Blu-ray device capable of performing processes such as those described above sends a video signal to a display device, the Blu-ray device needs to appropriately select an HDMI (registered trademark) standard and an HDCP standard. Specifically, the Blu-ray device supports three sets of the HDMI/HDCP standards (HDMI 1.4/HDCP 1.4, HDMI 2.0/HDCP 2.1, and HDMI 2.1/HDCP 2.2), and selects a version of the HDMI/HDCP standards to be used, according to a type of the display device.

Figure 27:
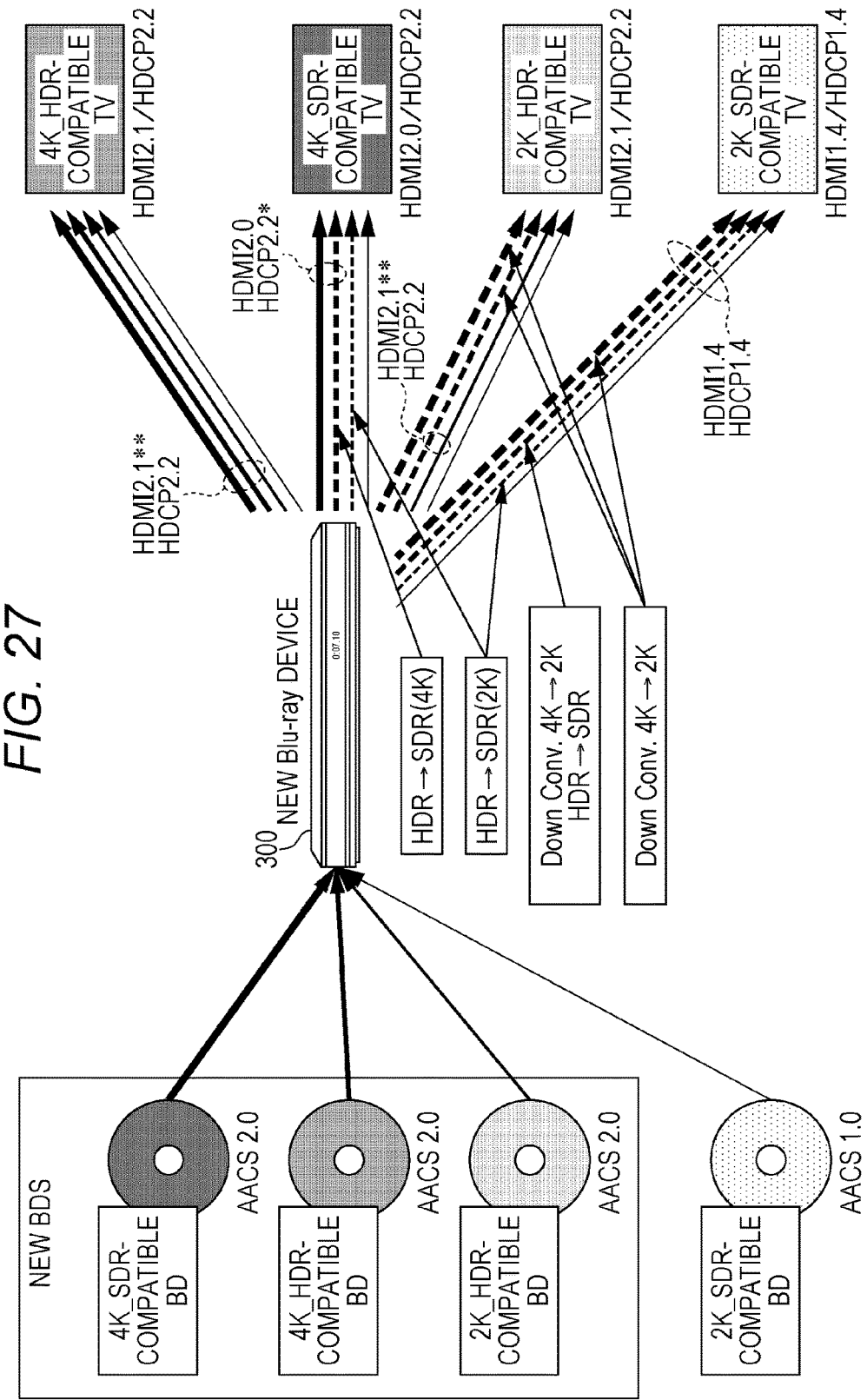
FIG. 27 is a schematic diagram showing content of processes performed by a Blu-ray (registered trademark) device in a manner appropriate to various types of BDs and various types of display devices.

FIG. 27 is a schematic diagram showing content of processes performed by a Blu-ray device in a manner appropriate to various types of BDs and various types of display devices.

As shown in FIG. 27, Blu-ray device 300 selects each of a version of HDMI and a version of HDCP, according to a type of a display device connected to the Blu-ray device (playback device). In addition, Blu-ray device 300 decodes an obtained video signal, encrypts the decoded video signal using the HDCP of the selected version, and outputs the encrypted video signal to the display device using the HDMI of the selected version.

Note that Blu-ray device 300 obtains a type of a display device, for example, from the display device through an HDMI cable connecting Blu-ray device 300 to the display device. Alternatively, the type of the display device may be included in display characteristics information which is described in the first exemplary embodiment. In addition, a user may set display characteristics information in Blu-ray device 300 by a manual operation. Note that, though not shown, Blu-ray device 300 may include a first obtainer that obtains a type of a display device.

In addition, the type of the display device is, specifically, one of a 2K_SDR-compatible TV, a 4K_SDR-compatible TV, a 2K_HDR-compatible TV, and a 4K_HDR-compatible TV. That is, the type of the display device is one of a first type indicating a display device whose resolution is the above-described first resolution and which supports the above-described first luminance range; a second type indicating a display device whose resolution is the above-described second resolution and which supports the above-described first luminance range; a third type indicating a display device whose resolution is the above-described first resolution and which supports the above-described second luminance range; and a fourth type indicating a display device whose resolution is the above-described second resolution and which supports the above-described second luminance range.

For example, when a 2K_SDR-compatible TV is connected to Blu-ray device 300, Blu-ray device 300 outputs a video signal using HDMI 1.4 and HDCP 1.4. Specifically, Blu-ray device 300 encrypts a decoded video signal using HDCP 1.4, and outputs the encrypted video signal to the 2K_SDR-compatible TV using a communication protocol that supports HDMI 1.4. Note that a communication protocol that supports HDMI 2.0 is, in other words, a communication protocol defined in HDMI 2.0.

At this time, when an inserted BD is a 4K_SDR-compatible BD, down-conversion of a resolution is required. When an inserted BD is a 2K_HDR-compatible BD, conversion from HDR to SDR is required. When an inserted is a 4K_HDR-compatible BD, both down-conversion of a resolution and conversion from HDR to SDR are required.

Note that, when a 2K_SDR-compatible TV is connected to Blu-ray device 300, pseudo-HDR conversion which is described in the first exemplary embodiment may be performed.

For example, Blu-ray device 300 obtains a peak luminance of a display device connected to Blu-ray device 300. When an obtained type of the display device is the first type (2K_SDR-compatible TV) and the obtained peak luminance is higher than a peak luminance of the first luminance range, Blu-ray device 300 converts a video signal to a luminance range having the obtained peak luminance and then further converts the video signal to the first luminance range. Then, Blu-ray device 300 encrypts the converted video signal using HDCP 1.4, and outputs the encrypted video signal to the 2K_SDR-compatible TV using a communication protocol that supports HDMI 1.4.

In addition, when a 4K_SDR-compatible TV is connected to Blu-ray device 300, Blu-ray device 300 outputs a video signal using HDMI 2.0 and HDCP 2.2. Specifically, Blu-ray device 300 encrypts a decoded video signal using HDCP 2.2, and outputs the encrypted video signal to the 4K_SDR-compatible TV using a communication protocol that supports HDMI 2.0.

At this time, when an inserted BD is a 2K_SDR-compatible BD, up-conversion of a resolution is required. When an inserted BD is a 4K_HDR-compatible BD, conversion from HDR to SDR is required. When an inserted BD is a 2K_HDR-compatible BD, both up-conversion of a resolution and conversion from HDR to SDR are required.

Note that, when a 4K_SDR-compatible TV is connected to Blu-ray device 300, pseudo-HDR conversion which is described in the first exemplary embodiment may be performed.

For example, Blu-ray device 300 obtains a peak luminance of a display device connected to Blu-ray device 300. When an obtained type of the display device is the type (4K_SDR-compatible TV) and the obtained peak luminance is higher than a peak luminance of the first luminance range, Blu-ray device 300 converts a video signal to a luminance range having the obtained peak luminance and then further converts the video signal to the first luminance range. Then, Blu-ray device 300 encrypts the converted video signal using HDCP 2.2, and outputs the encrypted video signal to the 4K_SDR-compatible TV using a communication protocol that supports HDMI 2.0.

In addition, when a 2K_HDR-compatible TV is connected to Blu-ray device 300, Blu-ray device 300 outputs a video signal using HDMI 2.1 and HDCP 2.2. Specifically, Blu-ray device 300 encrypts a decoded video signal using HDCP 2.2, and outputs the encrypted video signal to the 2K_HDR-compatible TV using a communication protocol that supports HDMI 2.1.

At this time, when an inserted BD is a 4K_SDR-compatible BD and when an inserted BD is a 4K_HDR-compatible BD, down-conversion of a resolution is required for both cases.

In addition, when a 4K_HDR-compatible TV is connected to Blu-ray device 300, the Blu-ray device outputs a video signal using HDMI 2.1 and HDCP 2.2. Specifically, Blu-ray device 300 encrypts a decoded video signal using HDCP 2.2, and outputs the encrypted video signal to the 4K_HDR-compatible TV using a communication protocol that supports HDMI 2.1

At this time, when an inserted BD is a 2K_SDR-compatible BD and when an inserted BD is a 2K_HDR-compatible BD, up-conversion of a resolution is required for both cases.

[3-5. Details of Processes of the Blu-Ray Device]

Specific content of processes performed by Blu-ray device 300 according to a BD and a display device will be described below. Note that processing examples described below are all processing examples for a case in which Blu-ray device 300 plays BDs where streams are recorded in the combinations shown in FIG. 24.

[3-5-1. Processing Example 1]

Figure 28:
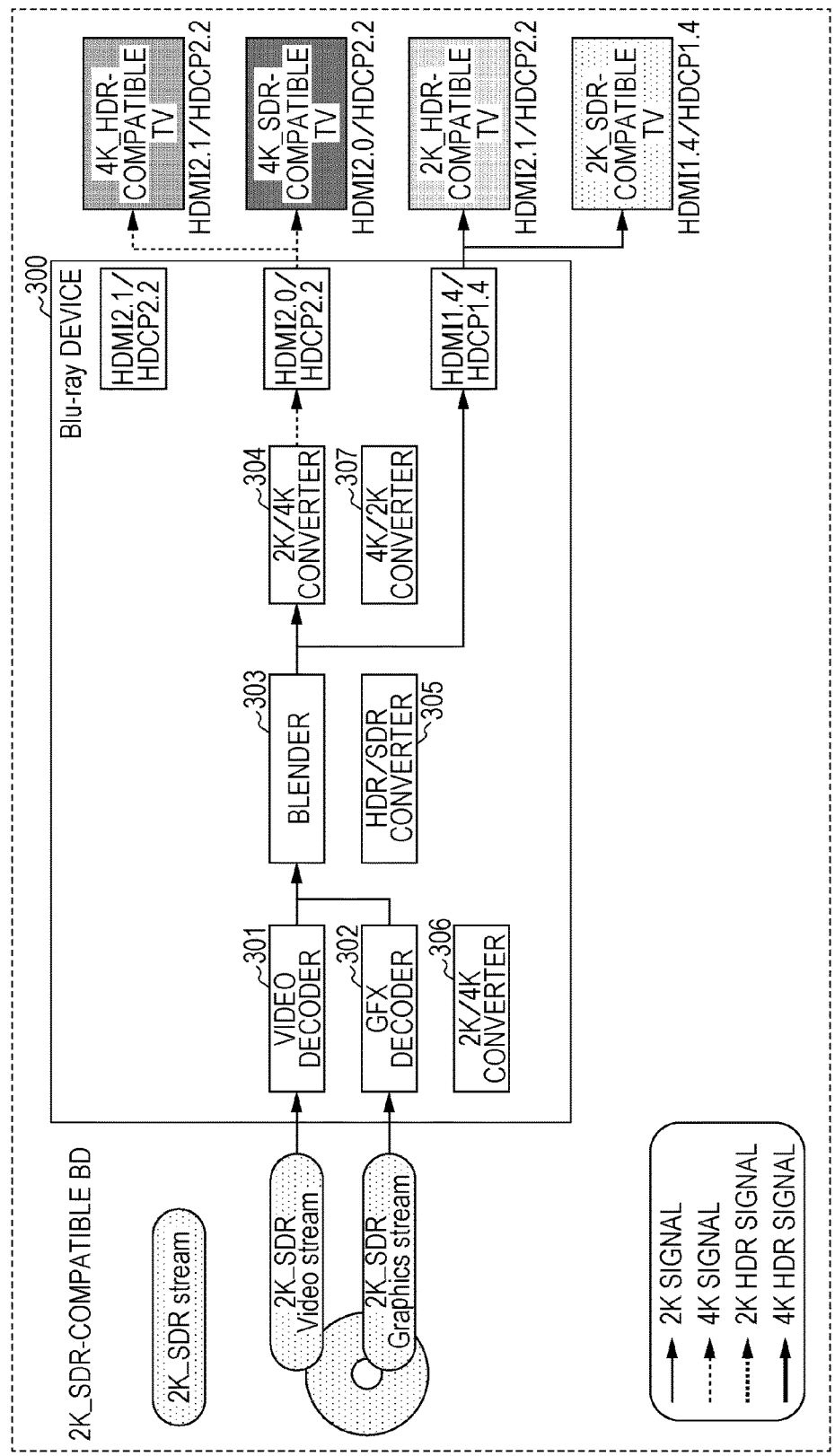
FIG. 28 is a diagram showing specific content of processes for a case in which the Blu-ray device plays a BD having a 2K_SDR stream recorded on the BD.

FIG. 28 is a diagram showing specific content of processes for a case in which Blu-ray device 300 plays a BD having a 2K_SDR stream recorded on the BD.

As shown in FIG. 28, first, a video stream is played (decoded) by video decoder 301, and a graphics stream is played (decoded) by graphics decoder 302.

Then, two pieces of data, i.e., the video stream decoded by video decoder 301 and the graphics stream decoded by graphics decoder 302, are combined (blended) together by blender 303.

Then, the following processes are performed according to a display device connected to Blu-ray device 300.

[1] When a 2K_SDR-compatible TV is connected to Blu-ray device 300, Blu-ray device 300 transmits a 2K_SDR video signal obtained by the combining performed by blender 303, to the 2K_SDR-compatible TV, using HDMI 1.4 and HDCP 1.4.

[2] When a 2K_HDR-compatible TV is connected to Blu-ray device 300, Blu-ray device 300 transmits a 2K_SDR video signal obtained by the combining performed by blender 303, to the 2K_HDR-compatible TV, using HDMI 1.4 and HDCP 1.4.

[3] When a 4K_SDR-compatible TV is connected to Blu-ray device 300, Blu-ray device 300 up-converts, by 2K/4K converter 304, a 2K_SDR video signal obtained by the combining performed by blender 303 to a 4K_SDR video signal, and transmits the converted 4K_SDR video signal to the 4K_SDR-compatible TV, using HDMI 2.0 and HDCP 2.2.

[4] When a 4K_HDR-compatible TV is connected to Blu-ray device 300, Blu-ray device 300 up-converts, by 2K/4K converter 304, a 2K_SDR video signal obtained by the combining performed by blender 303 to a 4K_SDR video signal, and transmits the converted 4K_SDR video signal to the 4K_HDR-compatible TV, using HDMI 2.0 and HDCP 2.2.

[3-5-2. Processing Example 2]

Figure 29:
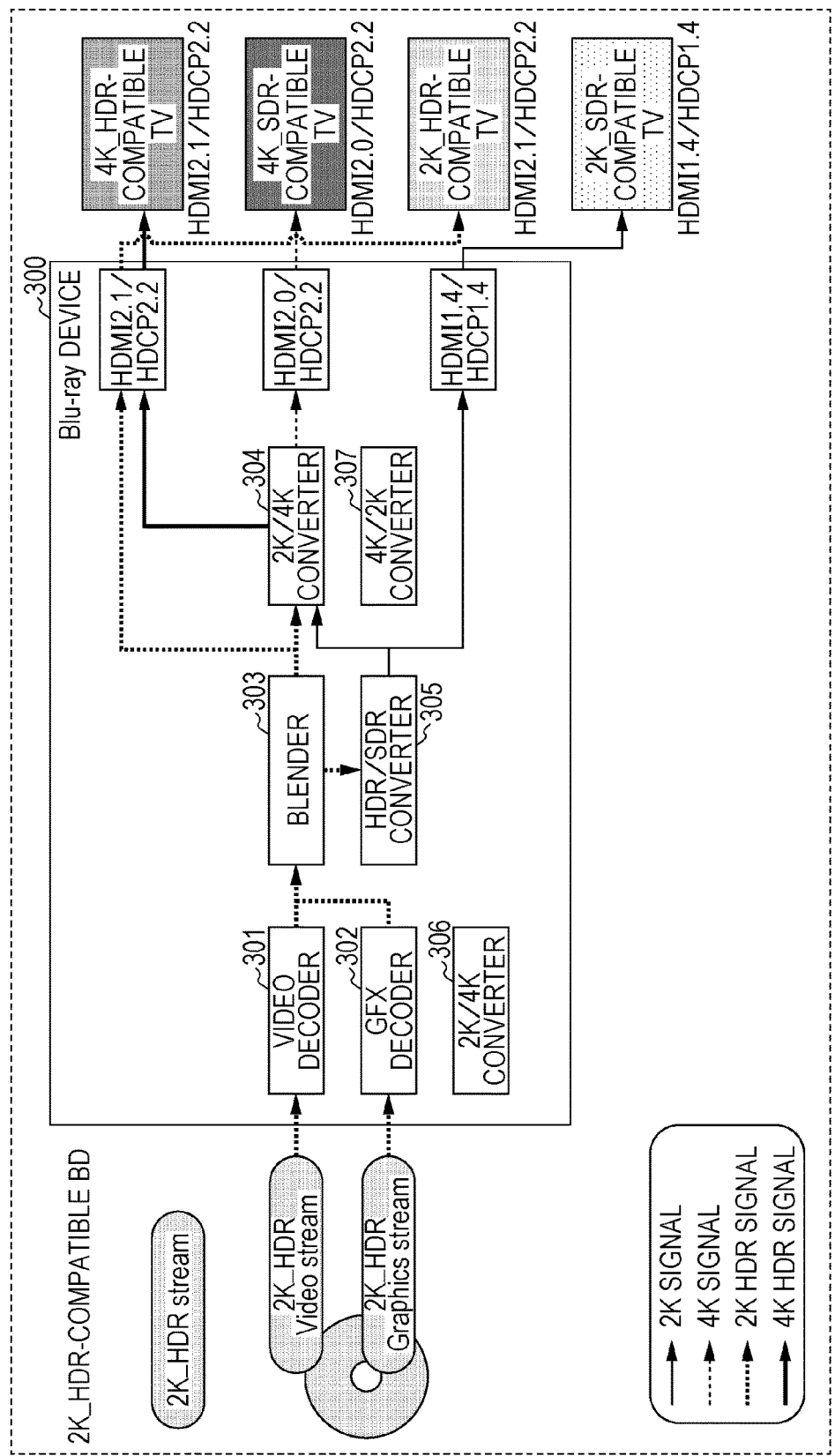
FIG. 29 is a diagram showing specific content of processes for a case in which the Blu-ray device plays a BD having a 2K_HDR stream recorded on the BD.

FIG. 29 is a diagram showing specific content of processes for a case in which Blu-ray device 300 plays a BD having a 2K_HDR stream recorded on the BD.

As shown in FIG. 29, first, a video stream is played (decoded) by video decoder 301, and a graphics stream is played (decoded) by graphics decoder 302.

Then, two pieces of data, i.e., the video stream decoded by video decoder 301 and the graphics stream decoded by graphics decoder 302, are combined together by blender 303.

Then, the following processes are performed according to a display device connected to Blu-ray device 300.

[1] When a 2K_SDR-compatible TV is connected to Blu-ray device 300, Blu-ray device 300 converts, by HDR/SDR converter 305, a 2K_HDR video signal obtained by the combining performed by blender 303 to a 2K_SDR video signal, and transmits the converted 2K_SDR video signal to the 2K_SDR-compatible TV, using HDMI 1.4 and HDCP 1.4.

[2] When a 2K_HDR-compatible TV is connected to Blu-ray device 300, Blu-ray device 300 transmits a 2K_HDR video signal obtained by the combining performed by blender 303, as it is to the 2K_HDR-compatible TV, using HDMI 2.1 and HDCP 2.2.

[3] When a 4K_SDR-compatible TV is connected to Blu-ray device 300, Blu-ray device 300 converts, by HDR/SDR converter 305, and up-converts, by 2K/4K converter 304, a 2K_HDR video signal obtained by the combining performed by blender 303 to a 4K_SDR video signal, and transmits the converted 4K_SDR video signal to the 4K_SDR-compatible TV, using HDMI 2.0 and HDCP 2.2.

[4] When a 4K_HDR-compatible TV is connected to Blu-ray device 300, Blu-ray device 300 up-converts, by 2K/4K converter 304, a 2K_HDR video signal obtained by the combining performed by blender 303 to a 4K_HDR video signal, and transmits the converted 4K_HDR video signal to the 4K_HDR-compatible TV, using HDMI 2.0 and HDCP 2.2.

[3-5-3. Processing Example 3]

Figure 30:
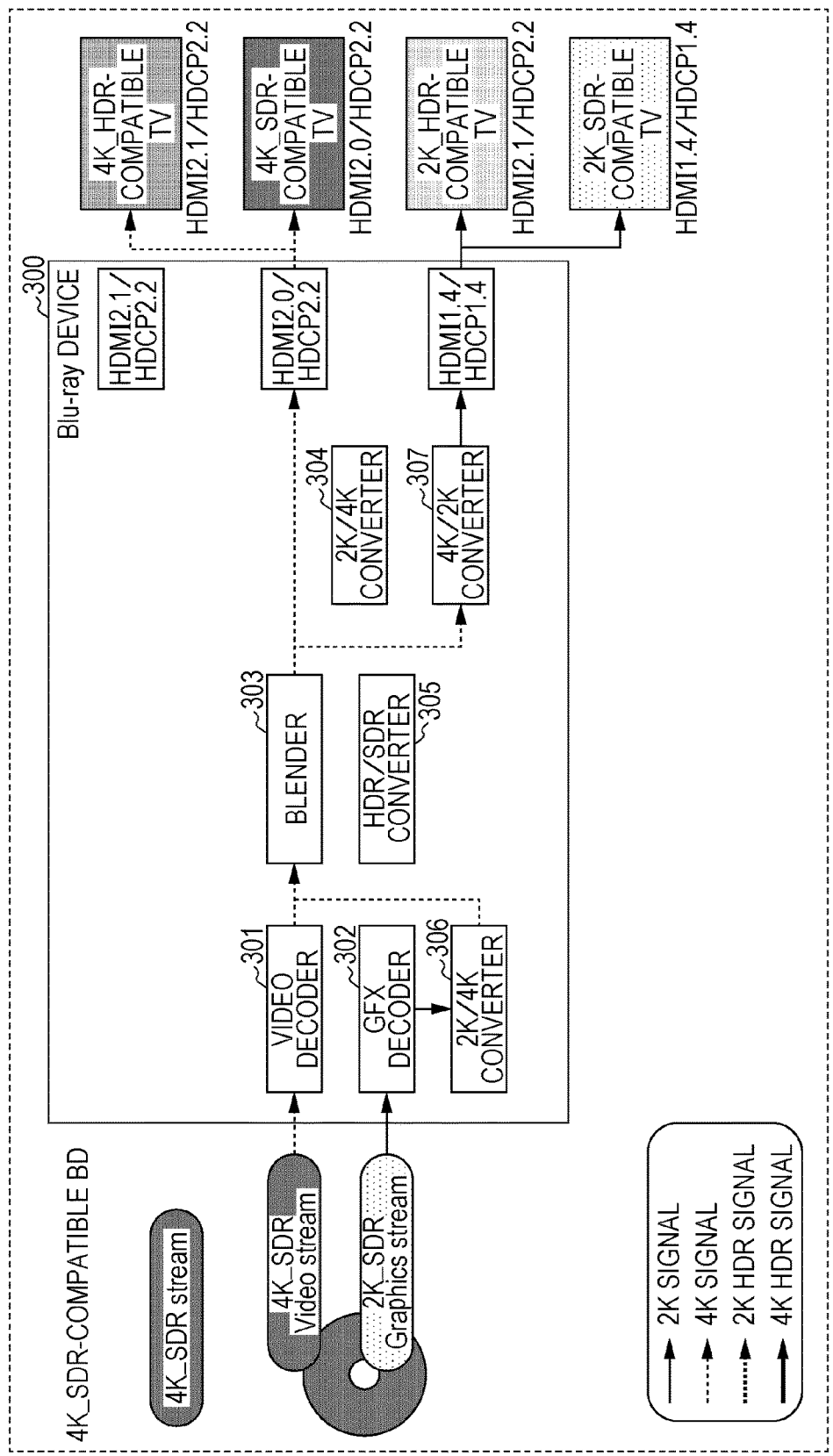
FIG. 30 is a diagram showing specific content of processes for a case in which the Blu-ray device plays a BD having a 4K_SDR stream (a 4K_SDR video stream and a 2K_SDR graphics stream) recorded on the BD.

FIG. 30 is a diagram showing specific content of processes for a case in which Blu-ray device 300 plays a BD having a 4K_SDR stream (a 4K_SDR video stream and a 2K_SDR graphics stream) recorded on the BD.

As shown in FIG. 30, first, the video stream is decoded by video decoder 301. On the other hand, the graphics stream is decoded by graphics decoder 302 and then up-converted by 2K/4K converter 306.

Then, two pieces of data, i.e., the video stream decoded by video decoder 301 and the graphics stream decoded by graphics decoder 302, are combined together by blender 303.

Then, the following processes are performed according to a display device connected to Blu-ray device 300.

[1] When a 2K_SDR-compatible TV is connected to Blu-ray device 300, Blu-ray device 300 down-converts, by 4K/2K converter 307, a 4K_SDR video signal obtained by the combining performed by blender 303 to a 2K_SDR video signal, and transmits the converted 2K_SDR video signal to the 2K_SDR-compatible TV, using HDMI 1.4 and HDCP 1.4.

[2] When a 2K_HDR-compatible TV is connected to Blu-ray device 300, Blu-ray device 300 down-converts, by 4K/2K converter 307, a 4K_SDR video signal obtained by the combining performed by blender 303 to a 2K_SDR video signal, and transmits the converted 2K_SDR video signal to the 2K_HDR-compatible TV, using HDMI 1.4 and HDCP 1.4.

[3] When a 4K_SDR-compatible TV is connected to Blu-ray device 300, Blu-ray device 300 transmits a 4K_SDR video signal obtained by the combining performed by blender 303, as it is to the 4K_SDR-compatible TV, using HDMI 2.0 and HDCP 2.2.

[4] When a 4K_HDR-compatible TV is connected to Blu-ray device 300, Blu-ray device 300 transmits a 4K_SDR video signal obtained by the combining performed by blender 303, as it is to the 4K_HDR-compatible TV, using HDMI 2.0 and HDCP 2.2.

[3-5-4. Processing Example 4]

Figure 31:
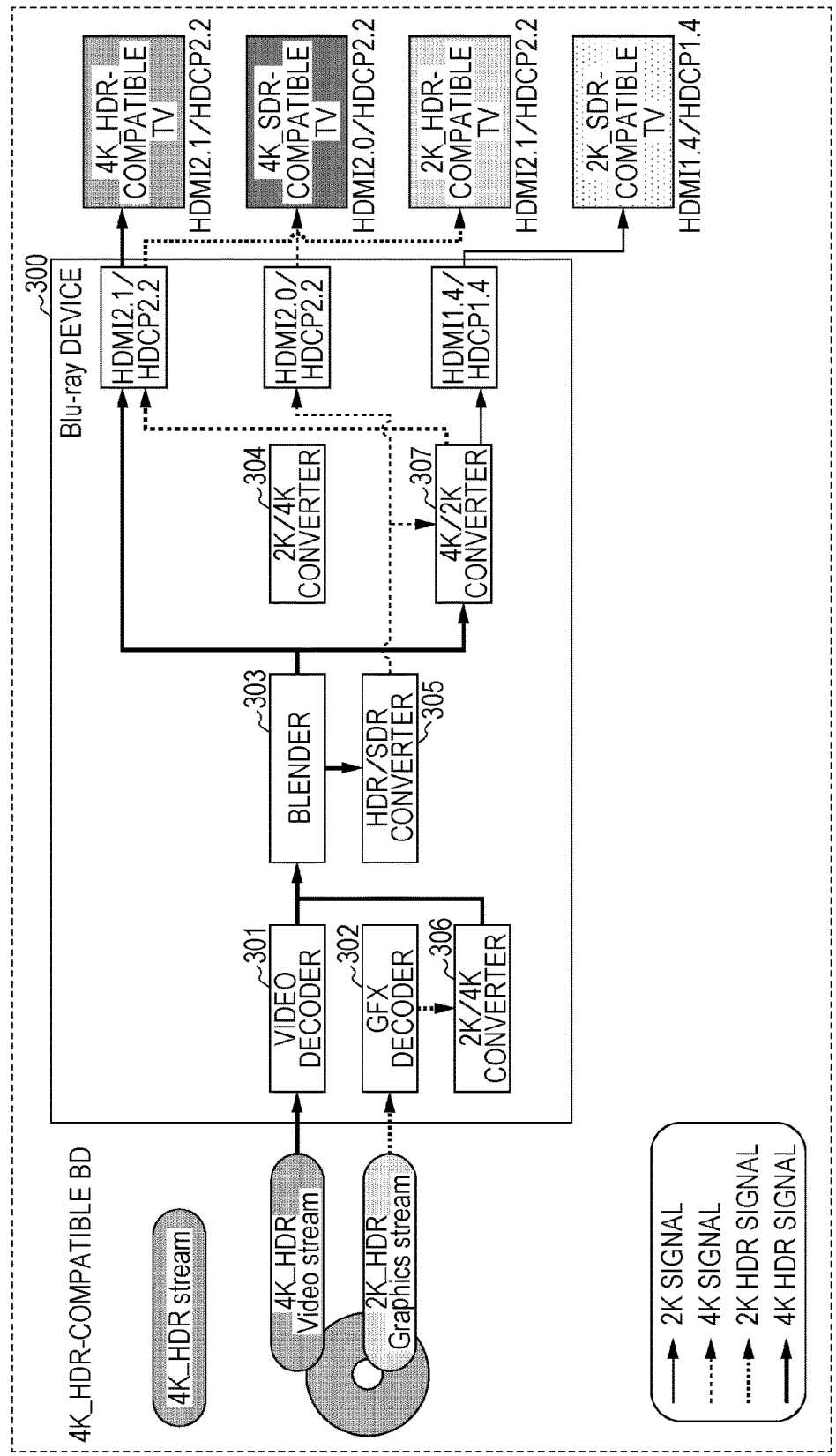
FIG. 31 is a diagram showing specific content of processes for a case in which the Blu-ray device plays a BD having a 4K_HDR stream (a 4K_HDR video stream and a 2K_HDR graphics stream) recorded on the BD.

FIG. 31 is a diagram showing specific content of processes for a case in which Blu-ray device 300 plays a BD having a 4K_HDR stream (a 4K_HDR video stream and a 2K_HDR graphics stream) recorded on the BD.

As shown in FIG. 31, first, the video stream is decoded by video decoder 301. On the other hand, the graphics stream is decoded by graphics decoder 302 and then up-converted by 2K/4K converter 306.

Then, two pieces of data, i.e., the video stream decoded by video decoder 301 and the graphics stream decoded by graphics decoder 302, are combined together by blender 303.

Then, the following processes are performed according to a display device connected to Blu-ray device 300.

[1] When a 2K_SDR-compatible TV is connected to Blu-ray device 300, Blu-ray device 300 converts a 4K_HDR video signal obtained by the combining performed by blender 303 to a 2K_SDR video signal by conversion by HDR/SDR converter 305 and down-conversion by 4K/2K converter 307, and transmits the converted 2K_SDR video signal to the 2K_SDR-compatible TV, using HDMI 1.4 and HDCP 1.4.

[2] When a 2K_HDR-compatible TV is connected to Blu-ray device 300, Blu-ray device 300 down-converts, by 4K/2K converter 307, a 4K_HDR video signal obtained by the combining performed by blender 303 to a 2K_HDR video signal, and transmits the converted 2K_HDR video signal to the 2K_HDR-compatible TV, using HDMI 2.1 and HDCP 2.2.

[3] When a 4K_SDR-compatible TV is connected to Blu-ray device 300, Blu-ray device 300 converts a 4K_HDR video signal obtained by the combining performed by blender 303 to a 2K_SDR video signal by performing conversion by HDR/SDR converter 305, and transmits the converted 2K_SDR video signal to the 4K_SDR-compatible TV, using HDMI 2.1 and HDCP 2.2.

[4] When a 4K_HDR-compatible TV is connected to Blu-ray device 300, Blu-ray device 300 transmits a 4K_HDR video signal obtained by the combining performed by blender 303, as it is to the 4K_HDR-compatible TV, using HDMI 2.1 and HDCP 2.2.

[3-5-5. Processing Example 5]

FIG. 32 is a diagram showing specific content of processes for a case in which Blu-ray device 300 plays a dual-stream disc having a 2K_HDR stream and a 2K_SDR stream recorded on the disc.

Blu-ray device 300 selects a stream to be extracted from the dual-stream disc, according to a display device connected to Blu-ray device 300, and performs processes such as those shown below.

[1] When a 2K_SDR-compatible TV is connected to Blu-ray device 300, Blu-ray device 300 extracts the 2K_SDR stream from the dual-stream disc. A video stream included in the extracted 2K_SDR stream is decoded by video decoder 301, and a graphics stream included in the extracted 2K_SDR stream is decoded by graphics decoder 302. Blu-ray device 300 combines together, by blender 303, the video stream decoded by video decoder 301 and the graphics stream decoded by graphics decoder 302, and transmits a 2K_SDR video signal obtained by the combining performed by blender 303 to the 2K_SDR-compatible TV, using HDMI 1.4 and HDCP 1.4.

[2] When a 2K_HDR-compatible TV is connected to Blu-ray device 300, Blu-ray device 300 extracts the 2K_HDR stream from the dual-stream disc. A video stream included in the extracted 2K_HDR stream is decoded by video decoder 301, and a graphics stream included in the extracted 2K_HDR stream is decoded by graphics decoder 302. Blu-ray device 300 combines together, by blender 303, the video stream decoded by video decoder 301 and the graphics stream decoded by graphics decoder 302, and transmits a 2K_HDR video signal obtained by the combining performed by blender 303 to the 2K_HDR-compatible TV, using HDMI 2.1 and HDCP 2.2.

[3] When a 4K_SDR-compatible TV is connected to Blu-ray device 300, Blu-ray device 300 extracts the 2K_SDR stream from the dual-stream disc. A video stream included in the extracted 2K_SDR stream is decoded by video decoder 301, and a graphics stream included in the extracted 2K_SDR stream is decoded by graphics decoder 302. Blu-ray device 300 combines together, by blender 303, the video stream decoded by video decoder 301 and the graphics stream decoded by graphics decoder 302, and up-converts, by 2K/4K converter 304, a 2K_SDR video signal obtained by the combining performed by blender 303 and thereby generates a 4K_SDR video signal, and transmits the generated 4K_SDR video signal to the 4K_SDR-compatible TV, using HDMI 2.0 and HDCP 2.2.

[4] When a 2K_HDR-compatible TV is connected to Blu-ray device 300, Blu-ray device 300 extracts the 2K_HDR stream from the dual-stream disc. A video stream included in the extracted 2K_HDR stream is decoded by video decoder 301, and a graphics stream included in the extracted 2K_HDR stream is decoded by graphics decoder 302. Blu-ray device 300 combines together, by blender 303, the video stream decoded by video decoder 301 and the graphics stream decoded by graphics decoder 302, and up-converts, by 2K/4K converter 304, a 2K_HDR video signal obtained by the combining performed by blender 303 and thereby generates a 4K_HDR video signal, and transmits the generated 4K_HDR video signal to the 4K_HDR-compatible TV, using HDMI 2.1 and HDCP 2.2.

As described above, video decoder 301 and graphics decoder 302 function as a second obtainer that selects one video signal from among a plurality of video signals according to a type of a display device, and obtains the selected video signal from a recording medium. The plurality of video signals are for playing the same content recorded on the dual-stream disc (recording medium), and at least one of a resolution and a luminance range differs between the plurality of video signals.

In addition, video decoder 301 and graphics decoder 302 function as a decoder that decodes the obtained video signal. Each of an HDMI 2.1/HDCP 2.2 processing block, an HDMI 2.0/HDCP 2.2 processing block, and each HDMI 1.4/HDCP 1.4 processing block in FIG. 32 functions as an output unit that encrypts the decoded video signal using HDCP of a selected version, and outputs the encrypted video signal to the display device using HDMI of a selected version. The same also applies to the following processing examples 6, 7, 10, and 11.

[3-5-6. Processing Example 6]

FIG. 33 is a diagram showing specific content of processes for a case in which Blu-ray device 300 plays a dual-stream disc having a 4K_HDR stream and a 4K_SDR stream recorded on the disc. Note that the 4K_HDR stream used here includes a 4K_HDR video stream and a 2K_HDR graphics stream. The 4K_SDR stream includes a 4K_SDR video stream and a 2K_SDR graphics stream.

Blu-ray device 300 selects a stream to be extracted from the dual-stream disc, according to a display device connected to Blu-ray device 300, and performs processes such as those shown below.

[1] When a 2K_SDR-compatible TV is connected to Blu-ray device 300, Blu-ray device 300 extracts the 4K_SDR stream from the dual-stream disc. The video stream included in the extracted 4K_SDR stream is decoded by video decoder 301. The graphics stream included in the extracted 4K_SDR stream is decoded by graphics decoder 302 and up-converted by 2K/4K converter 306. Blu-ray device 300 combines together, by blender 303, the video stream decoded by video decoder 301 and the graphics stream up-converted by 2K/4K converter 306, and down-converts, by 4K/2K converter 307, a 4K_SDR video signal obtained by the combining performed by blender 303. Blu-ray device 300 transmits a 2K_SDR video signal obtained by the down-conversion performed by 4K/2K converter 307 to the 2K_SDR-compatible TV, using HDMI 1.4 and HDCP 1.4.

[2] When a 2K_HDR-compatible TV is connected to Blu-ray device 300, Blu-ray device 300 extracts the 4K_HDR stream from the dual-stream disc. The video stream included in the extracted 4K_HDR stream is decoded by video decoder 301. The graphics stream included in the extracted 4K_HDR stream is decoded by graphics decoder 302 and up-converted by 2K/4K converter 306. Blu-ray device 300 combines together, by blender 303, the video stream decoded by video decoder 301 and the graphics stream up-converted by 2K/4K converter 306, and down-converts, by 4K/2K converter 307, a 4K_HDR video signal obtained by the combining performed by blender 303. Blu-ray device 300 transmits a 2K_HDR video signal obtained by the down-conversion performed by 4K/2K converter 307 to the 2K_HDR-compatible TV, using HDMI 2.1 and HDCP 2.2.

[3] When a 4K_SDR-compatible TV is connected to Blu-ray device 300, Blu-ray device 300 extracts the 4K_SDR stream from the dual-stream disc. The video stream included in the extracted 4K_SDR stream is decoded by video decoder 301. The graphics stream included in the extracted 4K_SDR stream is decoded by graphics decoder 302 and up-converted by 2K/4K converter 306. Blu-ray device 300 combines together, by blender 303, the video stream decoded by video decoder 301 and the graphics stream up-converted by 2K/4K converter 306, and transmits a 4K_SDR video signal obtained by the combining performed by blender 303 to the 4K_SDR-compatible TV, using HDMI 2.0 and HDCP 2.2.

[4] When a 4K_HDR-compatible TV is connected to Blu-ray device 300, Blu-ray device 300 extracts the 4K_HDR stream from the dual-stream disc. The video stream included in the extracted 4K_HDR stream is decoded by video decoder 301. The graphics stream included in the extracted 4K_HDR stream is decoded by graphics decoder 302 and up-converted by 2K/4K converter 306. Blu-ray device 300 combines together, by blender 303, the video stream decoded by video decoder 301 and the graphics stream up-converted by 2K/4K converter 306, and transmits a 4K_HDR video signal obtained by the combining performed by blender 303 to the 4K_HDR-compatible TV, using HDMI 2.1 and HDCP 2.2.

[3-5-7. Processing Example 7]

FIG. 34 is a diagram showing specific content of processes for a case in which Blu-ray device 300 plays a dual-stream disc having a 4K_HDR stream and a 2K_SDR stream recorded on the disc. Note that the 4K_HDR stream used here includes a 4K_HDR video stream and a 2K_HDR graphics stream. The 2K_SDR stream includes a 2K_SDR video stream and a 2K_SDR graphics stream.

Blu-ray device 300 selects a stream to be extracted from the dual-stream disc, according to a display device connected to Blu-ray device 300, and performs processes such as those shown below.

[1] When a 2K_SDR-compatible TV is connected to Blu-ray device 300, Blu-ray device 300 extracts the 2K_SDR stream from the dual-stream disc. The video stream included in the extracted 2K_SDR stream is decoded by video decoder 301, and the graphics stream included in the extracted 2K_SDR stream is decoded by graphics decoder 302. Blu-ray device 300 combines together, by blender 303, the video stream decoded by video decoder 301 and the graphics stream decoded by graphics decoder 302, and transmits a 2K_SDR video signal obtained by the combining performed by blender 303 to the 2K_SDR-compatible TV, using HDMI 1.4 and HDCP 1.4.

[2] When a 2K_HDR-compatible TV is connected to Blu-ray device 300, Blu-ray device 300 extracts the 4K_HDR stream from the dual-stream disc. The video stream included in the extracted 4K_HDR stream is decoded by video decoder 301. The graphics stream included in the extracted 4K_HDR stream is decoded by graphics decoder 302 and up-converted by 2K/4K converter 306. Blu-ray device 300 combines together, by blender 303, the video stream decoded by video decoder 301 and the graphics stream up-converted by 2K/4K converter 306, and down-converts, by 4K/2K converter 307, a 4K_HDR video signal obtained by the combining performed by blender 303. Blu-ray device 300 transmits a 2K_HDR video signal obtained by the down-conversion performed by 4K/2K converter 307 to the 2K_HDR-compatible TV, using HDMI 2.1 and HDCP 2.2.

[3] When a 4K_SDR-compatible TV is connected to Blu-ray device 300, Blu-ray device 300 extracts the 2K_SDR stream from the dual-stream disc. The video stream included in the extracted 2K_SDR stream is decoded by video decoder 301, and the graphics stream included in the extracted 2K_SDR stream is decoded by graphics decoder 302. Blu-ray device 300 combines together, by blender 303, the video stream decoded by video decoder 301 and the graphics stream decoded by graphics decoder 302, and up-converts, by 2K/4K converter 304, a 2K_SDR video signal obtained by the combining performed by blender 303 and thereby generates a 4K_SDR video signal, and transmits the generated 4K_SDR video signal to the 4K_SDR-compatible TV, using HDMI 2.0 and HDCP 2.2.

[4] When a 4K_HDR-compatible TV is connected to Blu-ray device 300, Blu-ray device 300 extracts the 4K_HDR stream from the dual-stream disc. The video stream included in the extracted 4K_HDR stream is decoded by video decoder 301. The graphics stream included in the extracted 4K_HDR stream is decoded by graphics decoder 302 and up-converted by 2K/4K converter 306. Blu-ray device 300 combines together, by blender 303, the video stream decoded by video decoder 301 and the graphics stream up-converted by 2K/4K converter 306, and transmits a 4K_HDR video signal obtained by the combining performed by blender 303 to the 4K_HDR-compatible TV, using HDMI 2.1 and HDCP 2.2.

In such processing example 7 and the above-described processing examples 5 and 6, when a first video signal with the first luminance range and a second video signal with the second luminance range are recorded on a dual-stream disc (recording medium), if a luminance range supported by a display device is the first luminance range, Blu-ray device 300 selects a video signal having the first luminance range, and if the luminance range supported by the display device is the second luminance range, Blu-ray device 300 selects a video signal having the second luminance range. By this, processes in Blu-ray device 300 are simplified.

[3-5-8. Processing Example 8]

A Blu-ray device may have a function of obtaining a peak luminance of a display device connected to the Blu-ray device, and performing pseudo-HDR conversion such as that described in the first exemplary embodiment. In the following processing examples 8 to 11, content of processes of Blu-ray 300*a* added with such a function will be described. Note that Blu-ray device 300*a* which is described in the following processing examples 8 to 11 obtains a peak luminance of a display device, for example, from the display device through an HDMI cable connecting Blu-ray device 300*a* to the display device. Alternatively, the peak luminance may be included in display characteristics information which is described in the first exemplary embodiment.

Figure 35:
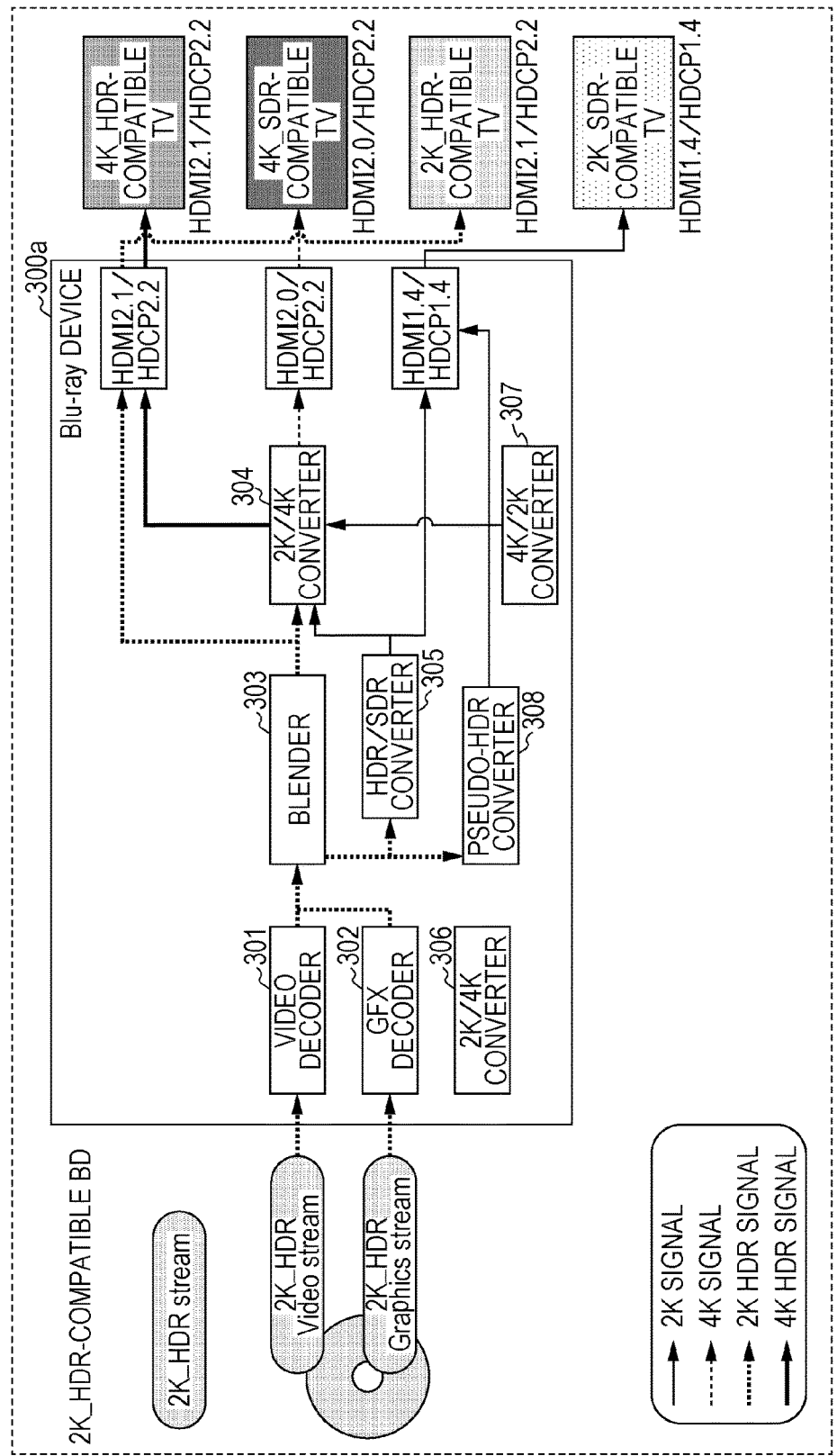
FIG. 35 is a diagram showing specific content of processes for a case in which a Blu-ray device having a pseudo-HDR conversion function plays a BD having a 2K_HDR stream recorded on the BD.

FIG. 35 is a diagram showing specific content of processes for a case in which Blu-ray device 300*a* having the pseudo-HDR conversion function plays a BD having a 2K_HDR stream recorded on the BD. Note that content of processes performed when a 2K_HDR-compatible TV is connected to Blu-ray device 300*a* and content of processes performed when a 4K_HDR-compatible TV is connected to Blu-ray device 300*a* are the same as the content of processes described in FIG. 29 and thus description of the content of processes is omitted.

When a 2K_SDR-compatible TV is connected to Blu-ray device 300*a* and when a 4K_SDR-compatible TV is connected to Blu-ray device 300*a*, a user can view the same video as video of a conventional BD whose luminances are represented by SDR, and can also enjoy HDR-like video having been pseudo-HDR converted. In the following, content of processes for a case of performing pseudo-HDR conversion will be described.

As shown in FIG. 29, first, a video stream is played (decoded) by video decoder 301, and a graphics stream is played (decoded) by graphics decoder 302.

Then, two pieces of data, i.e., the decoded video stream and the decoded graphics stream, are combined together by blender 303.

[1] When a 2K_SDR-compatible TV is connected to Blu-ray device 300*a*, Blu-ray device 300*a* determines, according to user's specification, whether to convert a 2K_HDR video signal obtained by the combining performed by blender 303 to a 2K_SDR video signal by HDR/SDR converter 305, or to pseudo-HDR-convert the 2K_HDR video signal by pseudo-HDR converter 308. Then, Blu-ray device 300*a* transmits a 2K_SDR video signal obtained by either one of the conversion performed by HDR/SDR converter 305 and the conversion performed by pseudo-HDR converter 308 to the 2K_SDR-compatible TV, using HDMI 1.4 and HDCP 1.4.

[2] When a 4K_SDR-compatible TV is connected to Blu-ray device 300*a*, Blu-ray device 300*a* determines, according to user's specification, whether to convert a 2K_HDR video signal obtained by the combining performed by blender 303 to a 2K_SDR video signal by HDR/SDR converter 305, or to pseudo-HDR-convert the 2K_HDR video signal by pseudo-HDR converter 308. Then, Blu-ray device 300*a* up-converts, by 2K/4K converter 304, a 2K_SDR video signal obtained by the conversion, and transmits a 4K/SDR video signal obtained by the up-conversion performed by 2K/4K converter 304 to the 4K_SDR-compatible TV, using HDMI 2.0 and HDCP 2.2.

[3-5-9. Processing Example 9]

Figure 36:
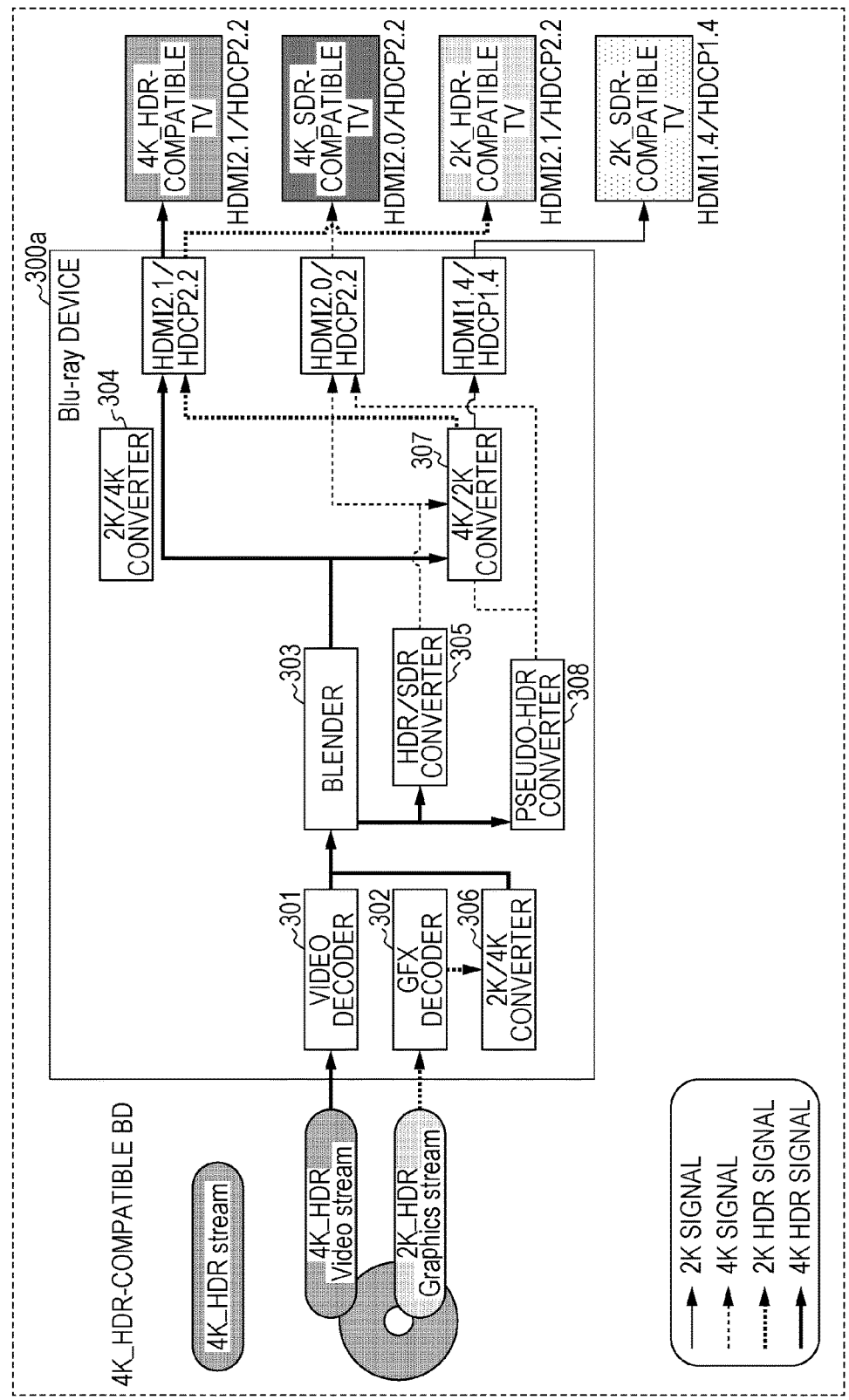
FIG. 36 is a diagram showing specific content of processes for a case in which the Blu-ray device having the pseudo-HDR conversion function plays a BD having a 4K_SDR stream (a 4K_SDR video stream and a 2K_SDR graphics stream) recorded on the BD.

FIG. 36 is a diagram showing specific content of processes for a case in which Blu-ray device 300*a* having the pseudo-HDR conversion function plays a BD having a 4K_SDR stream (a 4K_SDR video stream and a 2K_SDR graphics stream) recorded on the BD. Note that content of processes performed when a 2K_HDR-compatible TV is connected to Blu-ray device 300*a* and content of processes performed when a 4K_HDR-compatible TV is connected to Blu-ray device 300*a* are the same as the content of processes described in FIG. 31 and thus description of the content of processes is omitted.

As shown in FIG. 36, first, the video stream is decoded by video decoder 301. On the other hand, the graphics stream is decoded by graphics decoder 302 and then up-converted by 2K/4K converter 306.

Then, two pieces of data, i.e., the video stream decoded by video decoder 301 and the graphics stream decoded by graphics decoder 302, are combined together by blender 303.

[1] When a 2K_SDR-compatible TV is connected to Blu-ray device 300*a*, Blu-ray device 300*a* determines, according to user's specification, whether to convert a 4K_HDR video signal obtained by the combining performed by blender 303 to a 4K_SDR video signal by HDR/SDR converter 305, or to pseudo-HDR-convert the 4K_HDR video signal by pseudo-HDR converter 308. Then, Blu-ray device 300a down-converts, by 4K/2K converter 307, a 4K_SDR video signal obtained by either one of the conversion performed by HDR/SDR converter 305 and the conversion performed by pseudo-HDR converter 308, and transmits a 2K_SDR video signal obtained by the down-conversion performed by 4K/2K converter 307 to the 2K_SDR-compatible TV, using HDMI 1.4 and HDCP 1.4.

[2] When a 4K_SDR-compatible TV is connected to Blu-ray device 300a, Blu-ray device 300a determines, according to user's specification, whether to convert a 4K_HDR video signal obtained by the combining performed by blender 303 to a 4K_SDR video signal by HDR/SDR converter 305, or to pseudo-HDR-convert the 4K_HDR video signal by pseudo-HDR converter 308. Then, Blu-ray device 300a transmits a 4K_SDR video signal obtained by either one of the conversion performed by HDR/SDR converter 305 and the conversion performed by pseudo-HDR converter 308 to the 4K_SDR-compatible TV, using HDMI 2.0 and HDCP 2.2.

[3-5-10. Processing Example 10]

FIG. 37 is a diagram showing specific content of processes for a case in which Blu-ray device 300a having the pseudo-HDR conversion function plays a dual-stream disc having a 2K_HDR stream and a 2K_SDR stream recorded on the disc. Note that content of processes performed when a 2K_HDR-compatible TV is connected to Blu-ray device 300a and content of processes performed when a 4K_HDR-compatible TV is connected to Blu-ray device 300a are the same as the content of processes described in FIG. 32 and thus description of the content of processes is omitted.

[1] In a case in which a user makes a selection to obtain video equivalent to video of a conventional BD whose luminances are represented by SDR when a 2K_SDR-compatible TV is connected to Blu-ray device 300a, Blu-ray device 300a extracts the 2K_SDR stream from the dual-stream disc. A video stream included in the extracted 2K_SDR stream is decoded by video decoder 301, and a graphics stream included in the extracted 2K_SDR stream is decoded by graphics decoder 302. Blu-ray device 300a combines together, by blender 303, the video stream decoded by video decoder 301 and the graphics stream decoded by graphics decoder 302, and transmits a 2K_SDR video signal obtained by the combining performed by blender 303 to the 2K_SDR-compatible TV, using HDMI 1.4 and HDCP 1.4.

On the other hand, in a case in which the user makes a selection to obtain HDR-like video when the 2K_SDR-compatible TV is connected to Blu-ray device 300a, Blu-ray device 300a extracts the 2K_HDR stream from the dual-stream disc. A video stream included in the extracted 2K_HDR stream is decoded by video decoder 301, and a graphics stream included in the extracted 2K_HDR stream is decoded by graphics decoder 302. Blu-ray device 300a combines together, by blender 303, the video stream decoded by video decoder 301 and the graphics stream decoded by graphics decoder 302, and pseudo-HDR-converts, by pseudo-HDR converter 308, a 2K_HDR video signal obtained by the combining performed by blender 303. Then, Blu-ray device 300a transmits a 2K_SDR video signal obtained by the pseudo-HDR conversion performed by pseudo-HDR converter 308 to the 2K_SDR-compatible TV, using HDMI 1.4 and HDCP 1.4.

[2] In a case in which the user makes a selection to obtain video equivalent to video of a conventional BD whose luminances are represented by SDR when a 4K_SDR-compatible TV is connected to Blu-ray device 300a, Blu-ray device 300a extracts the 2K_SDR stream from the dual-stream disc. A video stream included in the extracted 2K_SDR stream is decoded by video decoder 301, and a graphics stream included in the extracted 2K_SDR stream is decoded by graphics decoder 302. Blu-ray device 300a combines together, by blender 303, the video stream decoded by video decoder 301 and the graphics stream decoded by graphics decoder 302, up-converts, by 2K/4K converter 304, a 2K_SDR video signal obtained by the combining performed by blender 303, and transmits a 4K_SDR video signal obtained by the up-conversion performed by 2K/4K converter 304 to the 4K_SDR-compatible TV, using HDMI 2.0 and HDCP 2.2.

On the other hand, in a case in which the user makes a selection to obtain HDR-like video when the 4K_SDR-compatible TV is connected to Blu-ray device 300a, Blu-ray device 300a extracts the 2K_HDR stream from the dual-stream disc. A video stream included in the extracted 2K_HDR stream is decoded by video decoder 301, and a graphics stream included in the extracted 2K_HDR stream is decoded by graphics decoder 302. Blu-ray device 300a combines together, by blender 303, the video stream decoded by video decoder 301 and the graphics stream decoded by graphics decoder 302, and pseudo-HDR-converts, by pseudo-HDR converter 308, a 2K_HDR video signal obtained by the combining performed by blender 303. Then, Blu-ray device 300a up-converts, by 2K/4K converter 304, a 2K_SDR video signal having been pseudo-HDR-converted by pseudo-HDR converter 308, and transmits a 4K_SDR video signal obtained by the up-conversion performed by 2K/4K converter 304 to the 2K_SDR-compatible TV, using HDMI 2.0 and HDCP 2.2.

[3-5-11. Processing Example 11]

FIG. 38 is a diagram showing specific content of processes for a case in which Blu-ray device 300a having the pseudo-HDR conversion function plays a dual-stream disc having a 4K_HDR stream and a 2K_SDR stream recorded on the disc. Note that the 4K_HDR stream used here includes a 4K_HDR video stream and a 2K_HDR graphics stream. The 4K_SDR stream includes a 4K_SDR video stream and a 2K_SDR graphics stream.

In addition, content of processes performed when a 2K_HDR-compatible TV is connected to Blu-ray device 300a and content of processes performed when a 4K_HDR-compatible TV is connected to Blu-ray device 300a are the same as the content of processes described in FIG. 34 and thus description of the content of processes is omitted.

[1] In a case in which a user makes a selection to obtain video equivalent to video of a conventional BD whose luminances are represented by SDR when a 2K_SDR-compatible TV is connected to Blu-ray device 300a, Blu-ray device 300a extracts the 2K_SDR stream from the dual-stream disc. The video stream included in the extracted 2K_SDR stream is decoded by video decoder 301, and the graphics stream included in the extracted 2K_SDR stream is decoded by graphics decoder 302. Blu-ray device 300a combines together, by blender 303, the video stream decoded by video decoder 301 and the graphics stream decoded by graphics decoder 302, and transmits a 2K_SDR video signal obtained by the combining performed by blender 303 to the 2K_SDR-compatible TV, using HDMI 1.4 and HDCP 1.4.

On the other hand, in a case in which the user makes a selection to obtain HDR-like video when the 2K_SDR-compatible TV is connected to Blu-ray device 300a, Blu-ray device 300a extracts the 4K_HDR stream from the dual-stream disc. The video stream included in the extracted 4K_HDR stream is decoded by video decoder 301. The graphics stream included in the extracted 4K_HDR stream is decoded by graphics decoder 302, and up-converted by 2K/4K converter 306. Blu-ray device 300a combines together, by blender 303, the video stream decoded by video decoder 301 and the graphics stream up-converted by 2K/4K converter 306, pseudo-HDR-converts, by pseudo-HDR converter 308, a 4K_HDR video signal obtained by the combining performed by blender 303, and down-converts, by 4K/2K converter 307, the pseudo-HDR-converted video signal. Then, Blu-ray device 300a transmits a 2K_SDR video signal obtained by the pseudo-HDR conversion performed by pseudo-HDR converter 308 and the down-conversion performed by 4K/2K converter 307 to the 2K_SDR-compatible TV, using HDMI 1.4 and HDCP 1.4.

[2] In a case in which the user makes a selection to obtain video equivalent to video of a conventional BD whose luminances are represented by SDR when a 4K_SDR-compatible TV is connected to Blu-ray device 300a, Blu-ray device 300a extracts the 2K_SDR stream from the dual-stream disc. The video stream included in the extracted 2K_SDR stream is decoded by video decoder 301, and the graphics stream included in the extracted 2K_SDR stream is decoded by graphics decoder 302. Blu-ray device 300a combines together, by blender 303, the video stream decoded by video decoder 301 and the graphics stream decoded by graphics decoder 302, up-converts, by 2K/4K converter 304, a 2K_SDR video signal obtained by the combining performed by blender 303, and transmits a 4K_SDR video signal obtained by the up-conversion performed by 2K/4K converter 304 to the 4K_SDR-compatible TV, using HDMI 2.0 and HDCP 2.2.

On the other hand, in a case in which the user makes a selection to obtain HDR-like video when the 4K_SDR-compatible TV is connected to Blu-ray device 300a, Blu-ray device 300a extracts the 4K_HDR stream from the dual-stream disc. The video stream included in the extracted 4K_HDR stream is decoded by video decoder 301. The graphics stream included in the extracted 4K_HDR stream is decoded by graphics decoder 302, and up-converted by 2K/4K converter 306. Blu-ray device 300a combines together, by blender 303, the video stream decoded by video decoder 301 and the graphics stream up-converted by 2K/4K converter 306, and pseudo-HDR-converts, by pseudo-HDR converter 308, a 4K_HDR video signal obtained by the combining performed by blender 303. Then, Blu-ray device 300a transmits a 4K_SDR video signal obtained by the pseudo-HDR conversion performed by pseudo-HDR converter 308 to the 4K_SDR-compatible TV, using HDMI 2.0 and HDCP 2.2.

[3-6. Details of Graphics Streams]

Supplemental remarks on graphics streams will be made below. FIG. 39 is a diagram showing detailed configurations of graphics streams.

An SDR graphics stream and an HDR graphics stream have the same basic specifications of a graphics stream, but the HDR graphics stream has constraints such as Java (registered trademark; hereinafter, the same) color space (BT 2020 for 4K) and EOTF (EOTF for HDR). Hence, Java drawing command 400 cannot be used as it is.

That is, a 4K_SDR-compatible BD, a 2K_HDR-compatible BD, and a 4K_HDR-compatible BD need to inhibit Java drawing command 400.

Note that in specification of values of colors and luminances, by specifying values that assume results of EOTF conversion (SDR→HDR), color space (BT709→BT2020) conversion, etc., it is also possible to use Java drawing command 400.

[3-7. Summary of the Third Exemplary Embodiment]

A Blu-ray device that plays a 4K-compatible BD or an HDR-compatible BD needs to support four TVs: a 2K_SDR-compatible TV, a 2K_HDR-compatible TV, a 4K_SDR-compatible TV, and a 4K_HDR-compatible TV. Specifically, the Blu-ray device needs to support three sets of HDMI/HDCP standards (HDMI 1.4/HDCP 1.4, HDMI 2.0/HDCP 2.1, and HDMI 2.1/HDCP 2.2).

Furthermore, when the Blu-ray device plays four types of Blu-ray discs (a 2K-SDR-compatible BD, a 2K_HDR-compatible BD, a 4K_SDR-compatible BD, and a 4K_HDR-compatible BD), the Blu-ray device needs to select appropriate processes and HDMI/HDCP for each BD (content) and for each display device (TV) connected to the Blu-ray device. Furthermore, in a case of combining graphics with video, too, processes need to be changed according to a type of a BD and a type of a display device (TV) connected.

Due to this, internal processes of the Blu-ray device become very complicated. The above-described third exemplary embodiment provides various types of techniques for making the internal processes of the Blu-ray device relatively simple.

[1] When an HDR signal is displayed on a TV that does not support HDR, conversion from HDR to SDR is required. On the other hand, in the above-described third exemplary embodiment, to allow a Blu-ray device to have this conversion as an option, a configuration of a BD, called a dual streams disc, is proposed.

[2] In addition, in the above-described third exemplary embodiment, a number of types of combination of a video stream and a graphics stream is reduced by putting restrictions on graphics streams.

[3] In the above-described third exemplary embodiment, a number of combinations of complex processes in the Blu-ray device is significantly reduced by the dual-stream disc and the restrictions on graphics streams.

[4] In the above-described third exemplary embodiment, internal processes and an HDMI process are presented that do not cause any contradiction in a process of the dual-stream disc even when pseudo-HDR conversion is introduced.

(Overall Summary)

Although playback methods and playback devices according to one or a plurality of aspects of the present disclosure are described above based on exemplary embodiments, the present disclosure is not limited to the exemplary embodiments. A mode where various modifications one skilled in the art comes up with are made to the present exemplary embodiments, or a mode formed by combining together components of different exemplary embodiments may also be included in a range of one or the plurality of aspects of the present disclosure, without departing from the spirit and scope of the present disclosure.

For example, in each of the above-described exemplary embodiments, each component may be configured by dedicated hardware such as a circuit, or may be implemented by executing a software program suitable for each component. Each component may be implemented by a program executor, such as a CPU or a processor, reading and executing a software program recorded in a recording medium, such as a hard disk or a semiconductor memory.

The present disclosure is useful as a playback method, a playback device, and the like, that are capable of appropriately displaying video on a display device.

What is claimed is:

1. A display device to be connected to a playback device, the display device comprising:
   a transmitter that transmits, to the playback device, type information indicating (i) a resolution of the display device and (ii) a luminance range that the display device is compatible with;
   a receiver that receives, from the playback device, a video signal that is (i) encrypted using a version of high-bandwidth digital content protection (HDCP) selected based on both of the resolution of the display device and the luminance range indicated by the type information and (ii) transmitted using a version of high-definition multimedia interface (HDMI) selected based on both of the resolution of the display device and the luminance range indicated by the type information; and
   a display that displays the received video signal.

2. The display device according to claim 1, wherein the type information includes information indicating whether the display device is compatible with the HDR.

3. The display device according to claim 1, wherein wherein the type information indicates one of:
   the resolution of the display device is a first resolution and the display device is compatible with a first luminance range;
   the resolution of the display device is a second resolution and the display device is compatible with the first luminance range;
   the resolution of the display device is the first resolution and the display device is compatible with a second luminance range; and
   the resolution of the display device is the second resolution and the display device is compatible with the second luminance range,
   wherein the second resolution has a larger number of pixels than the first resolution, and
   wherein the second luminance range includes the first luminance range and has a higher peak luminance than the first luminance range.

4. A display method for a display device to be connected to a playback device, the display method comprising:
   transmitting, to the playback device, type information indicating (i) a resolution of the display device and (ii) a luminance range that the display device is compatible with;
   receiving, from the playback device, a video signal that is (i) encrypted using a version of high-bandwidth digital content protection (HDCP) selected based on both of the resolution of the display device and the luminance range indicated by the type information and (ii) transmitted using a version of high-definition multimedia interface (HDMI) selected based on both of the resolution of the display device and the luminance range indicated by the type information; and
   displaying the received video signal.

5. The display device according to claim 3, wherein when the type information indicates that the resolution of the display device is the first resolution and the display device is compatible with the first luminance range, the video signal is encrypted using HDCP 1.4 and the video signal is transmitted using HDMI 1.4.

6. The display device according to claim 3, wherein when the type information indicates that the resolution of the display device is the second resolution and the display device is compatible with the first luminance range, the video signal is encrypted using HDCP 2.2 and the video signal is transmitted using HDMI 2.1.

7. The display device according to claim 3, wherein when the type information indicates that the resolution of the display device is the first resolution and the display device is compatible with the second luminance range, the video signal is encrypted using HDCP 2.2 and the video signal is transmitted using HDMI 2.0.

8. The display device according to claim 3, wherein when the type information indicates that the resolution of the display device is the second resolution and the display device is compatible with the second luminance range, the video signal is encrypted using HDCP 2.2 and the video signal is transmitted using HDMI 2.1.

* * * * *